US007886380B2

(12) United States Patent
Hornbach et al.

(10) Patent No.: US 7,886,380 B2
(45) Date of Patent: Feb. 15, 2011

(54) HOSPITAL BED

(75) Inventors: David W. Hornbach, Brookville, IN (US); Kenneth Rudolf, Batesville, IN (US); Raymond C. Gould, Greensburg, IN (US); John D. Vogel, Columbus, IN (US); Francis C. Ganance, Cincinnati, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 418 days.

(21) Appl. No.: 11/191,651

(22) Filed: Jul. 28, 2005

(65) Prior Publication Data

US 2006/0026762 A1 Feb. 9, 2006

Related U.S. Application Data

(60) Provisional application No. 60/591,838, filed on Jul. 28, 2004.

(51) Int. Cl.
 *A61G 1/02* (2006.01)
(52) U.S. Cl. .............................................. 5/613; 5/943
(58) Field of Classification Search .................... 5/600, 5/620, 602, 613, 943; 188/5, 7, 8
 See application file for complete search history.

(56) References Cited

U.S. PATENT DOCUMENTS

| | | | | |
|---|---|---|---|---|
| 2,537,909 | A | * | 1/1951 | Puddester ...................... 188/5 |
| 2,796,150 | A | * | 6/1957 | Gambardella .................. 188/5 |
| 3,050,745 | A | * | 8/1962 | Tabbert ........................ 5/86.1 |
| 3,220,021 | A | | 11/1965 | Nelson |
| 3,220,022 | A | | 11/1965 | Nelson |
| 3,413,663 | A | | 12/1968 | Swann |
| 3,611,453 | A | | 10/1971 | Lokken |
| 3,893,197 | A | | 7/1975 | Ricke |
| 4,409,695 | A | | 10/1983 | Johnston et al. |
| 4,669,136 | A | | 6/1987 | Waters et al. |
| 4,700,417 | A | | 10/1987 | McGovern |
| 4,847,929 | A | | 7/1989 | Pupovic |
| 4,985,946 | A | | 1/1991 | Foster et al. |
| 4,998,939 | A | * | 3/1991 | Potthast et al. ................... 5/424 |
| 5,035,445 | A | * | 7/1991 | Poulin ....................... 280/763.1 |
| 5,083,332 | A | | 1/1992 | Foster et al. |
| 5,479,666 | A | | 1/1996 | Foster et al. |

(Continued)

FOREIGN PATENT DOCUMENTS

EP 1 093 989 4/2001

(Continued)

OTHER PUBLICATIONS

Healthcare Ergonomics—Improving Caregiver Safety and Efficiency, Hill-Rom A Hillenbrand Industries. 2001.

(Continued)

*Primary Examiner*—Shane Bomar
*Assistant Examiner*—Gilbert Y Lee
(74) *Attorney, Agent, or Firm*—Barnes & Thornburg LLP

(57) ABSTRACT

A patient support including a frame, plurality of wheels coupled to the frame, a deck, and a scissor mechanism coupled to the frame and the deck to move the deck from a raised position to a lowered position. The support includes brake mechanism including a brake pad to contact the floor to prevent the patient support from rolling.

18 Claims, 45 Drawing Sheets

U.S. PATENT DOCUMENTS

| | | | | |
|---|---|---|---|---|
| 5,586,622 | A * | 12/1996 | Hu | 188/20 |
| 5,745,936 | A | 5/1998 | Van McCutchen et al. | |
| 6,163,903 | A * | 12/2000 | Weismiller et al. | 5/610 |
| 6,324,709 | B1 | 12/2001 | Ikeda et al. | |
| 6,357,065 | B1 | 3/2002 | Adams | |
| 6,363,556 | B1 | 4/2002 | Krauska et al. | |
| 6,460,205 | B1 | 10/2002 | Lewandowski et al. | |
| 6,473,921 | B2 * | 11/2002 | Brooke et al. | 5/600 |
| 6,708,358 | B2 * | 3/2004 | Hensley | 5/915 |
| 6,868,567 | B2 * | 3/2005 | Edgerton | 5/611 |
| 6,951,034 | B2 | 10/2005 | Shiery et al. | |
| 7,062,805 | B2 | 6/2006 | Hopper et al. | |
| 7,293,307 | B2 * | 11/2007 | Edgerton | 5/600 |
| 2004/0133981 | A1 | 7/2004 | Walkingshaw | |
| 2007/0080030 | A1 * | 4/2007 | Kramer | 188/5 |

FOREIGN PATENT DOCUMENTS

| | | |
|---|---|---|
| EP | 1 296 580 A1 | 4/2003 |
| GB | 2313303 | 11/1997 |
| WO | WO 99/15126 | 4/1999 |

OTHER PUBLICATIONS

Magnum II—Bariatric Patient Care System, Hill-Rom A Hillenbrand Industries, 1997.

Magnum II—Bariatric Patient Care System, Hill-Rom A Hillenbrand Industries, 2001.

* cited by examiner

HOSPITAL BED

CROSS-REFERENCE TO RELATED APPLICATION

This application claims the benefit of U.S. Provisional Patent Application Ser. No. 60/591,838, filed Jul. 28, 2004, titled "Hospital Bed", to Hornbach et al., the disclosure of which is expressly incorporated by reference herein.

BACKGROUND AND SUMMARY OF THE INVENTION

The present invention relates to a hospital bed. More particularly, the present invention relates to a hospital bed having siderails, an articulating deck, and a mattress.

Hospital bed and other patient supports are known. Typically, such patient supports are used to provide a support surface for patients or other individuals for treatment, recuperation, or rest. Many such patient supports include a frame, a deck supported by the frame, a mattress, siderails configured to block egress of a patient from the mattress, and a controller configured to control one or more features of the bed.

According to one embodiment of the present invention, there is provided a patient support including, a frame, a plurality of wheels coupled to the frame, and a brake mechanism coupled to the frame. The brake mechanism includes a first member having first and second ends, a second member having first and second ends, and a third member configured to contact a floor surface. The first ends of the first and second members are pivotally coupled to the frame. The second ends of the first and second members are pivotally coupled to the third member. An actuator is pivotally coupled to the first member between the first and second ends of the first member.

According to another embodiment of the present invention, there is provided a patient support including a frame, a deck supported by the frame, a mattress supported by the deck, and a deck lift configured to raise and lower the deck. The deck lift includes a first mount adapted to be coupled to the frame, a second mount adapted to support the deck, a first link including first and second ends, a second link including first and second ends, and an actuator coupled to the first and second links. The second end of the first and second links are coupled to the first mount. The first end of the first and second links are coupled to the second mount and moveable relative to the deck. The first ends move toward one another when the deck is raised and away from one another when the deck is lowered.

Pursuant to another aspect of the present invention, there is provided a patient support including a frame, a deck having first and second ends, and a deck tilt mechanism including an actuator including first and second ends, a support configured to support the deck, a first pivot member coupled to the deck, and a second pivot member coupled to the support. The second pivot member is spaced apart from the first pivot member. The first end of the actuator is coupled to the support and the second end of the actuator is coupled to the deck, wherein the first end of the deck is lowered by the actuator as the deck pivots about the first pivot member and the first end of the deck is elevated by the actuator as the deck pivots about the second pivot member.

The present invention may also include a patient support including a frame, a deck including first and second sections, and a moving mechanism configured to move the first section relative to the second section. The moving mechanism includes a first link including first and second ends, a second link having first and second ends, and an actuator including first and second ends. the first link is pivotally coupled on the first end to the first section and pivotally coupled on the second end to second link. The second link is pivotally coupled on the first end to the second section and pivotally coupled on the second end to the first link. The actuator is pivotally coupled on the first end to the second section and pivotally coupled on the second end to the second link.

A further aspect of the present invention includes a patient support having a frame, a deck including an extendable foot section, the extendable foot section including a first section, a second section, and a third section, a first actuator coupled to the first section and configured to extend the second section relative to the first section, and a second actuator coupled to the second section and configured to extend the third section relative to the second section.

Additional aspects include a patient support comprising, a frame, a deck including first and second sections, the first and second sections pivotally coupled together with the deck supported by the frame, and a moving mechanism coupled to the frame and configured to move the first section relative to the second section, the moving mechanism including a first member configured to movably contact the first section and an actuator configured to raise and lower the member.

The present invention also includes a patient support comprising a frame, a deck supported by the frame, the deck including first and second head sections, the first and second head sections pivotally coupled together, a support configured to extend and retract, the support including first and second ends, the first end pivotally coupled to the first head section and the second end contacting the second head section, and an actuator coupled to the first head section and configured to secure the support in one of a fixed position and a movable position.

In accordance with a further aspect of the present invention, there is provided a mattress for a patient support. The mattress includes a foam base having first and second ends and longitudinal sides extending therebetween. The base includes a cavity between the sides and the ends, the first and second ends and sides of the base including an array of vertical openings configured to collapse and an inflatable portion positioned above the cavity.

Additional features of the present invention will become apparent to those skilled in the art upon consideration of the following detailed description of an illustrated embodiment exemplifying the best mode of carrying out the invention as presently perceived.

DETAILED DESCRIPTION OF THE DRAWINGS

Figure 1:
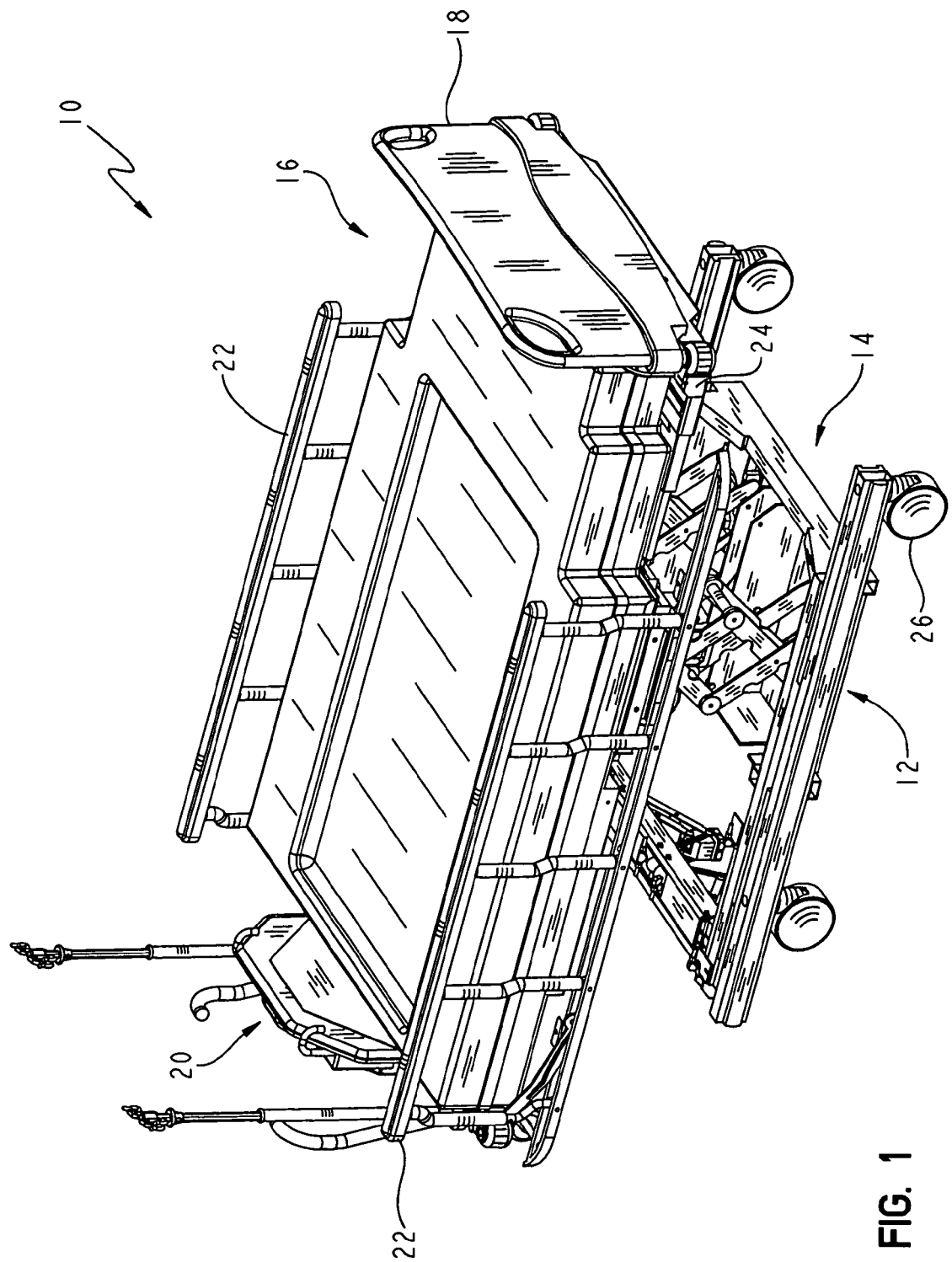
FIG. 1 illustrates a perspective view of a patient support including a frame, a subframe, a deck, and a mattress.
Figure 2:
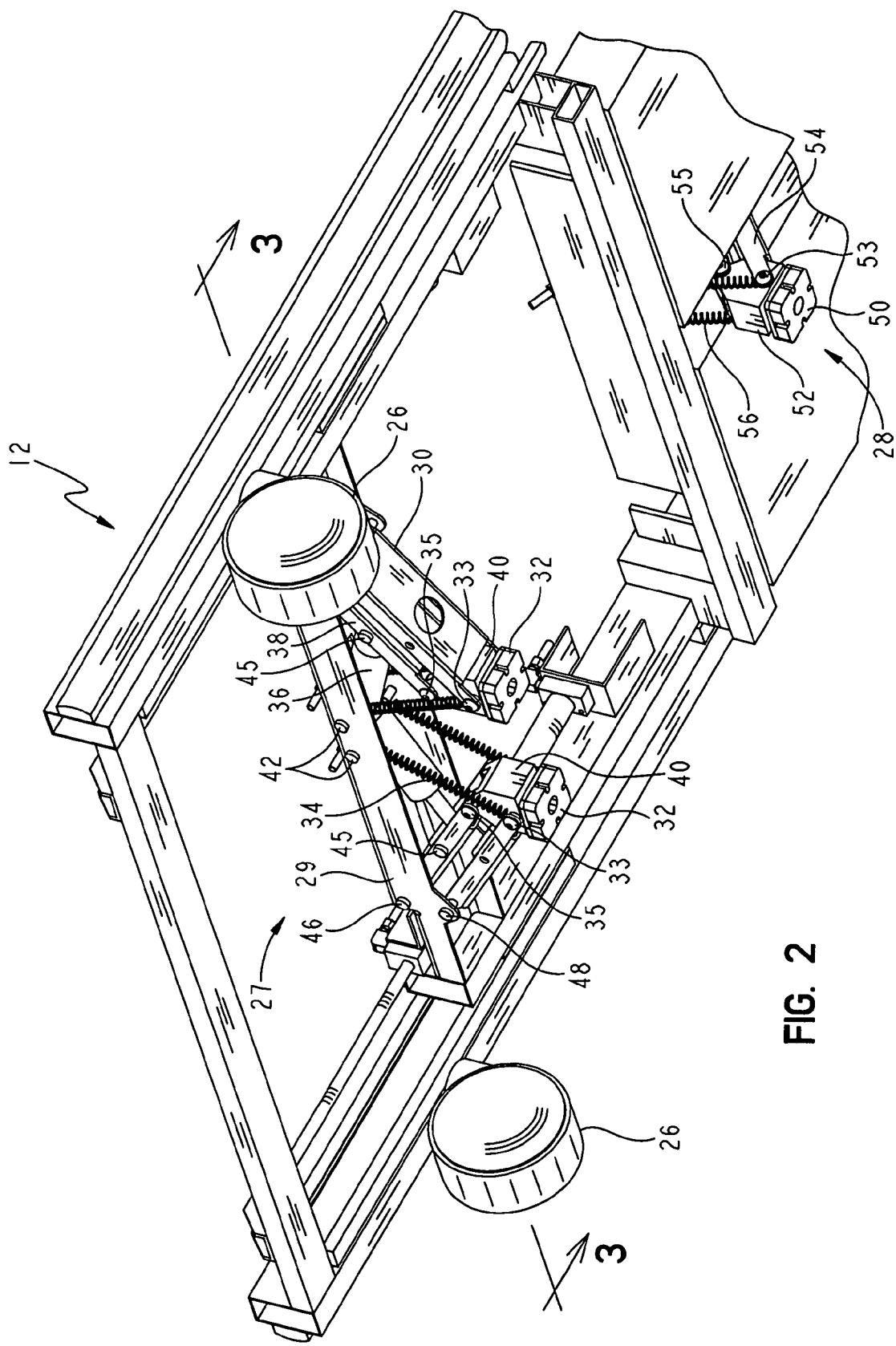
FIG. 2 illustrates a perspective bottom view of a braking system coupled to the subframe of the patient support.

As shown in FIG. 1, a patient support 10 including a frame 12, a subframe 14 coupled to frame 12, a deck 24 coupled to subframe 14, a mattress 16 positioned on deck 24, a headboard 20 coupled to deck 24, a footboard 18 coupled to deck 24, and a pair of siderails 22 coupled to deck 24. Subframe 14 is configured to raise and lower deck 24 relative to the floor and to move deck 24 to the Trendelenburg position and the Reverse Trendelenburg position.

Figure 3:
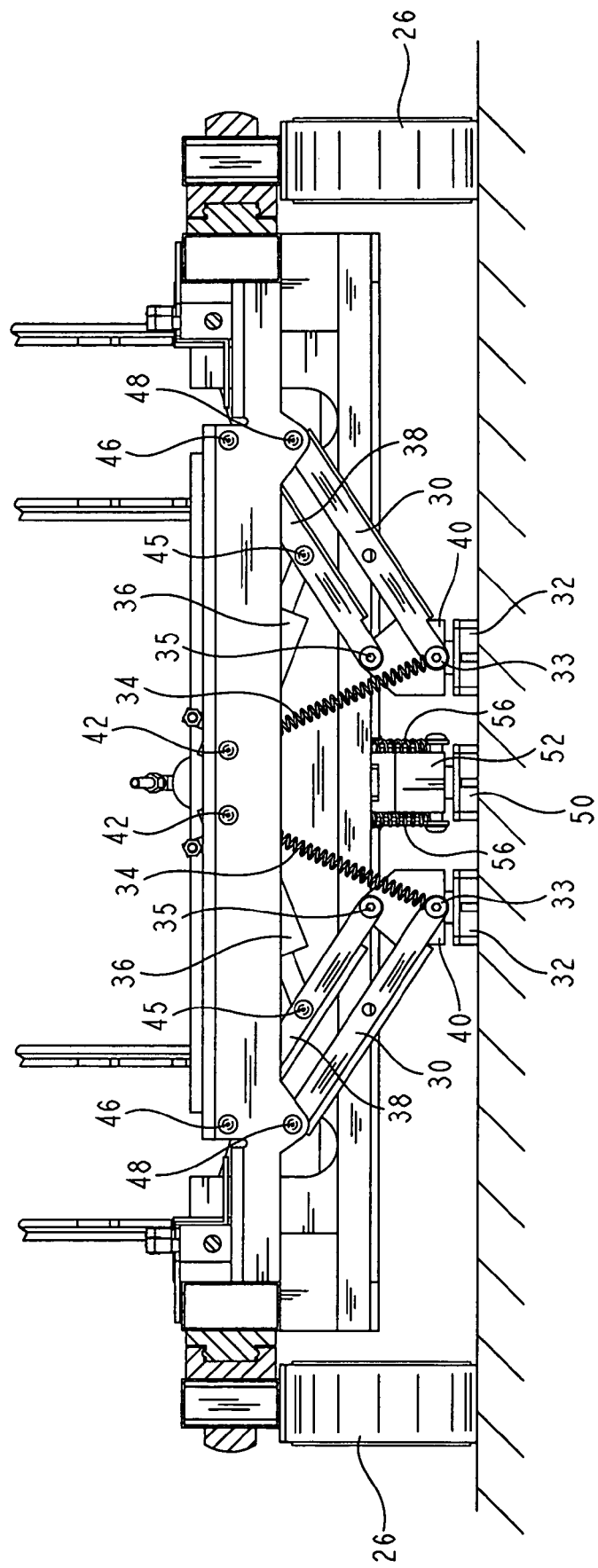
FIG. 3 illustrates an end view of the patient support of FIG. 1 showing the braking system in an extended position.

Patient support 10 further includes a braking system coupled to subframe assembly 14 as shown in FIGS. 2-5. Brake mechanism 27 is located beneath the head end of patient support 10 and brake mechanism 28 is located in the middle of subframe 14. As shown in FIG. 3, brake mechanisms 27 and 28 prevent patient support 10 from rolling on castors 26 by lowering brake pads 32 and 50 to contact the floor. Brake mechanism 27 includes crossmember 29, actuators 36, links 30 and 38, springs 34, couplers 40, and brake pads 32.

Actuators 36 provide the power and force necessary to raise and lower brake mechanism 27. Actuators 36 have expandable lengths to adjust the angular position of links 30 and 38 relative to crossmember 29 so that brake pads 32 can be raised and lowered. Each of actuators 36 may be a conventional hydraulic cylinder having respective cylinder bodies, cylinder rods, and pumps to supply fluid pressure to extend and/or retract the cylinder rods relative to the cylinder bodies. Actuators 36 could also be air powered cylinders, electric or linear actuators, for example. Actuators 36 are pivotally coupled to crossmember 29 by fasteners 42 on one end and pivotally coupled to links 38 by fasteners 45 on the other end.

Actuator 62 of brake mechanism 28 is similar to actuators 36 and has an expandable length to adjust the angular position of links 54 and 58 relative to support 70 so that brake pad 50 can be raised and lowered.

Links 30 of brake mechanism 27 are pivotally coupled on a lower end to couplers 40 by fasteners 33. Links 30 are pivotally coupled on an upper end to crossmember 29 by fasteners 48. Links 38 are pivotally coupled on a lower end to couplers 40 by fasteners 35. Links 38 are pivotally coupled on an upper end to crossmember 29 by fasteners 46. Springs 34 are coupled on one end to coupler 40 by fasteners 33 and coupled on the other end to crossmember 29 by fasteners 42. Brake pads 32 are also coupled to coupler 40 and designed to contact the floor.

To lower brake pads 32 to contact the floor, a caregiver actuates a controller that controls actuators 36. The controller may be actuated by depressing a button located on the siderail, an endboard, or a pendant controller. As actuators 36 extend, links 38 pivot about fasteners 46 in a downward direction. As links 38 move downward, couplers 40 which pivot about fasteners 35 are moved downward also. Coupler 40 moves links 30 downward also. Links 30 and 38 form a four-bar linkage and are substantially parallel to each other so that coupler 40 maintains a position parallel to the floor through the full range of motion of coupler 40. Links 30 and 38 are coupled along a vertical axis an equal vertical distance apart from one another on each end. For example, if the vertical distance between fasteners 46 and 48 on crossmember 29 is three inches, the vertical distance between fasteners 33 and 35 on coupler 40 is also three inches. Brake pad 32 which is coupled to the bottom side of coupler 40 is also parallel to the floor. Brake pad 32 must contact the floor with sufficient force to prevent patient support 10 from rolling on castors 26.

To release brake mechanism 27, i.e., return brake pads 32 to their retracted position, actuators 36 are illustratively activated to move from their extended positions to their retracted positions. Springs 34 bias brake mechanism 27 toward the retracted position, shown in FIG. 4. Brake pads 32 are returned to the retracted position by removing the pressure or extending force from actuators 36. When the pressure or power to actuators 36 is discontinued springs 34 return couplers 40 to the retracted position. As springs 34 lift couplers 40, links 38 and 30 raise and retract or compress the cylinders of actuators 36. Brake pads 32 maintain a position parallel to the floor in the raised or retracted position and throughout the range of motion of brake mechanism 27. In an alternative embodiment, actuators 36 are two-way cylinders which extend and retract. For this embodiment, springs 24 are not needed.

In one embodiment of the present invention, there are three brake assemblies. In addition to brake mechanism 27 which includes two brake assemblies, subframe 14 also includes brake mechanism 28, shown in FIGS. 2-5. Brake mechanisms 27 and 28 are illustratively interconnected to provide simultaneous braking of bed 10. Brake mechanism 28 is situated longitudinally within subframe 14 compared to the horizontal positioning of brake mechanism 27 within subframe 14. Brake mechanism 28 includes similar components and functions similarly to brake mechanism 27. Actuator 62, which has an extendable length, is pivotally coupled on one end to subframe 14 by fastener 68 and pivotally coupled on the other end by fastener 60 to link 58. Link 58 is pivotally coupled on a lower end to coupler 52 with fastener 55 and pivotally coupled on an upper end to support 70 with fastener 64. Link 54 is also pivotally coupled on a lower end to coupler 52 and pivotally coupled on an upper end to support 70. Actuator 62 is pivotally coupled by fastener 60 to link 58 between its upper and lower ends. Spring 56 is coupled to fastener 68 on one end and coupler 52 by fastener 53 on the opposing end. Brake pad 50 is coupled to coupler 70 and configured to engage the floor. Together, cross member 29, links 54 and 58, and coupler 52 form a conventional four-bar linkage.

To lower brake pad 50 to the floor, actuator 62 is extended to force link 58 in a downward direction. Links 58 and 54 are situated parallel to one another so that as link 58 is moved by actuator 62 coupler 52 and brake pad 50 remain parallel to the floor through the full range of motion of coupler 52. Links 58 and 54 are coupled along a vertical axis an equal vertical distance apart from one another on each end. For example, if the vertical distance between fasteners 64 and 66 on support 70 is three inches, the vertical distance between fasteners 55 and 53 on coupler 52 is also three inches. Actuator 62 exerts sufficient force on link 58 to prevent patient support 10 from rolling on castors 26 when brake mechanism 28 is used in conjunction with brake mechanism 27.

Figure 4:
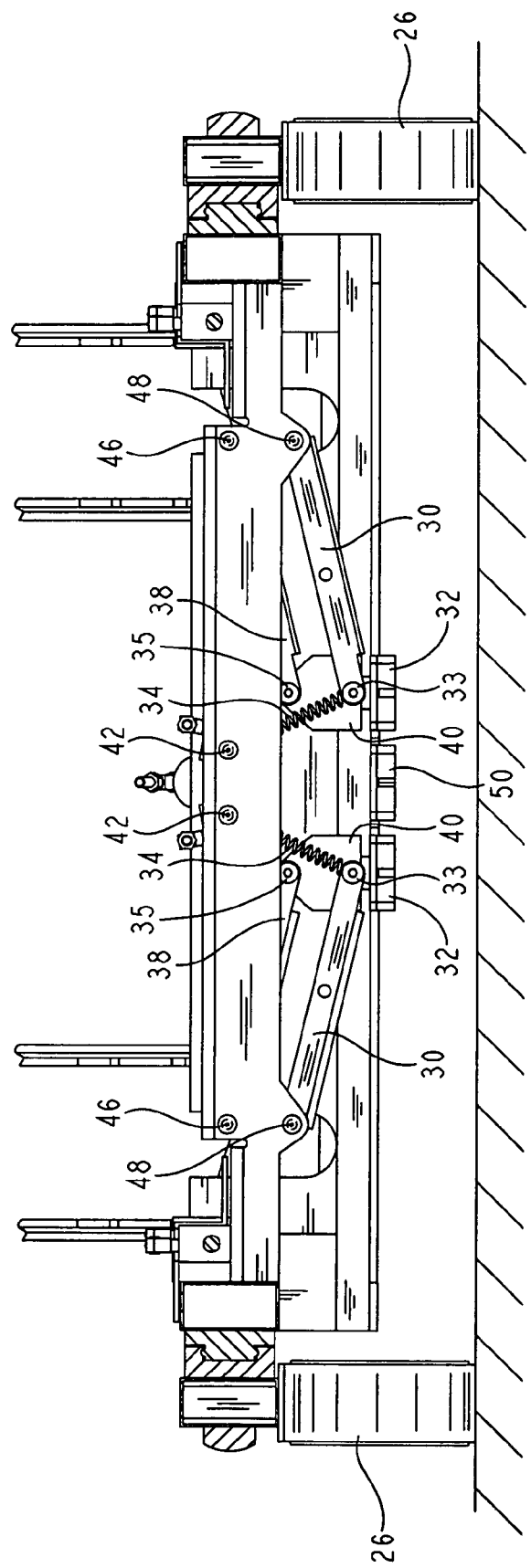
FIG. 4 illustrates an end view of the patient support including the braking system in a retracted position.
Figure 5:
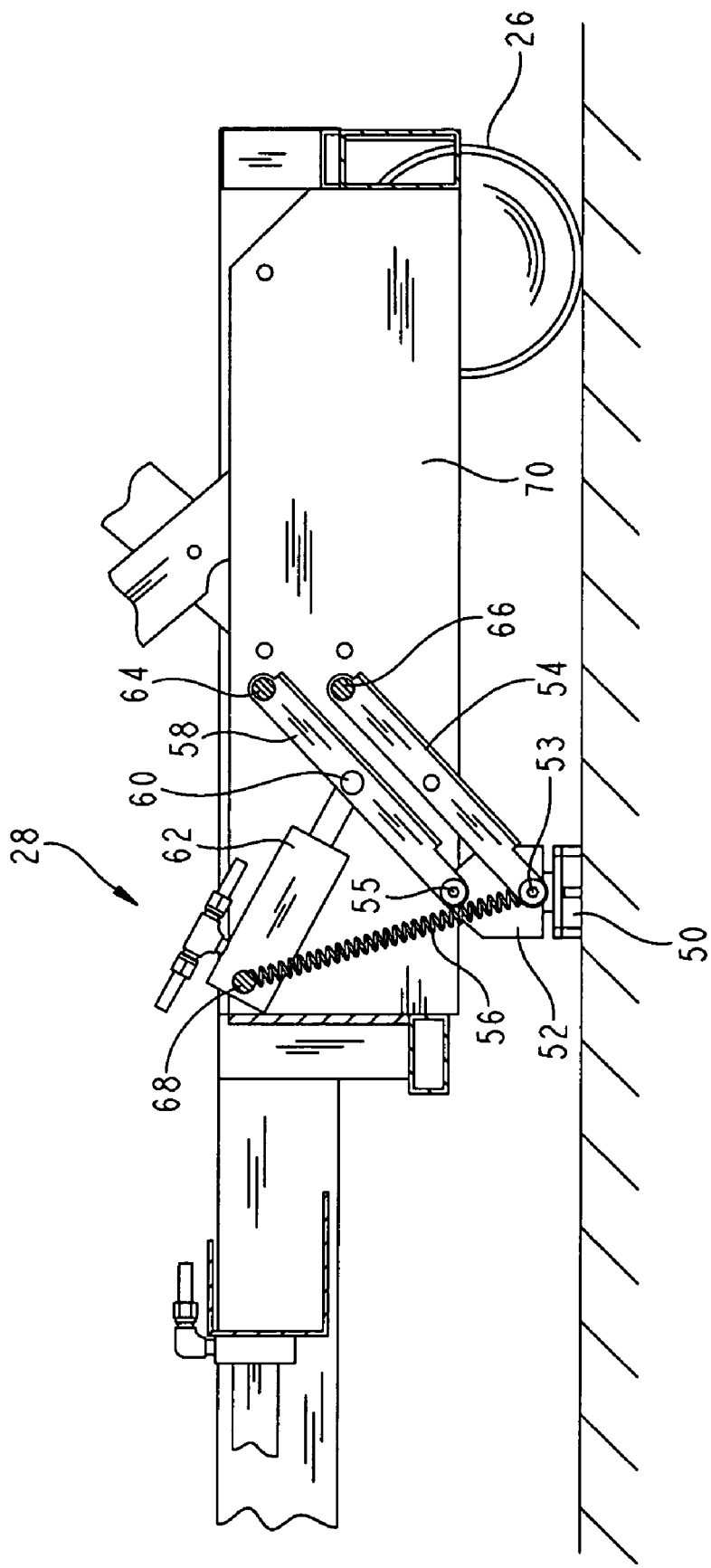
FIG. 5 illustrates a partial side elevation view of the patient support of FIG. 1 including the braking system in an extended position.

To retract brake pad 50 from the floor, actuator 62 ceases supplying the extending force which provides the downward force applied by brake pad 50. In the one embodiment, where the actuator is a hydraulic cylinder, the fluid pressure supplied to the cylinder must be discontinued to allow brake pad 50 to retract. When actuator 62 is deactivated spring 56, which is biased to retract coupler 52 from the floor, will provide sufficient force to raise coupler 52 to a retracted position as shown in FIG. 4. As would be apparent to one of ordinary skill in the art, actuator 62 could also include an electric motor and gear system or any other suitable device as discussed above.

Figure 6:
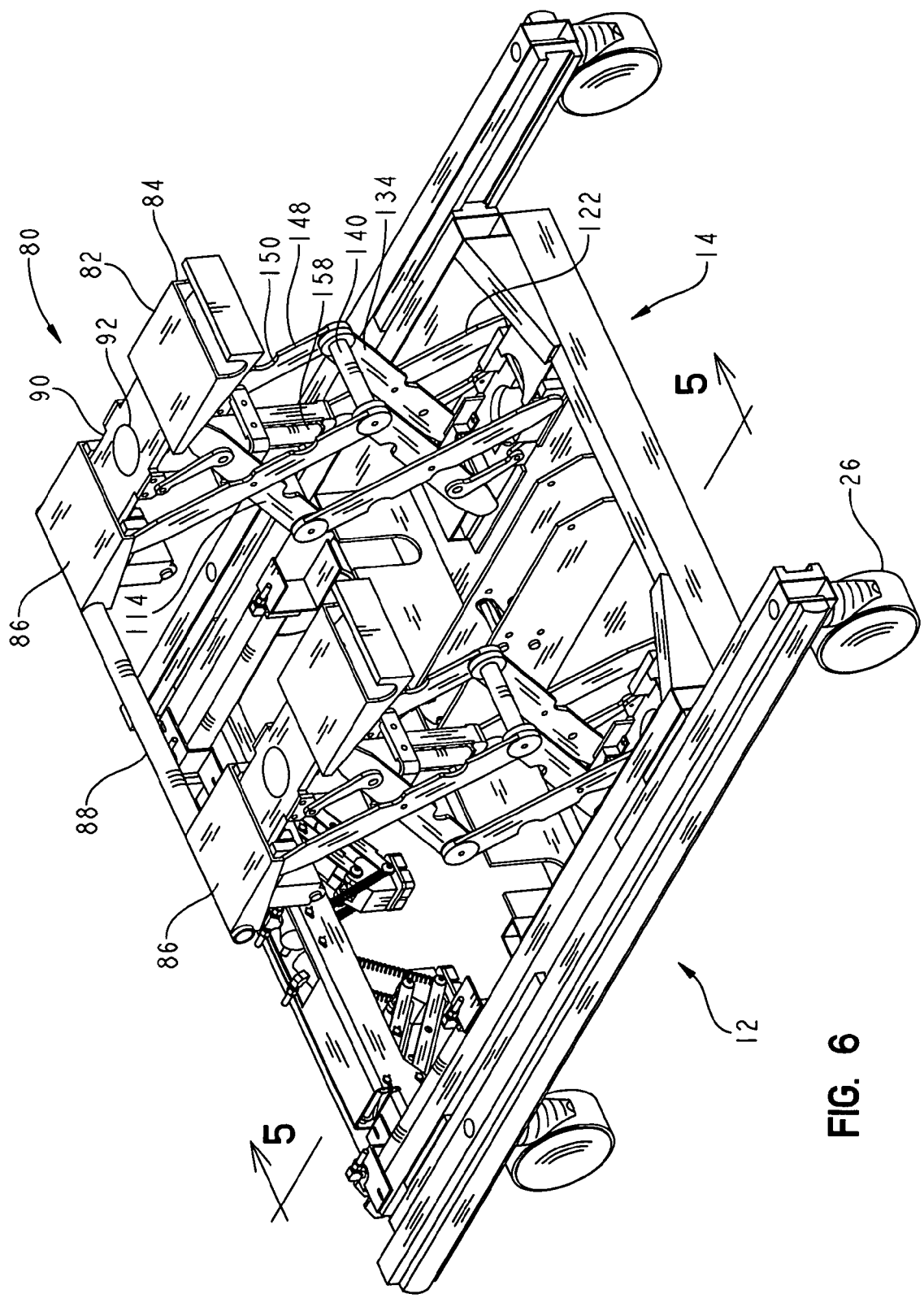
FIG. 6 illustrates a foot end perspective view of a scissor mechanism to raise and lower the deck of the patient support.
Figure 7:
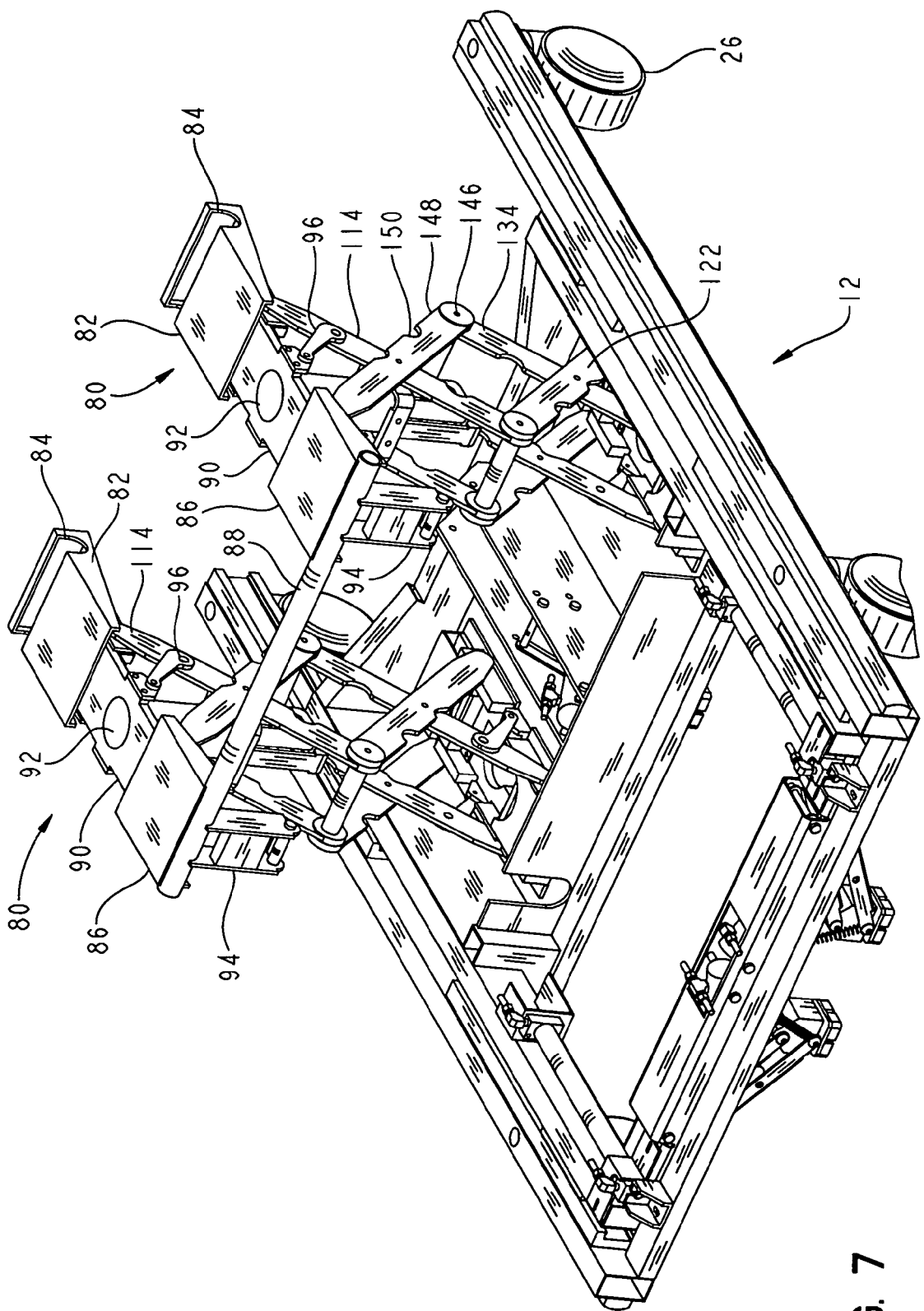
FIG. 7 illustrates a head end perspective view of the scissor mechanism to raise and lower the deck of the patient support.

As shown in FIGS. 6 and 7, patient support 10 includes a pair of scissor mechanisms 80 designed to raise and lower deck 24 relative to base frame 12. Scissor mechanisms 80 are supported by subframe 14. As actuators 158 are extended, links 148, 114, 134, and 122 interact to raise upper plates 90, which support deck 24. The scissor mechanisms 80 are shown in the raised position in FIG. 6. Actuators 158 are rigidly coupled to top plate 90 and provide the power and force necessary to raise and lower upper plates 90. Actuators 158 have expandable lengths to adjust the height of upper plates 90. Actuators 158 are illustratively positioned in carriages 162 and are coupled to bottom surfaces 165 by fasteners extending through apertures 166 in carriages 162. Each of actuators 158 may be a conventional hydraulic cylinder having a cylinder body, cylinder rods, and a pressurized fluid supply such as a pump to supply fluid pressure to extend and/or retract the cylinder rods relative to the cylinder bodies. Actuators 158 are configured to act simultaneously to extend or retract so that upper plates 90 are at the same level through the entire range of motion of scissors mechanisms 80. In an alternative embodiment, electric linear actuators are used instead of hydraulic cylinders to raise and lower upper plates 90.

Figure 8:
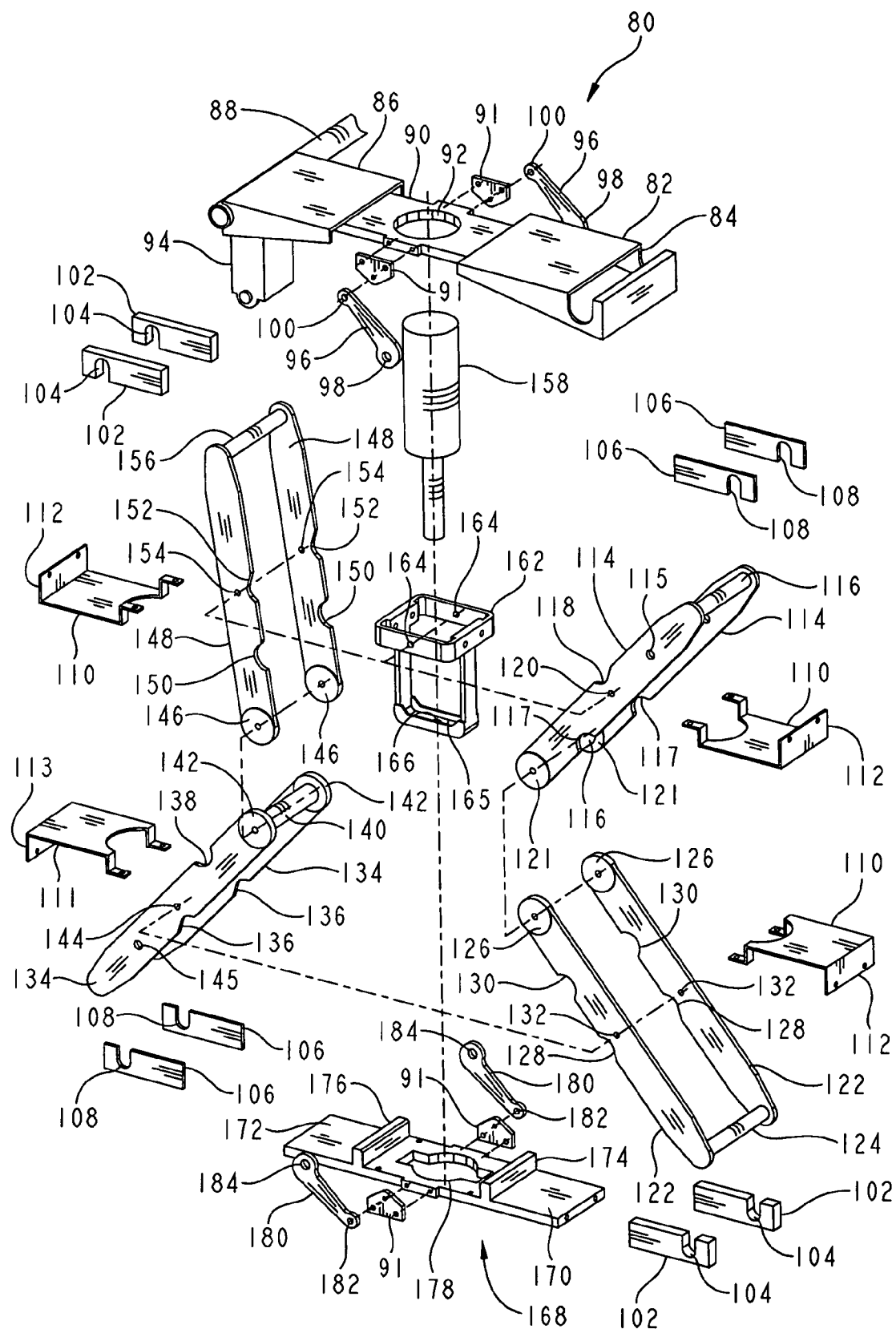
FIG. 8 illustrates an exploded view of the scissor mechanism of the present invention.
Figure 9:
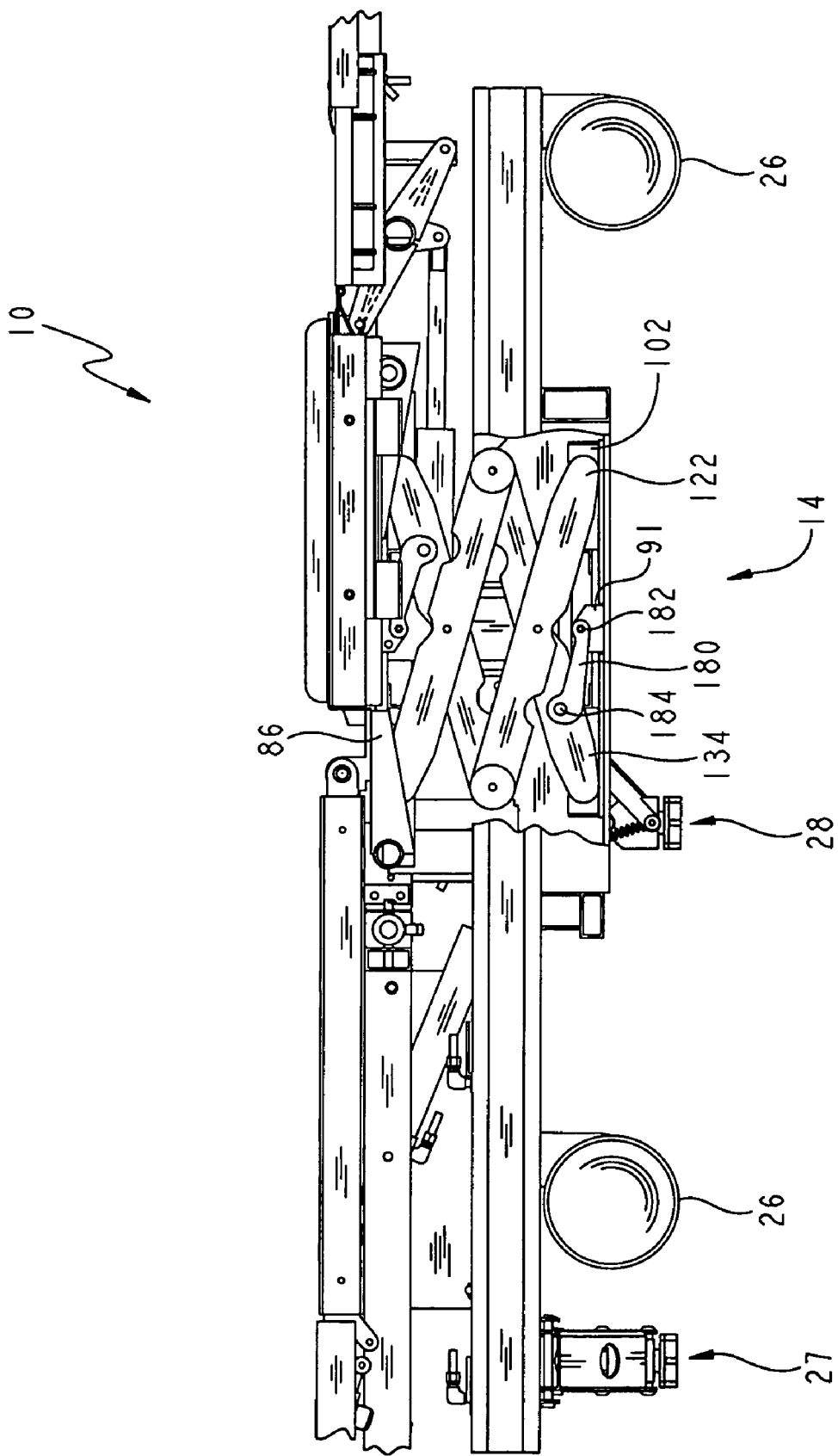
FIG. 9 illustrates a side elevation view of the scissor mechanism coupled to the frame in a lowered position.

Referring now to FIG. 8, scissor mechanisms 80 include an upper plate 90, an actuator 158, a carriage 162, pairs of links 114, 122, 134, and 148, and a lower plate 168. Upper plate 90 includes opening 92 through which actuator 158 is positioned. Surfaces 82 and 86 are coupled to the ends of upper plate 90. Saddle 84 in surface 82 is designed to receive a tube used as a pivot point in the Trendelenburg mechanism which will be explained below. Tube 88 and brackets 94 are coupled to surfaces 86 on each scissor mechanism 80. Tube 88 couples upper plates 90 together and is also used as a pivot point in the Trendelenburg mechanism which will be explained below.

Links 148 are coupled together on the upper end by bar 156. Links 114 are coupled together on both the upper and lower ends by bars 116. Links 148 and 114 are pivotally coupled together and to carriage 162 by inserting fasteners in apertures 154, 120, and 164. Apertures 164 in carriage 162 align with apertures 154 and 120 in the corresponding links. Links 114 are coupled to the interior side of links 148 because the distance between links 148 when coupled together by bar 156 is slightly greater than the distance between links 114 when coupled together by bars 116. Carriage 162 is positioned between the pair of links 114.

The pair of links 122 is rigidly coupled together on a lower end by bar 124. Links 134 are rigidly coupled together on both their upper and lower ends by bars 140 (lower bar not shown). The pair of links 134 and 122 are pivotally coupled together by fasteners at apertures 144 and 132 with links 134 being coupled to the interior side of links 122. The distance between links 122 when coupled together by bar 124 is slightly greater than the distance between links 134 when coupled together by bars 140 (lower bar not shown).

Figure 11:
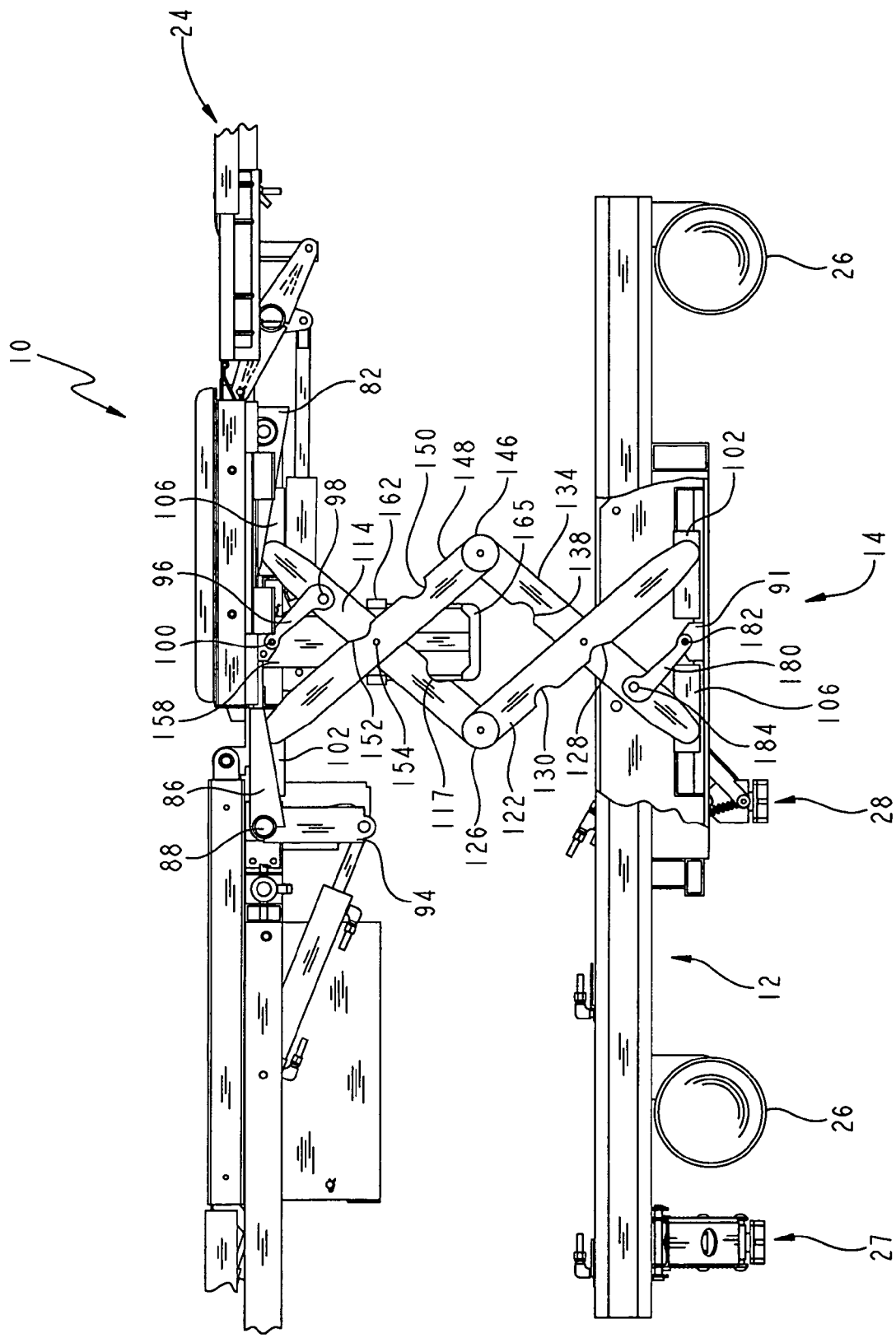
FIG. 11 illustrates a side elevation view of the scissor mechanism in a raised position.

Bars 116 which couple the ends of links 114 together and bars 140 (lower bar not shown) which couple the ends of links 134 together are shorter than bar 156 which couples the upper ends of links 148 together and bar 124 which couples the ends of links 122 together. Bars 116 and 140 are shorter than bars 156 and 124 so that links 114 and 134 can fit between links 148 and 122. Links 134 and links 148 are pivotally coupled together by inserting fasteners in the apertures in ends 146 and 142 with links 146 being positioned outside of links 134. Links 122 and links 114 are pivotally coupled together by inserting fasteners in the apertures in ends 121 and 126 with links 122 being positioned outside of links 114 because the width of the links 122 when coupled together by bar 124 is slightly greater than the width of links 114. The resulting X-shape or scissor-type mechanism is best shown in FIGS. 7 and 11.

As shown in FIG. 8, bottom plate 168 includes opening 178 which is sized to allow carriage 162 and actuator 158 to pass through. As scissor mechanism 80 is being actuated, specifically lowered to the lowest position, carriage 162 and cylinder 158 are lowered through opening 178 to allow deck 24 to sit very low to the ground for easy patient ingress and egress. Bottom plate 168 is substantially similar to top plate 90, with the exception of the shape of opening 178 compared to opening 92 in top plate 90. Ends 170 and 172 of bottom plate 168 include barriers 174 and 176, respectively. Cover 110 is positioned over bar 124 and coupled on end 170 of bottom plate 168. Apertures in surface 112 of cover 110 are designed to receive fasteners to couple cover 110 to end 170 of plate 168. The outer ends of bar 124 are situated in saddles 104 of bearing plates 102 which are positioned adjacent bottom plate 168. Bearing plates 102 slide on a bearing surface (not shown) below plate 168 when scissor mechanism 80 is actuated. As scissor mechanism 80 is lowered top plate 90 is lowered, and bar 124 slides in the channel defined by end 170 and cover 110 until bar 124 contacts surface 112 of cover 110. At this point scissor mechanism 80 is at its lowest position. When scissor mechanism 80 is raised by actuator 158 top plate 90 is raised, and bar 124 slides in the channel defined by end 170 and cover 110 until bar 124 contacts barrier 174 of bottom plate 168. When bar 124 abuts barrier 174, top plate 90 has reached its maximum height and scissor mechanism 80 is at its highest position.

As shown in FIG. 8, end 172 is substantially similar to end 170 of bottom plate 168. Cover 110 is placed over lower bar 140 (not shown), which couples the lower end of links 136 together. Cover 110 is coupled to end 172 of bottom plate 168. The apertures in surface 112 of cover 110 receive fasteners to couple cover 110 to end 172 of bottom plate 168. Bar 140 slides in the channel defined by end 172 of bottom plate 168 and cover 110. The outer ends of bar 140 (not shown) are positioned in saddles 108 of bearing plates 106. Bearing plates 106 are positioned adjacent end 172 of bottom plate 168. Bearing plates 106 are configured to slide on a bearing surface (not shown) located beneath bottom plate 168. As scissor mechanism 80 is lowered, top plate 90 is lowered, and bar 140 slides in the channel defined by end 172 and cover 110 until bar 140 contacts surface 112 of cover 110. At this point scissor mechanism 80 is at its lowest position. When scissor mechanism 80 is raised by actuator 158, top plate 90 is raised, and bar 140 slides in the channel defined by end 172 and cover 110 until bar 140 contacts barrier 176 of bottom plate 168. When bar 140 abuts barrier 176, scissor mechanism 80 has reached its maximum height.

The bottom side of top plate 90 is substantially similar to the top side of bottom plate 168. The bottom side of top plate 90 includes a pair of barriers substantially similar to barriers 174 and 176 on the top side of bottom plate 168. Covers 110 are positioned to enclose bars 156 and 116 when covers 110 are coupled to the bottom side of the ends of top plate 90. The outside ends of bars 156 and 116 are positioned in saddles 108 and 104 of bearing plates 106 and 102, respectively. Bearing plates 102 and 106 are designed to slide on a bearing surface (not shown) located above or adjacent to top plate 90. Bars 156 and 116 slide in the channels defined by the barriers in the bottom side of top plate 90 and covers 110. As scissor mechanism 80 is lowered, top plate 90 is lowered and bars 116 and 156 slide in the channels defined by the barriers on the bottom side of top plate 90 and covers 110 until the bars contact surfaces 112 of cover 110. At this point scissor mechanism 80 is at its lowest position. When scissor mechanism 80 is raised by actuator 158 top plate 90 is raised, and bars 116 and 156 slide in the channels until the bars contact barriers (not shown) on the bottom side of top plate 90. When bars 116 and 156 abut these barriers, top plate 90 has reached its maximum height.

As shown in FIG. 8, bars 156 and 124 are positioned in saddles 104 of bearing plates 102 and bars 116 and 140 are positioned in saddles 108 of bearing plates 106. On the upper portion of scissor mechanism 80 the bearing plates 102, 106 are designed to support bars 156 and 116 between top plate 90 and the interior surface of links 148 and 114. On the lower portion of scissor mechanism 80 the bearing plates 102, 106 are designed to support bars 124 and 140 (not shown) between bottom plate 168 and the interior surface of links 134 and 122. Bearing plates 106 are thinner than bearing plates 102 because bars 116, which couple the ends of links 114 together, and bars 140 (lower bar not shown), which couple the ends of links 134 together, are shorter than bar 156, which couples the upper ends of links 148 together, and bar 124, which couples the ends of links 122 together. Bearing plates 102 are thicker than bearing plate 106 to accommodate for the extra length of the bars 156 and 124.

As shown in FIGS. 8-11, plates 91 are rigidly coupled to both sides of top plate 90 and bottom plate 168. Control links 96 and 180 cooperate with links 114 and 134 to keep upper plate 90 and lower plate 168 parallel to one another through the full range of motion of scissor mechanism 80. Lower control links 180 are pivotally coupled to lower plates 91 by ends 182. Ends 184 of lower control links 180 are pivotally coupled to apertures 145 in links 134. Ends 100 of upper control links 96 are pivotally coupled to upper plates 91. Ends 98 of control links 96 are pivotally coupled to apertures 115 in links 114. To keep top plate 90 and bottom plate 168 parallel to each other through the full range of motion of scissor mechanism 80, control links 96 and 180 are of equal length and are coupled to links 114 and 134 at a point which is the same distance from the ends of links 134 and 114. For example, if ends 98 of upper control links 96 are coupled to links 114 three inches from the upper ends of links 114 then the end 184 of lower control links 180 are coupled to links 134 three inches from the end of links 134.

Figure 10:
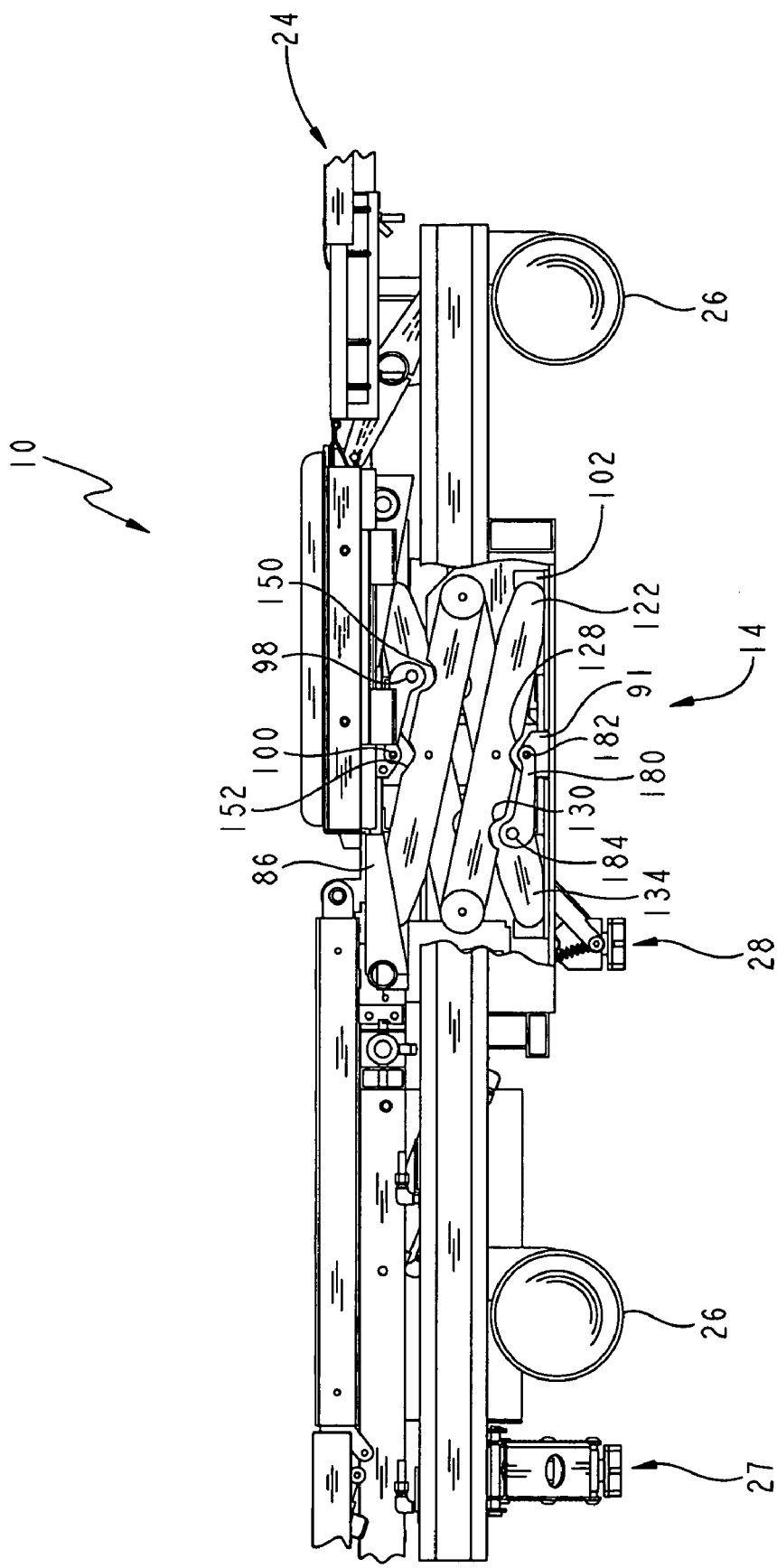
FIG. 10 illustrates a side elevation view of the scissor mechanism in a lowest position.

Referring now to FIGS. 8-12, notches 128, 130 in links 122 are included to allow clearance for ends 182 and 184, respectively, of lower control links 180 when scissor mechanism 80 is in the lowest position, as shown in FIG. 10. Similarly, notches 150 and 152 in links 148 are included to allow clearance for ends 98 and 100, respectively, of upper control links 96 when scissor mechanism 80 is positioned in the lowest position, as shown in FIG. 10. Notches 138 in links 134 are configured to correspond with notches 150 in links 148 when scissor mechanism 80 is in the lowest position and allow clearance for ends 98 of upper control link 96. Notches 136 in links 134 are configured to allow clearance for plates 91, which are coupled to bottom plate 168, when scissor mechanism 80 is in the lowest position. Similarly, notches 118 in links 114 are configured to allow clearance for plates 91, which are coupled to top plate 90, when scissor mechanism 80 is in the lowest position. Notches 117 in links 114 are configured to correspond to notches 130 in links 122 and allow clearance for ends 184 of lower control link 180 when scissor mechanism 80 is in the lowest position.

To raise or lower scissor mechanism 80, the user activates actuators 158. When actuators 158 are extended, deck 24, which is supported by upper plates 90, is raised relative to the floor. Links 114, 148, 134, and 122 interact to raise upper plate 90 which supports deck 24. When the extending force or pressure of actuator 158 is relieved, deck 24 is lowered.

Figure 12:
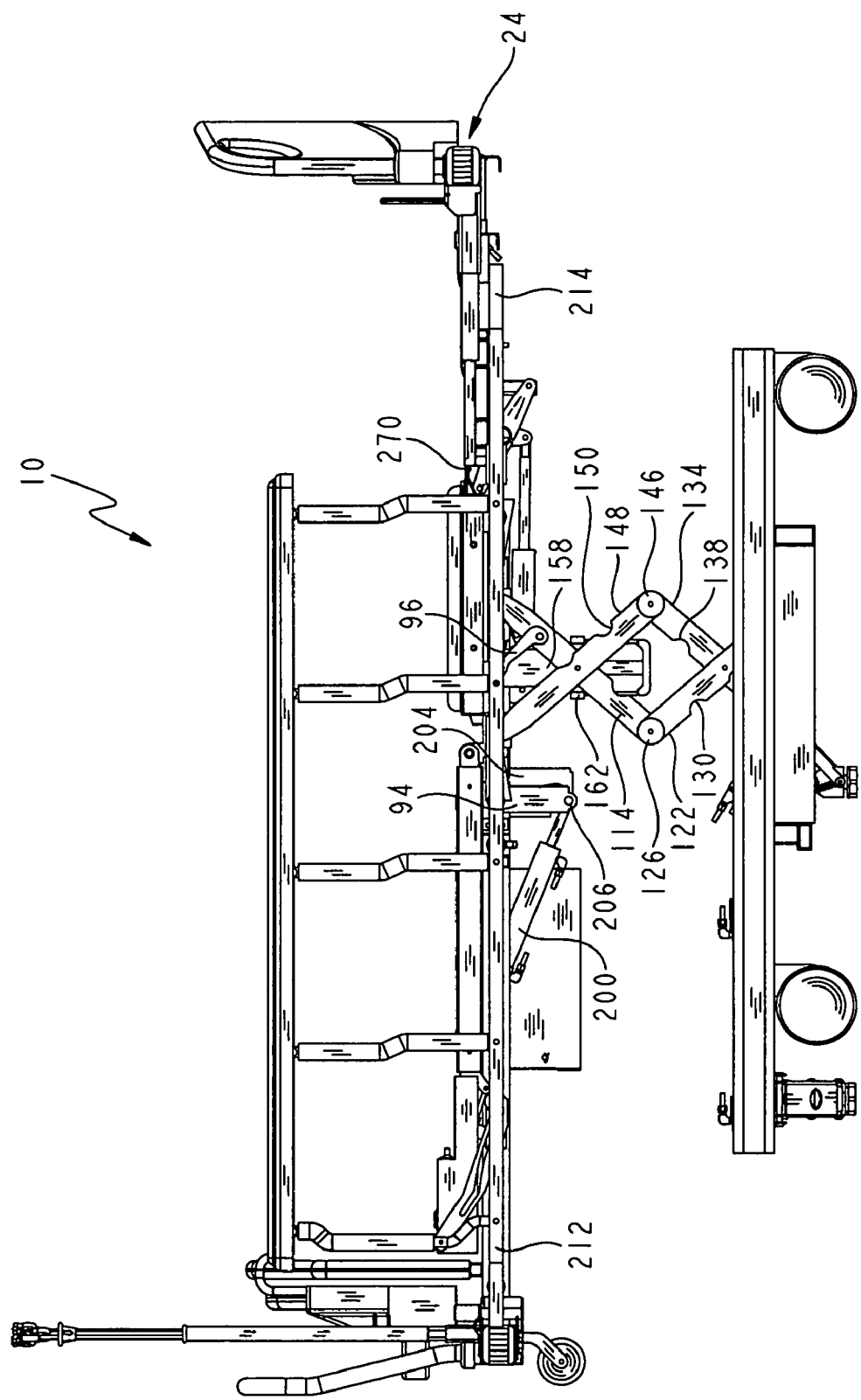
FIG. 12 illustrates a side elevation view of the patient support including the deck and frame having a scissor mechanism coupled therebetween in a raised position.
Figure 13:
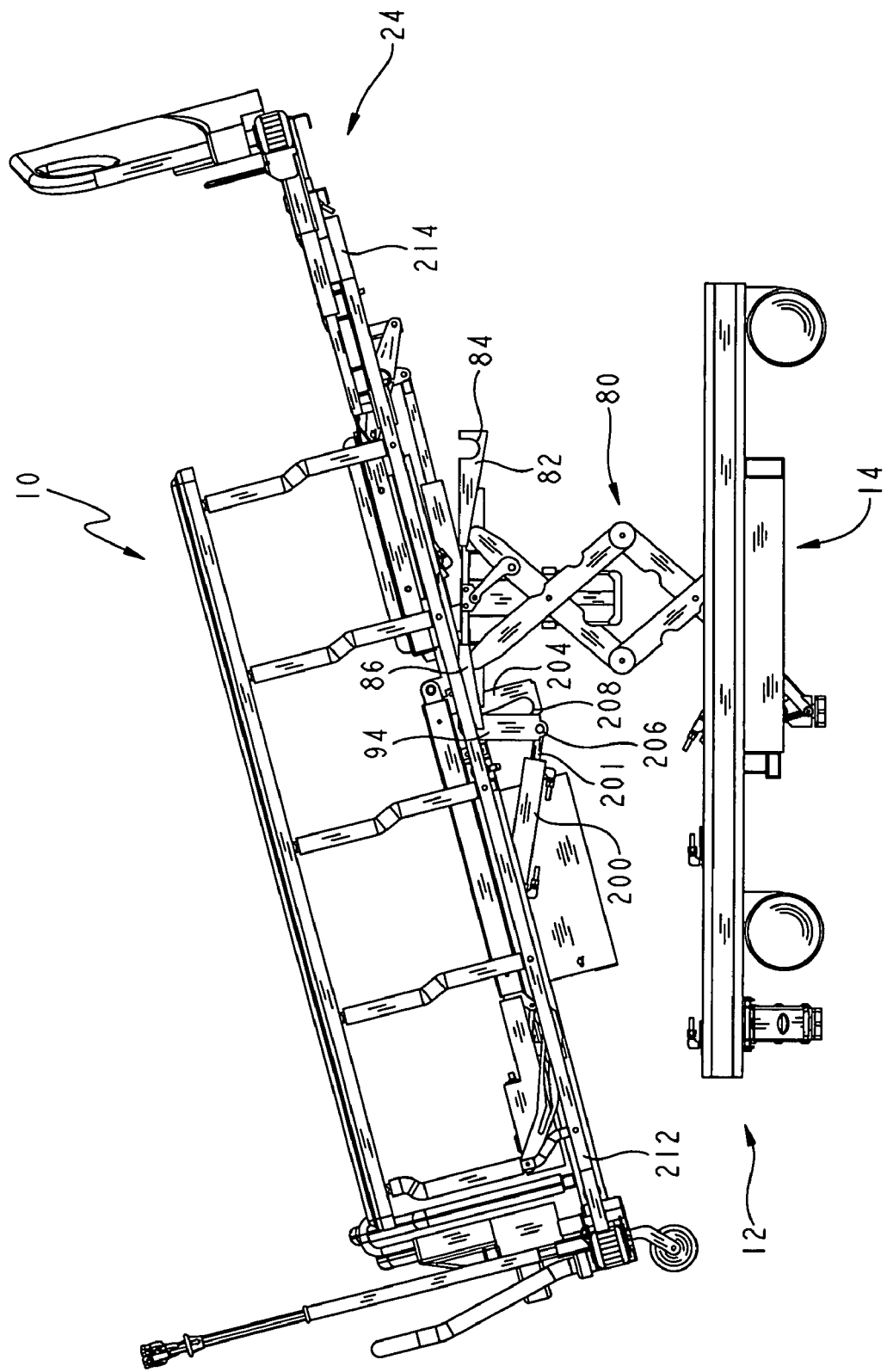
FIG. 13 illustrates the patient support of the present invention having the deck placed in the Trendelenburg position.
Figure 14:
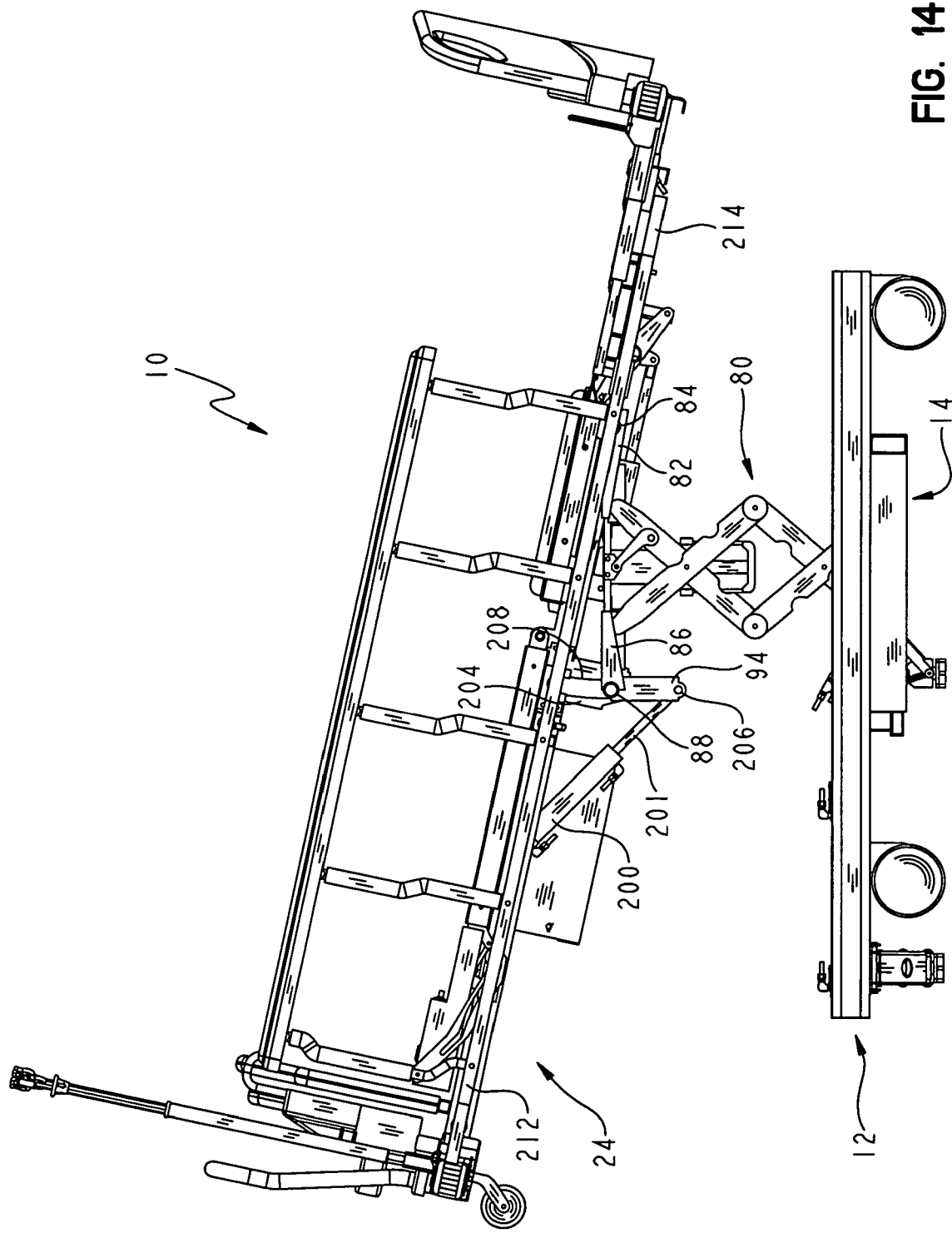
FIG. 14 illustrates the patient support of the present invention having the deck placed in the reverse Trendelenburg position.

As shown in FIG. 12, deck 24 of patient support 10 can be configured in a substantially flat orientation which is parallel to the floor. Patient support 10 can also be configured in the Trendelenburg and Reverse Trendelenburg positions as shown in FIGS. 13 and 14. When deck 24 is substantially parallel to the floor as shown in FIG. 12, deck 24 is supported by a top surface of slot 208 engaging tube 88 and by spring tube 210 engaging saddle 84. When deck 24 is inclined or declined to place it in the Trendelenburg position or Reverse Trendelenburg position, deck 24 is pivoted about tube 88 or spring tube 210, respectively.

Figure 15:
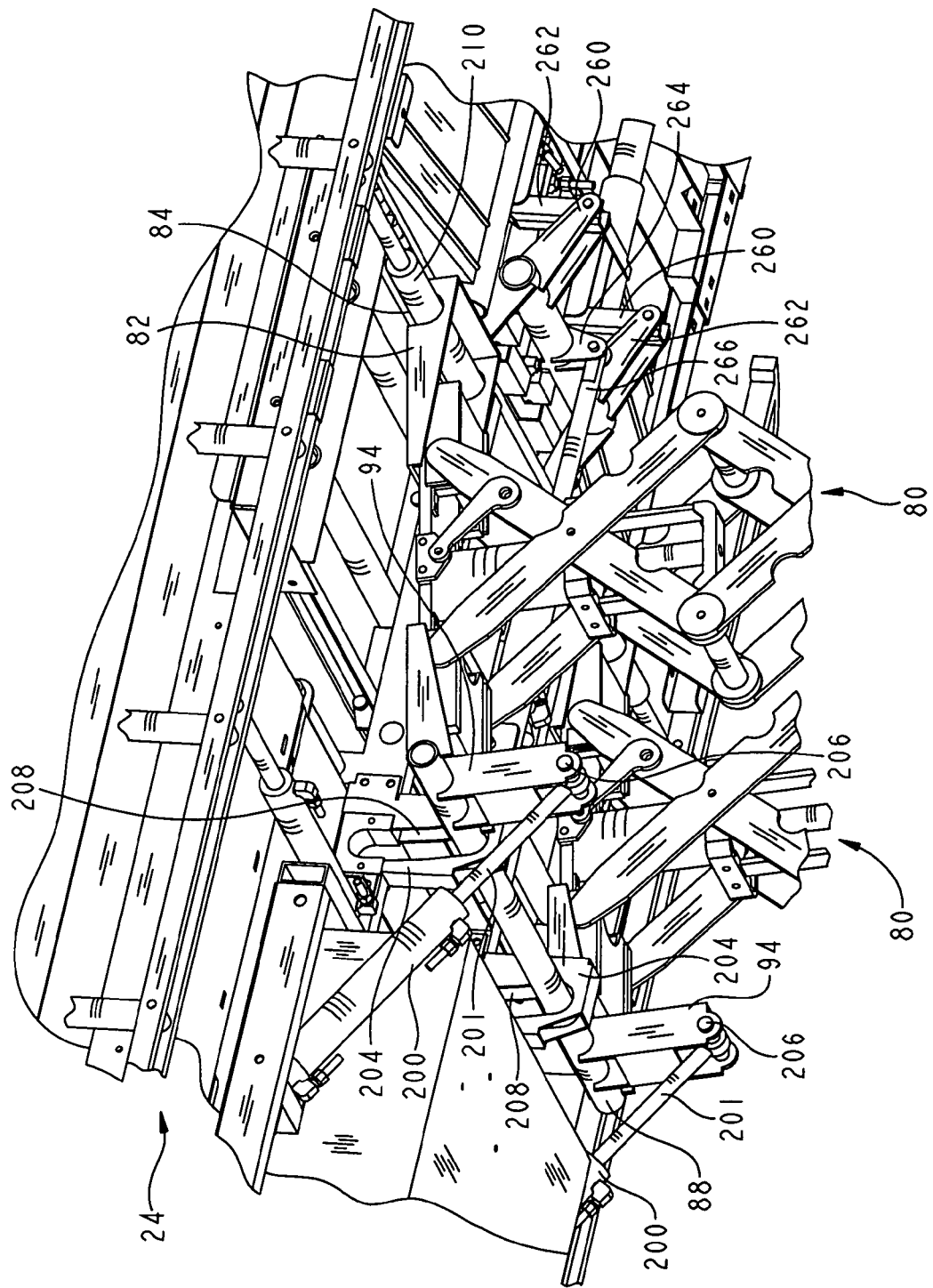
FIG. 15 illustrates a perspective side view of the scissor mechanism of the present invention coupled to the deck with the deck placed in the reverse Trendelenburg position.

As shown in FIG. 15, actuators 200 are pivotally coupled to deck 24 at first ends and pivotally coupled to supports 94 by pins 206 on the opposing second ends. Actuators 200 provide the power and force necessary to raise or lower an end of deck 24. Actuators 200 have expandable lengths to adjust the angular position of deck 24 relative to top plate 90 so that deck 24 can be inclined or declined on one end. Each of actuators 200 may be a conventional hydraulic cylinder having respective cylinder bodies, cylinder rods, and pumps to supply fluid pressure to extend and/or retract the cylinder rods relative to the cylinder bodies. Actuators 200 are configured to act simultaneously to extend or retract so that each side of deck 24 remains level through the entire range of motion of deck 24.

As shown in FIGS. 13-15, guides 204 are coupled to the bottom side of deck 24 and each include a curved shaped slot 208. Tube 88 which is rigidly coupled to top plate 90 rides in slots 208 of guides 204. Guides 204 are rigidly coupled to the bottom side of deck 24. Spring tube 210 rests in saddles 84 in ends 82 which are rigidly coupled to top plate 90. To place a patient in the Trendelenburg position as shown in FIG. 13, actuators 200 are actuated to retract the cylinder rods 201. As actuators 200 retract rods 201, the head end 212 of deck 24 is lowered and the foot end 214 of deck 24 is raised as deck 24 pivots about tube 88 in the upper portion of slot 208 in guide 204.

Referring now to FIGS. 14 and 15, deck 24 can also be placed in the Reverse Trendelenburg position by extending rods 201 from actuators 200. As rods 201 extend, foot end 214 is lowered and head end 212 is raised relative to the floor as deck 24 raises and pivots around spring tube 210, which is positioned in saddles 84. In one embodiment, actuators 200 are two-way cylinders which are powered for both extension and retraction. Guide 204, which is coupled to deck 24, rises relative to surface 86. Tube 88 remains stationary as slots 208 of guides 204 pass over tube 88. Actuators 200 are at their maximum extended position when tube 88 contacts the bottom of slots 208 in guides 204 as shown in FIGS. 14 and 15.

Figure 16:
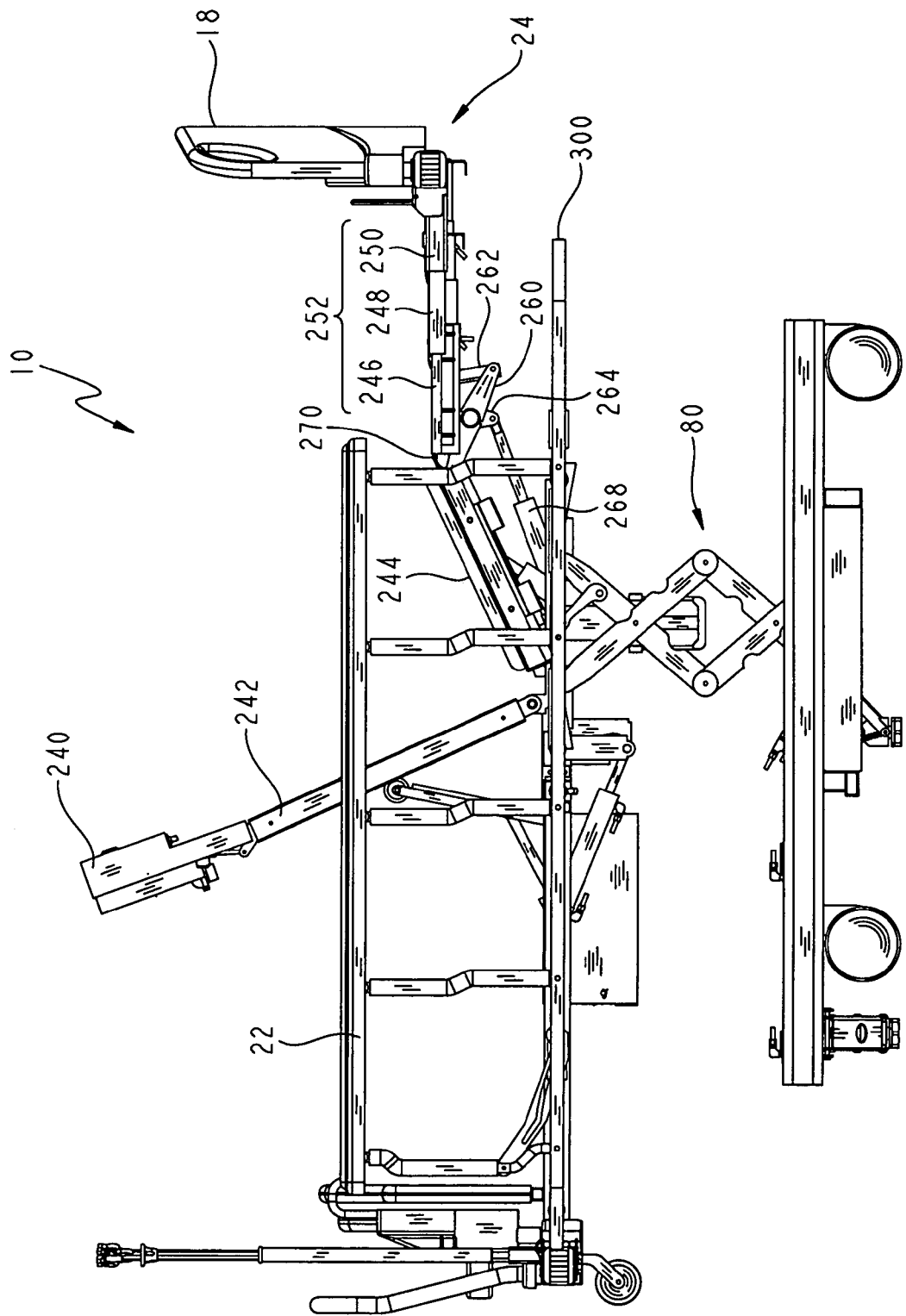
FIGS. 16-17 illustrate a side elevation view of the patient support being reconfigured to place the deck in a chair type position.
Figure 17:
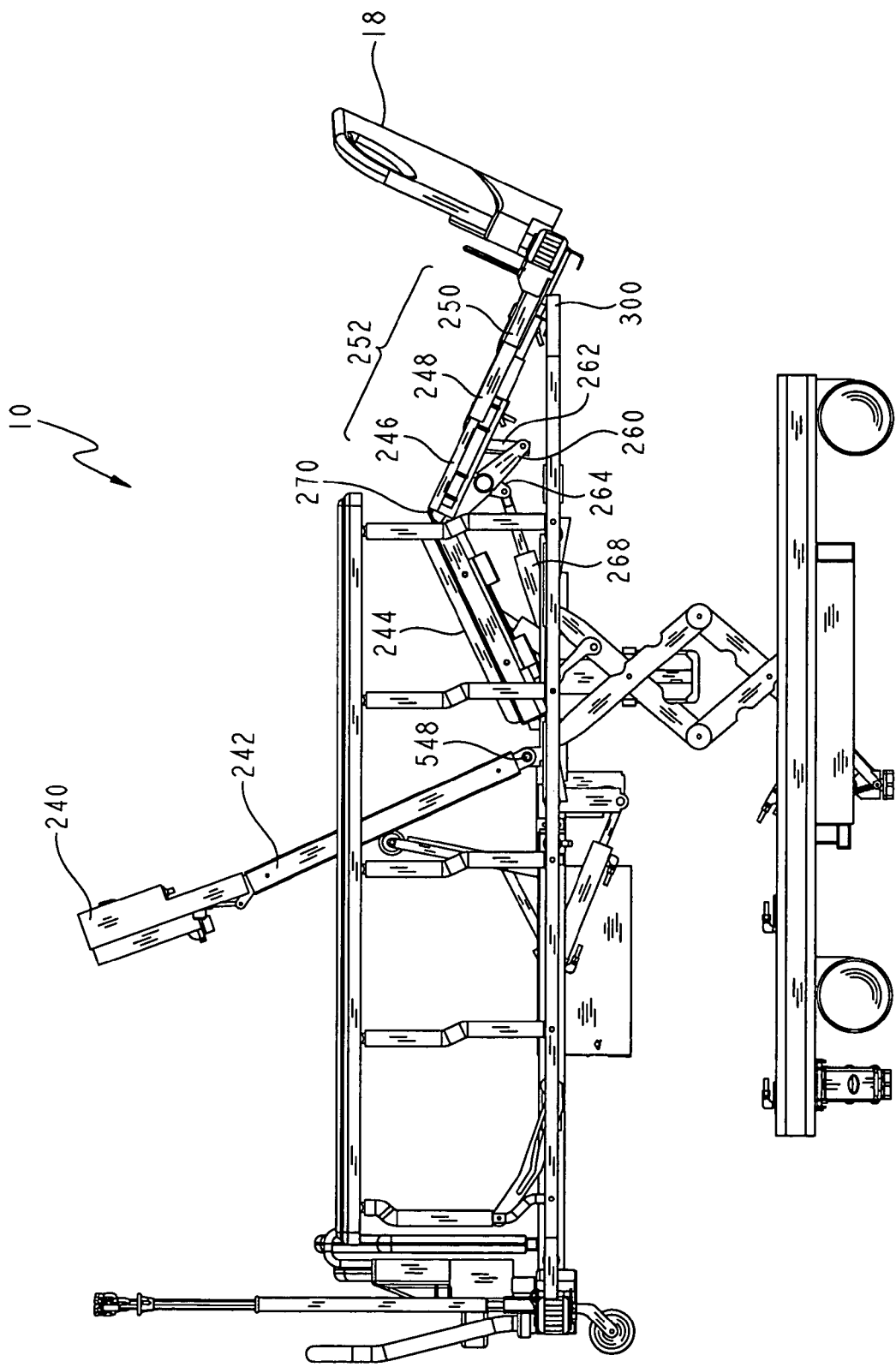

As shown in FIGS. 16-17, patient support 10 can be reconfigured from a substantially flat surface into a chair-type platform. Back section 242 and head section 240 can be elevated from a flat position supported by frame rail 300 to an inclined position. The lower portion of seat section 244 can be elevated to cooperate with back section 242 to produce a chair-like position. Foot section 252 which includes foot plates 246, 248, and 250 and seat section 244 are coupled together by hinge 270. The angle between foot section 252 and seat section 244 can be varied to provide optimum patient comfort. Foot section 252 can be inclined or declined relative to seat section 244. Actuator 268 is pivotally coupled to the bottom side of seat section 244 on one end and pivotally coupled to tab 264 of link 260 on the opposing end. Actuator 268 provides the power and force necessary to change the angular relationship between seat section 244 and foot section 252.

Actuator 268 has an expandable length to adjust the angular position of foot section 252 relative to seat section 244. In one embodiment, actuator 268 is a conventional hydraulic cylinder having a respective cylinder body, cylinder rod, and pump to supply fluid pressure to extend and/or retract the cylinder rod relative to the cylinder body. Link 260 is pivotally coupled to the bottom side of seat section 244 on one end and pivotally coupled to post 262 on the other end. Post 262 is pivotally coupled to the back side of foot plate 246 and extends downwardly from foot section 252.

Figure 18:
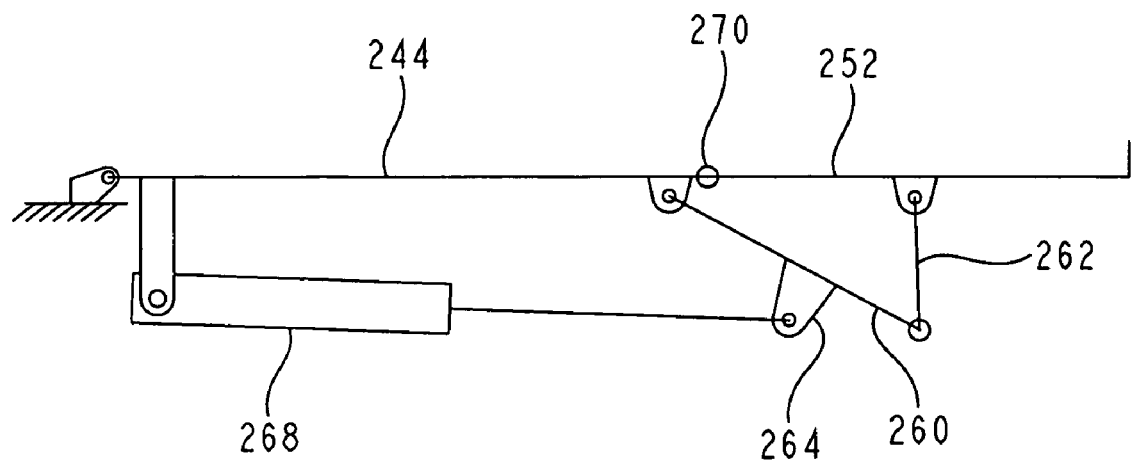
FIG. 18 illustrates a schematic representation of a seat section and foot section forming a substantially flat surface when an actuator is extended.
Figure 19:
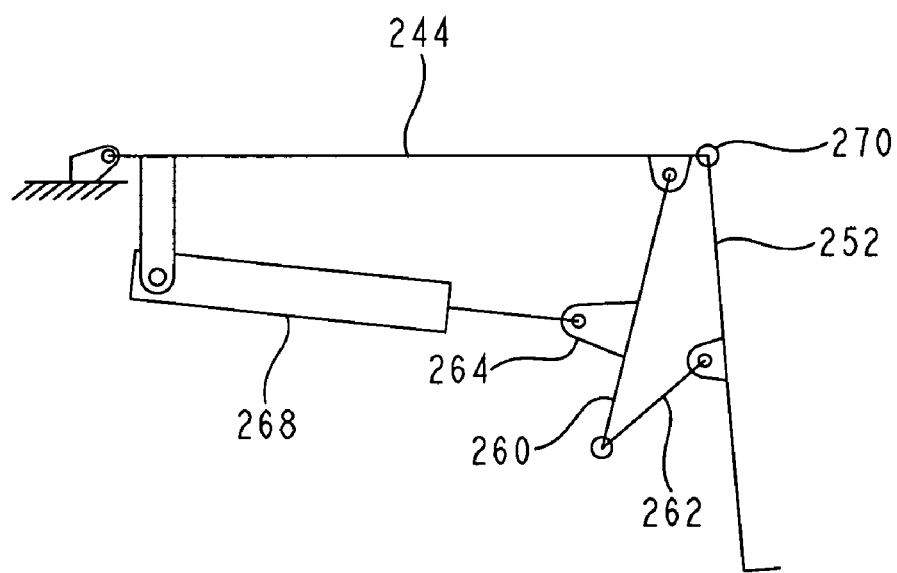
FIG. 19 illustrates a schematic diagram of the seat section and foot section illustrating an actuator in a retracted position to cause the foot section to pivot downward.
Figure 20:
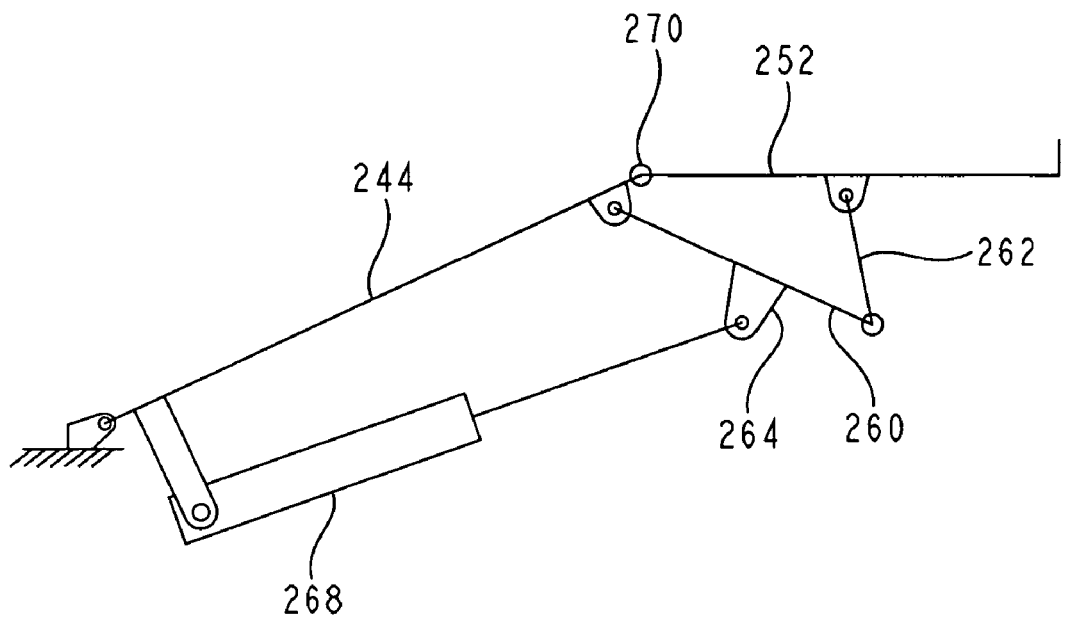
FIGS. 20-21 illustrate a schematic diagram of the foot section being moved relative to the seat section when the seat section is in an inclined position.
Figure 21:
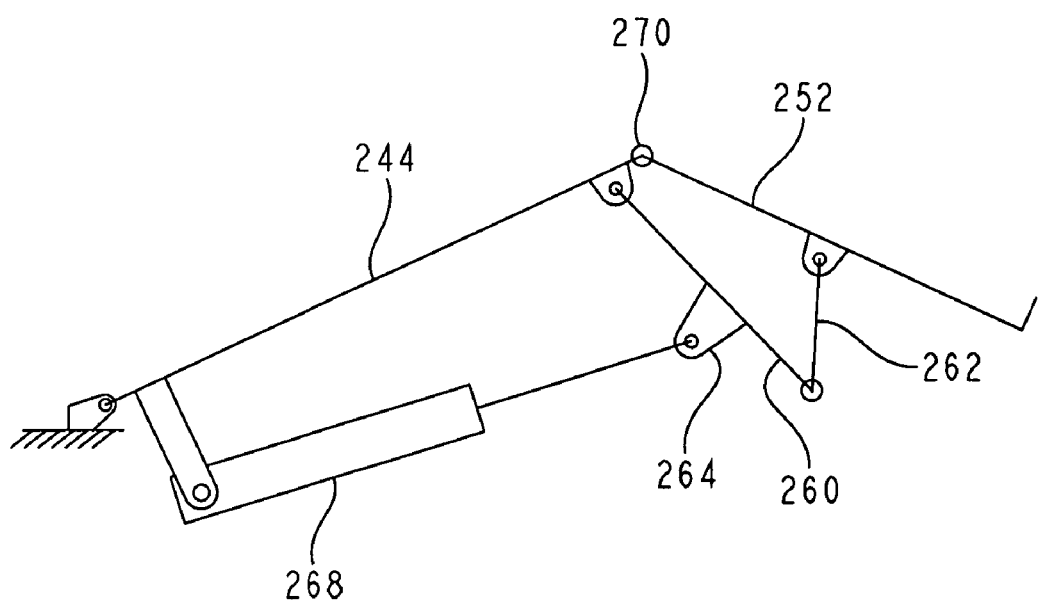
Figure 22:
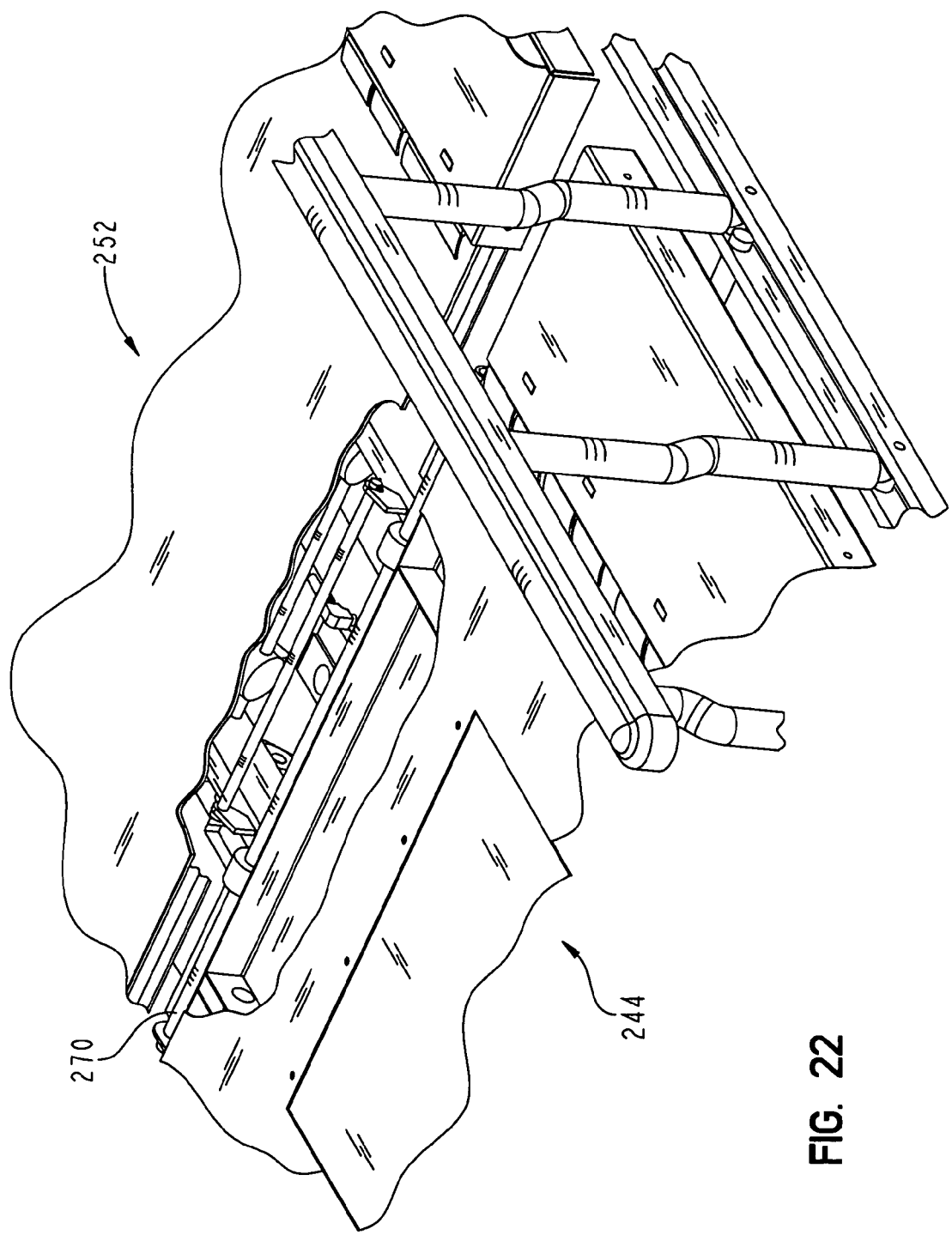
FIG. 22 illustrates a partial top perspective view of the foot section of the patient support extended to increase the length of the deck.

As shown in FIGS. 18-19, seat section 244 and foot section 252 form a substantially flat surface when actuator 268 is extended. If actuator 268, link 260 pivots downward causing link 262 to pivot on each end which causes foot section 252 to pivot downward about hinge 270. As shown in FIGS. 20, 21 and 22, foot section 252 can also be moved relative to seat section 244 when seat section 244 is in an inclined position, rather than in a substantially flat position. Again, as actuator 268 is extended, link 260 is forced to pivot in an upward direction, thereby raising link 262 and causing foot section 252 to pivot upward about hinge 270. If the extending force or pressure is discontinued actuator 268 is retracted and foot section 252 is lowered.

Figure 23:
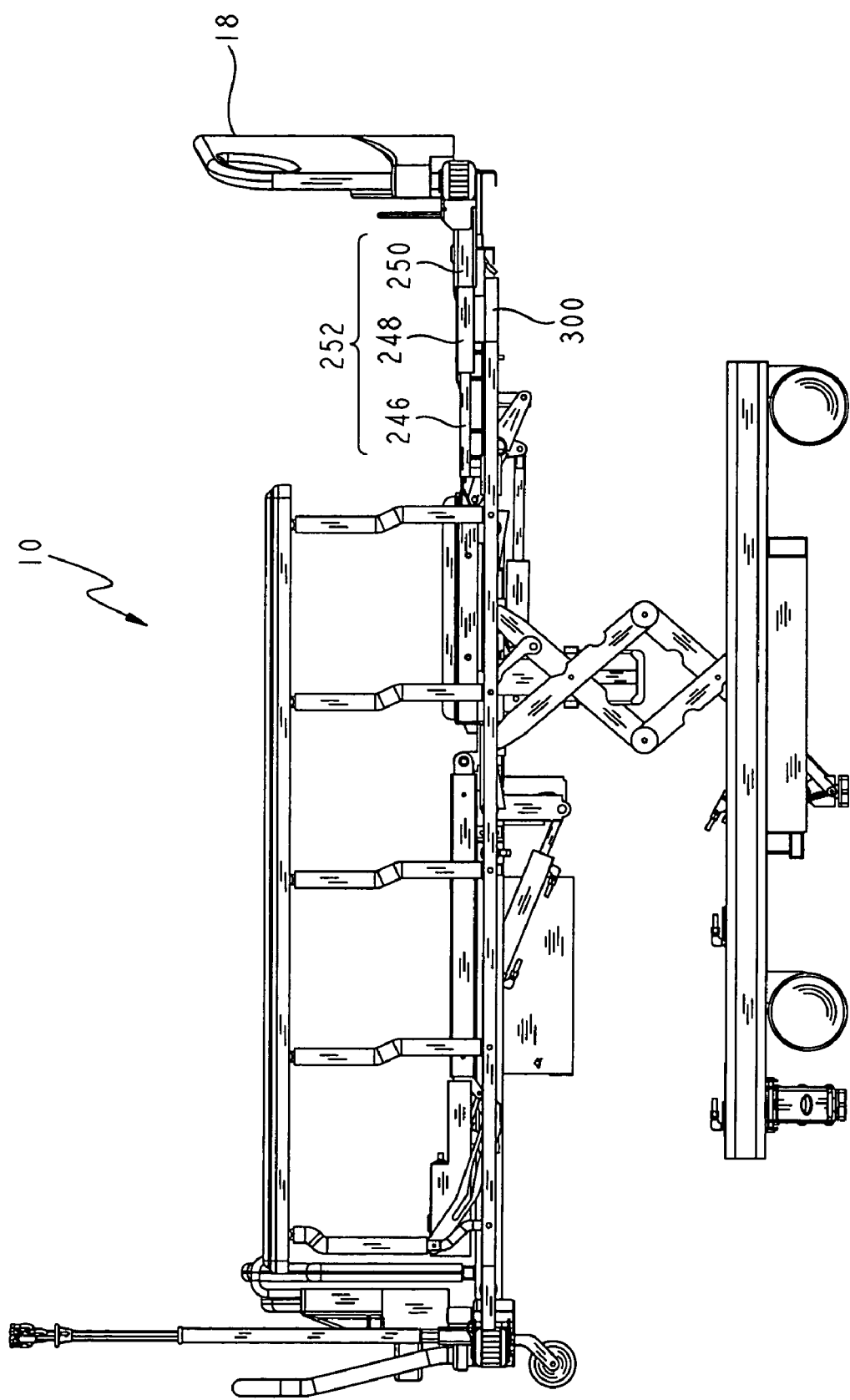
FIGS. 23-24 illustrate a side elevation view of the patient support having the foot section extended to increase the length of the deck.
Figure 24:
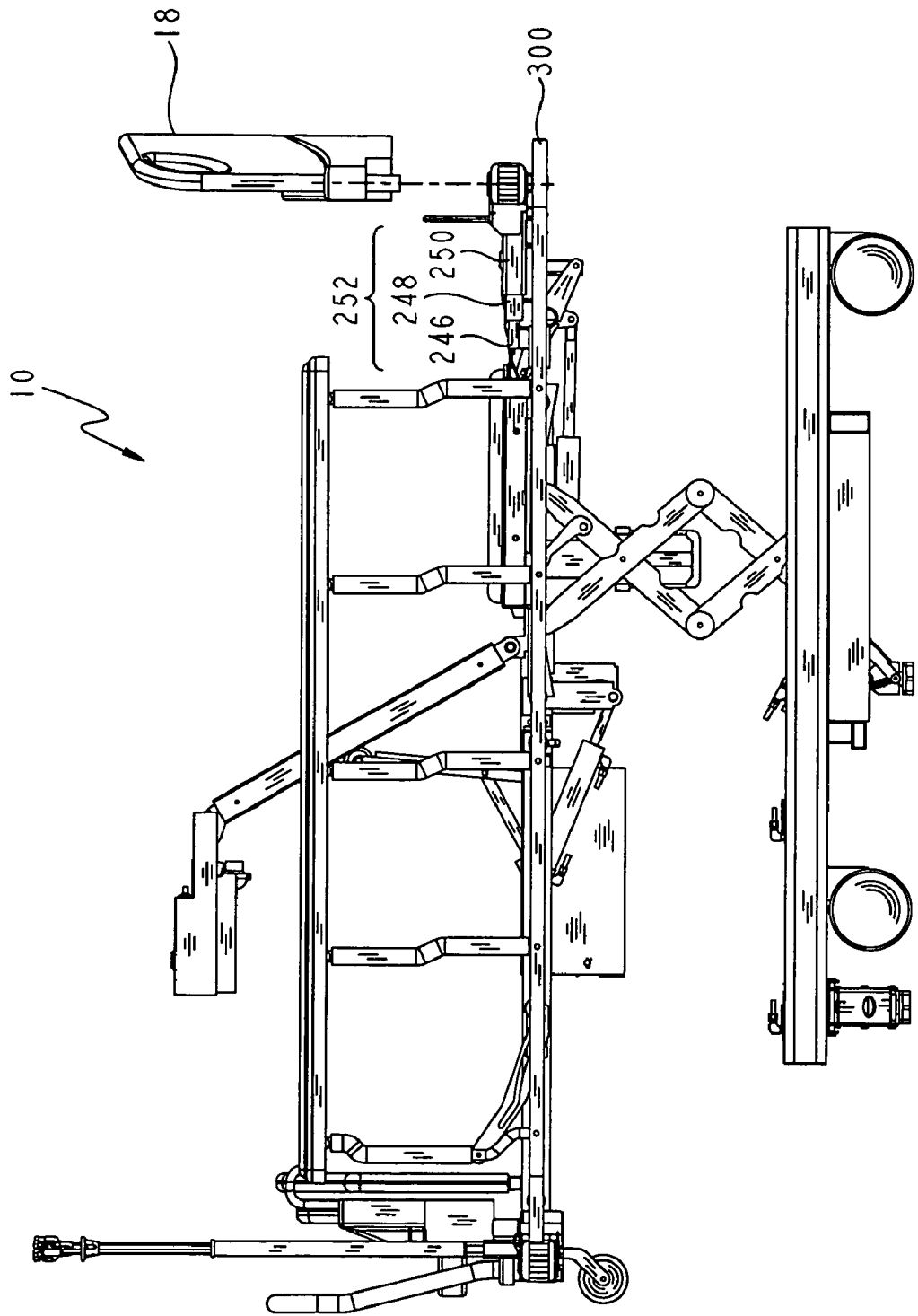

As shown in FIGS. 23 and 24, foot section 252 of patient support 10 can be extended to increase the length of deck 24. Foot section 252 includes foot plates 246, 248, and 250. Foot plate 246 is the base section and is directly coupled to seat section 244 by hinge 270. Foot plate 248 is sized slightly larger than plate 246 and overlaps the top side and edges of foot plate 246. Foot plate 248 is configured to extend from foot plate 246 by sliding over foot plate 246. Foot plate 250 is sized slightly larger than section 248 and overlaps the top side and edge of foot plate 246. Foot plate 250 is extended from section 248 by sliding over section 248.

Referring now to FIGS. 25-29, foot plate 250 includes side rollers 304, mattress support 302, surface 312, guide tubes 306, and overlay slides 322. Surface 312 is perpendicular to foot plate 250 and rigidly coupled to the end of foot plate 250. Guide tubes 306 are rigidly coupled to surface 312. Side rollers 304 are coupled to the two corners of foot plate 250 formed by surface 312. Mattress support 302 is removably coupled to the top side of foot plate 250 to prevent a mattress or overlay placed on foot plate 250 from sliding off the foot end of deck 24. Overlay slides 322 couple to the edge of the top side of foot plate 250 that slides over foot plate 248. Overlay slides 322 include raised tabs configured to prevent snags or tears in a mattress or overlay placed on deck 24 especially when foot section 252 is extending or retracting.

Foot plate 248 includes surface 314, guide tubes 307, overlay slides 322, and actuator 308. Surface 314 is perpendicular to foot plate 248 and is rigidly coupled on the bottom side of the end of foot plate 248, which is overlapped by foot plate 250. Overlay slides 322 are coupled to the end of the top side of foot plate 248 which overlaps foot plate 246. Guide tubes 307 which are rigidly coupled to openings in surface 314 extend through surface 314 and are configured to receive guide tubes 306. Guide tubes 307 are sized to slide within guide tubes 309 in section 246. Actuator 308 provides the power and force necessary to extend foot plate 250 from foot plate 248. Actuator 308 has an expandable length to slide foot plate 250 over foot plate 248. In one embodiment, actuator 308 is a conventional hydraulic cylinder having a respective cylinder body, a cylinder rod, and a pump to supply fluid pressure to extend and/or retract the cylinder rod relative to the cylinder body. The cylinder body of actuator 308 is rigidly coupled to apertures 325 in surface 314. The cylinder rod of actuator 308 is rigidly coupled to surface 312 of foot plate 250 at apertures 305. The cylinder rod of actuator 308 extends through surface 314 at opening 325.

Foot plate 246 which is pivotally coupled to seat section 244 by hinge 270 includes guide tubes 309, surface 316, and actuators 310. Guide tubes 309 are rigidly coupled to surface 316 and extend through openings in surface 316 to receive guide tubes 307. Opening 320 in surface 316 is configured to allow the cylinder body of actuator 308 to pass through during extension and retraction of foot section 252. Actuators 310 are similar to actuator 308. Actuators 310 provide the power and force necessary to extend foot plate 248 from foot plate 246. Actuators 310 have expandable lengths to slide foot plate 248 over foot plate 246. In one embodiment, actuators 310 are conventional hydraulic cylinders having respective cylinder bodies, cylinder rods, and a pump to supply fluid pressure to extend and/or retract the cylinder rods relative to the cylinder bodies. The cylinder bodies of actuators 310 are rigidly coupled to apertures in surface 316. The cylinder rods of actuators 310 are rigidly coupled to surface 314 of foot plate 248 at apertures 323. The cylinder rods of actuator 310 extend and retract through openings 319 in surface 316.

Figure 25:
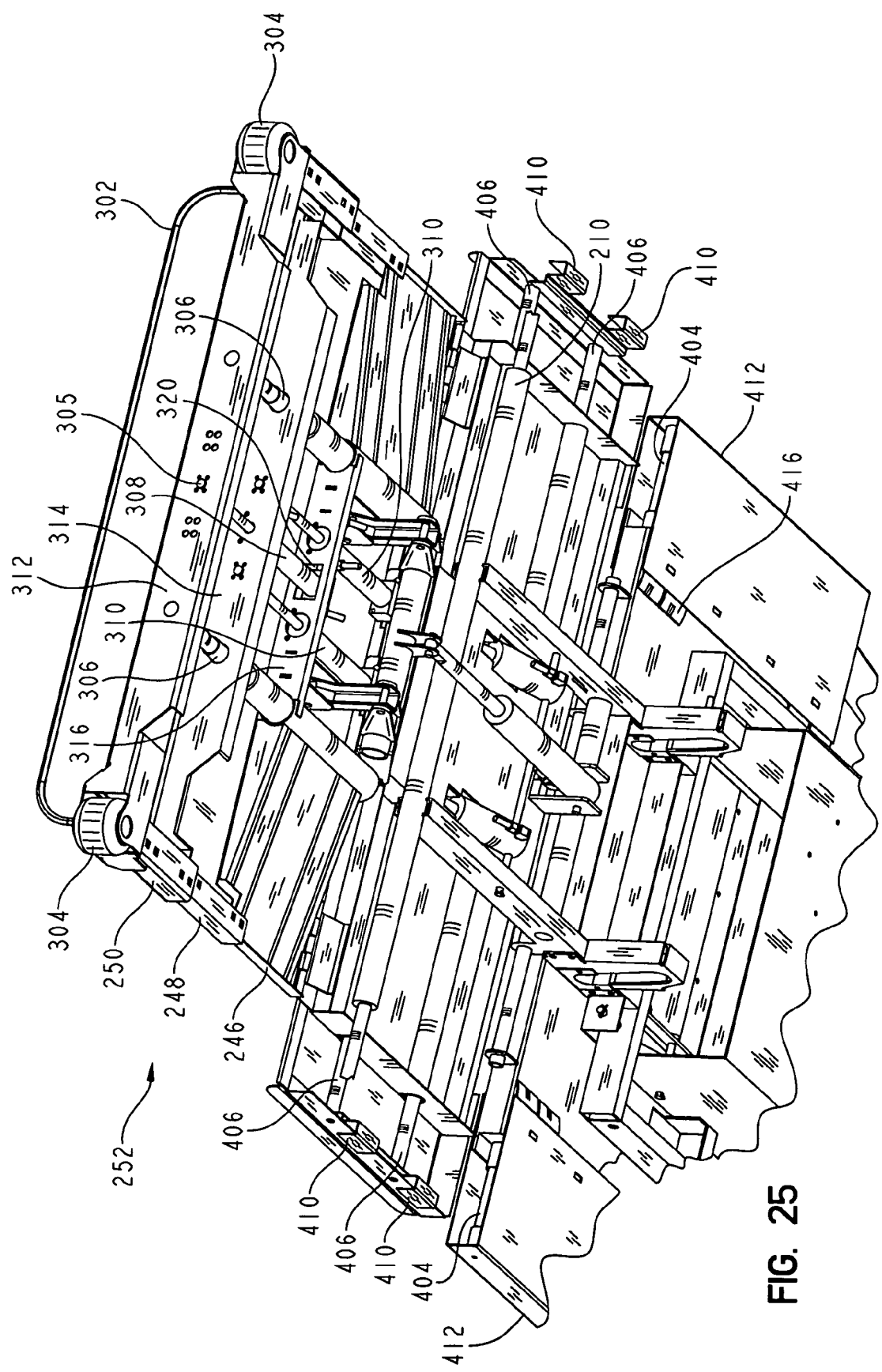
FIG. 25 illustrates a bottom perspective view of the foot section including foot plates.
Figure 26:
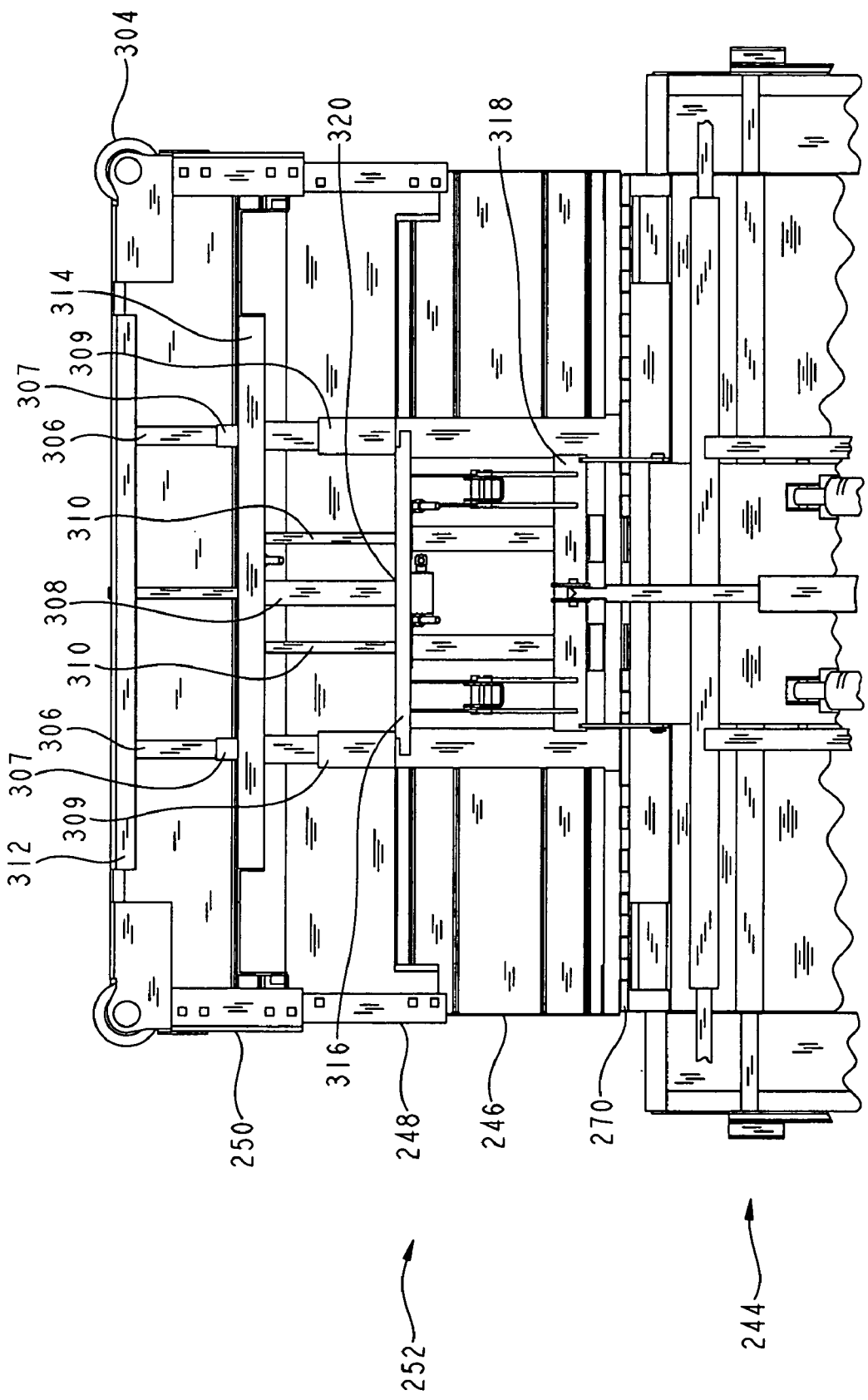
FIGS. 26-28 illustrate a bottom view of the foot section in extended and retracted positions.
Figure 27:
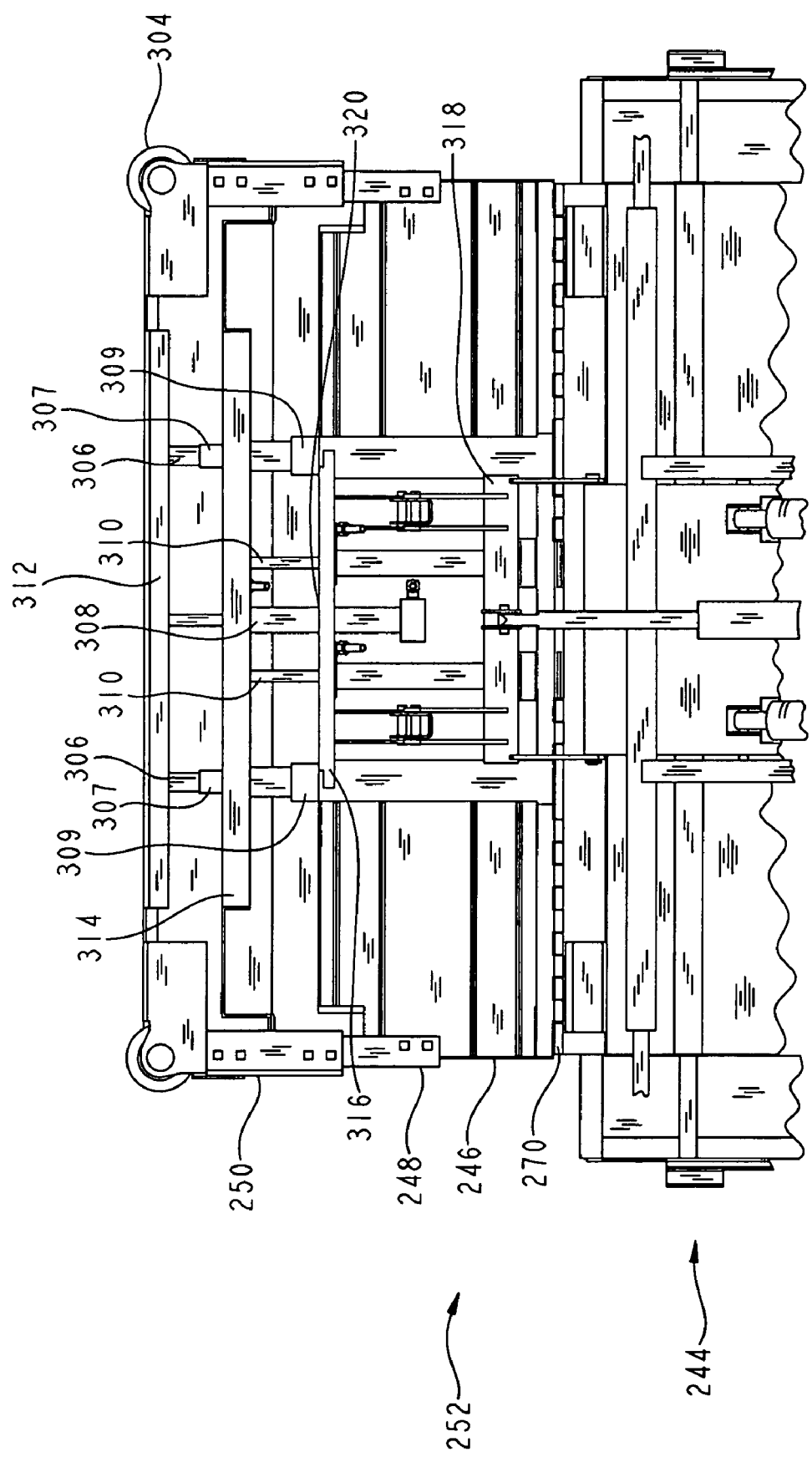
Figure 28:
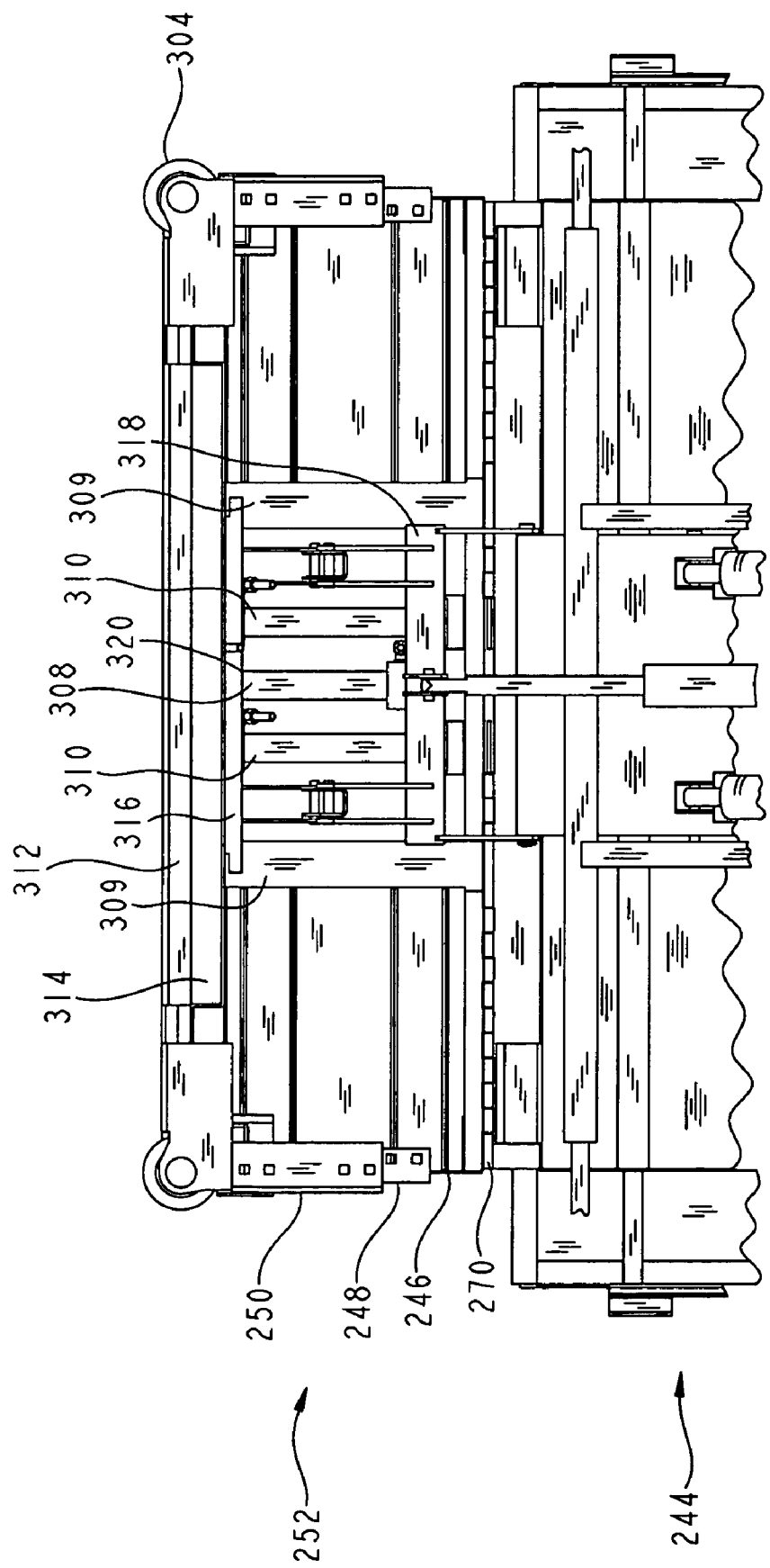
Figure 29:
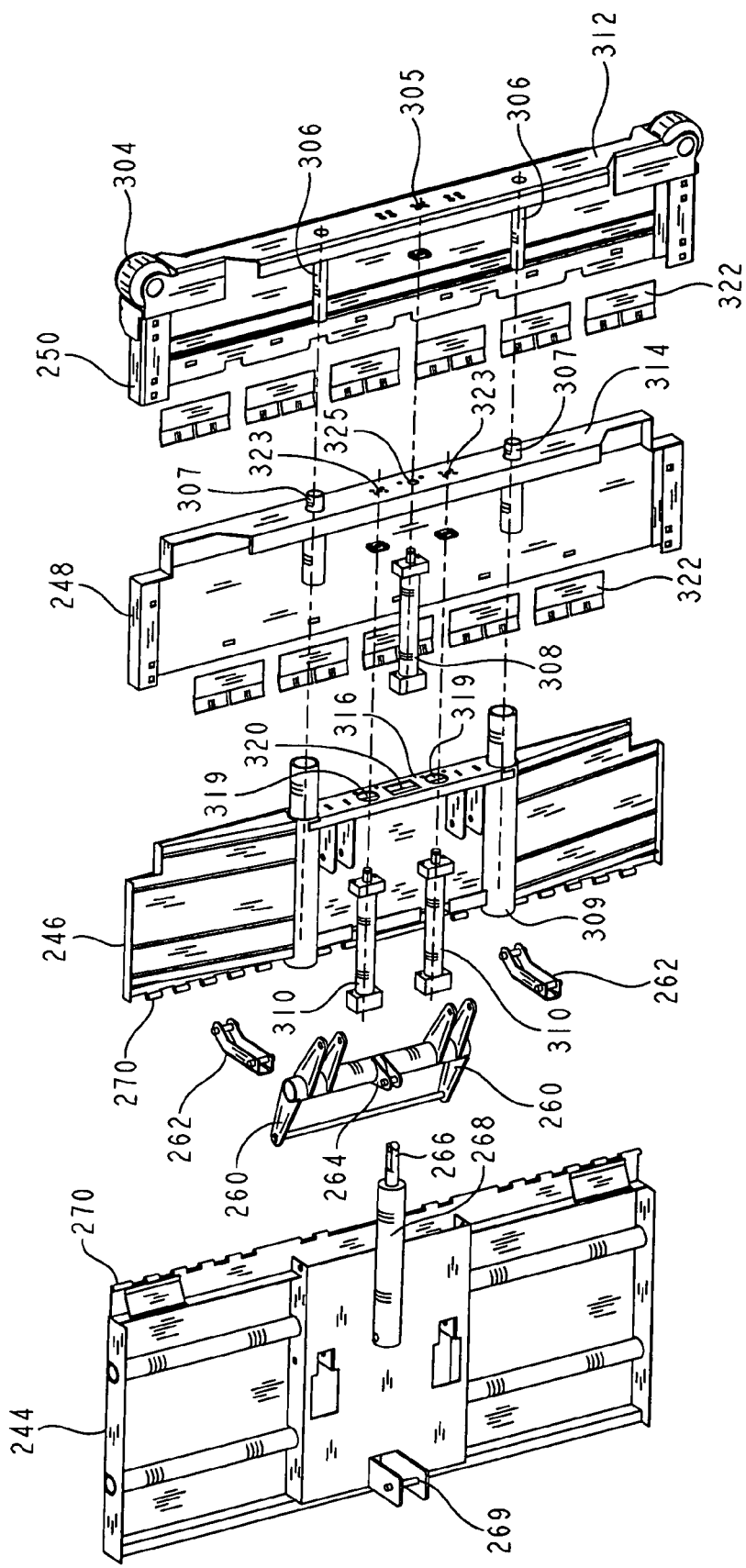
FIG. 29 illustrates an exploded bottom perspective view of the foot plates.

As shown in FIGS. 25-29, guide tubes 309, 307, and 306 interact with one another to support foot plates 248 and 250. Guide tubes 306 which are coupled to surface 312 are sized to slide within guide tubes 307 which are coupled to surface 314. Guide tubes 307 are sized to slide within guide tubes 309 which are coupled to foot plate 246. Guide tubes 306 are configured to telescopically move in and out of tubes 307, which are configured to telescopically slide in and out of tubes 309. When foot section 252 is fully retracted, as shown in FIG. 28, guide tubes 306 lie within guide tubes 307 which lie within guide tubes 309. As shown in FIG. 27, as foot plate 248 is extended from foot plate 246, guide tubes 307 slide out of guide tubes 309 to support foot plate 248 and guide tubes 306 slide out of guide tubes 307 to support foot plate 250. In an alternative embodiment, a spring bias is inserted within tubes 309, 307, 306 to bias sections 246, 248, 250 in the retracted position.

Figure 30:
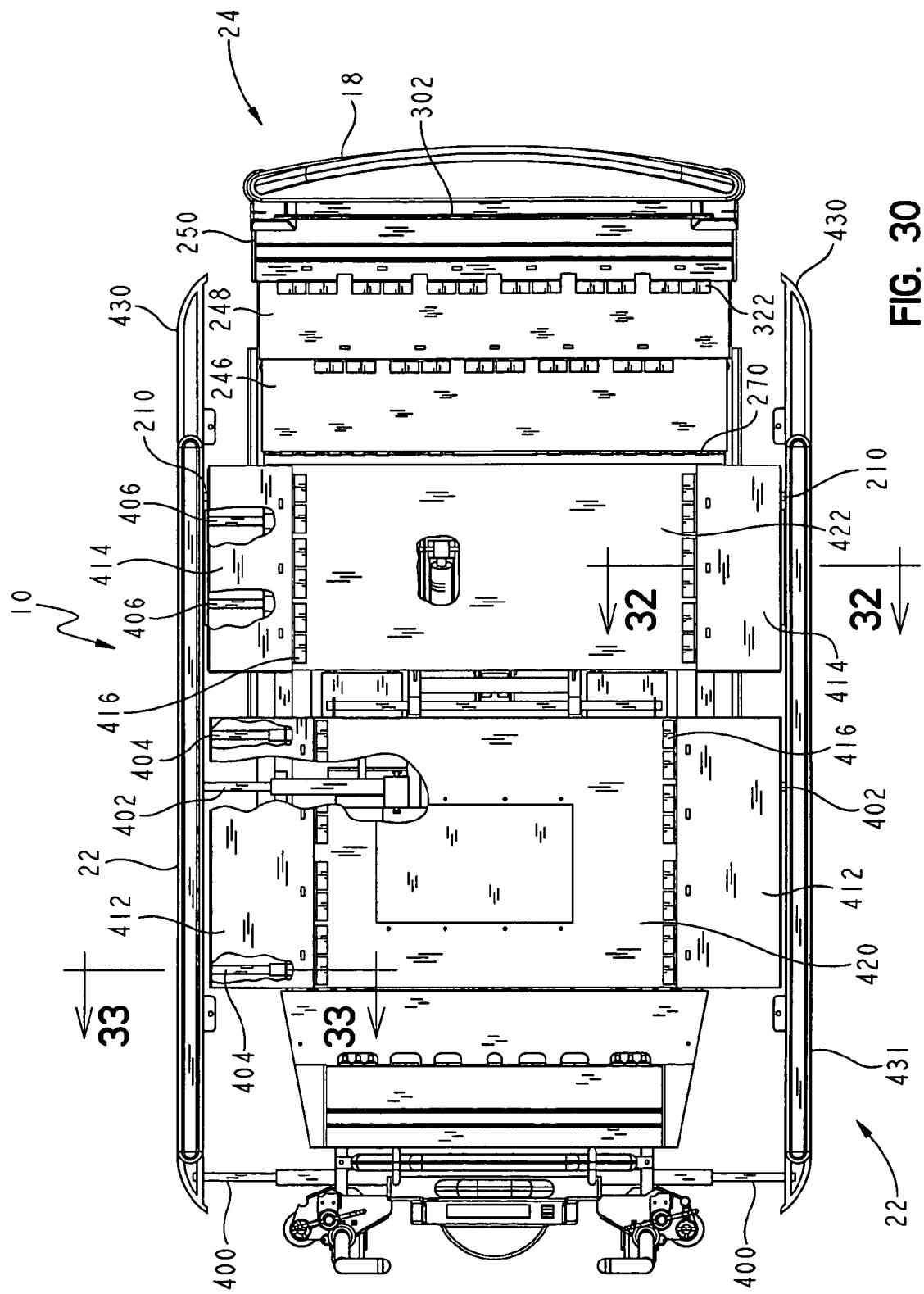
FIGS. 30-31 illustrates a bottom view of the deck of the patient support including a width adjustment feature.
Figure 31:
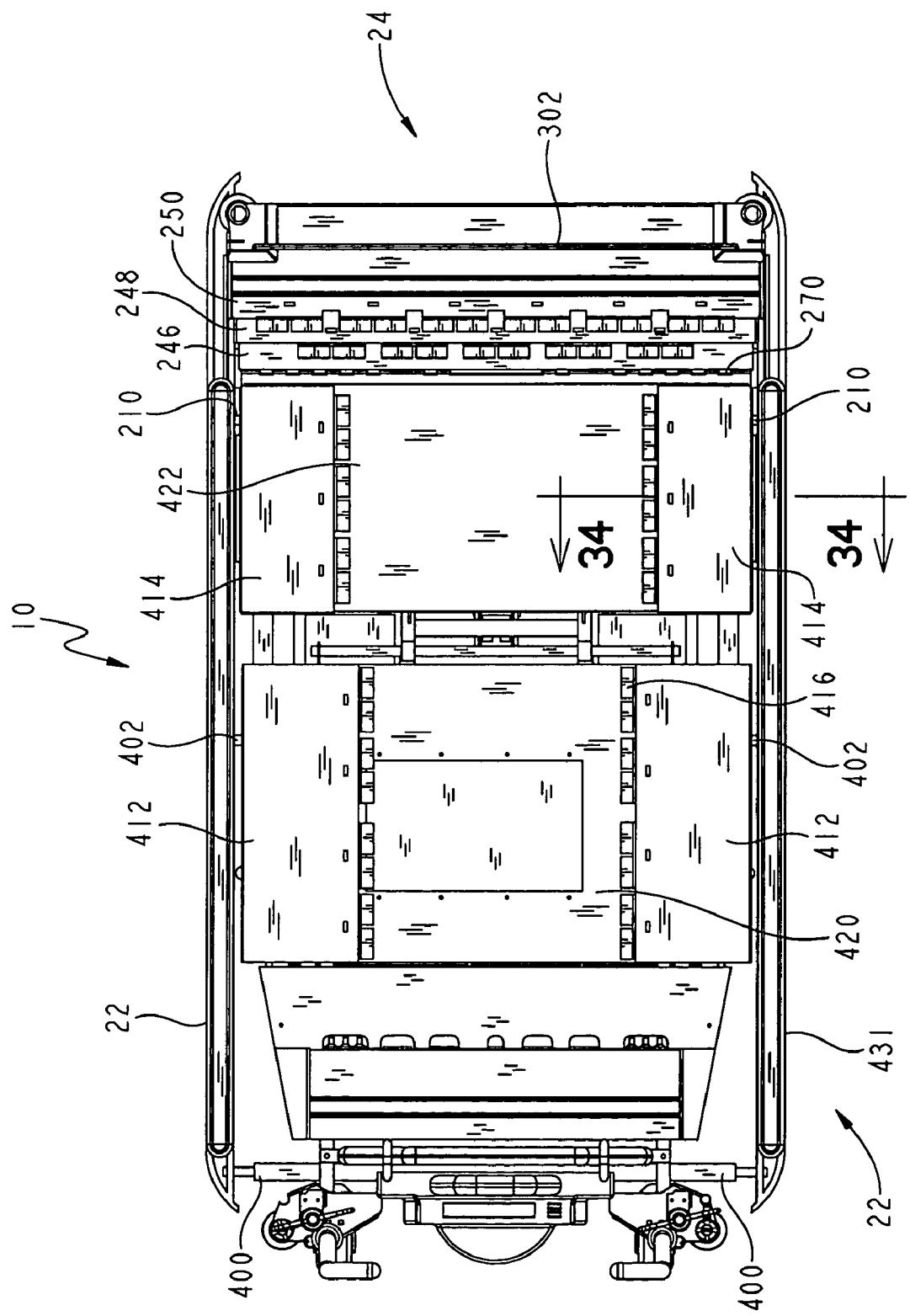

As shown in FIG. 26, when actuators 310 and actuator 308 are fully extended, foot section 252 is fully extended. Guide tubes 309, 307, and 306 telescopically extend to provide support to foot plates 248 and 250. Referring now to FIG. 27, foot section 252 is shown in a partially retracted position. As actuators 310 begin to retract, actuator 308 begins to pass through opening 320 in surface 316 as foot plate 248 is retracted. Guide tubes 309, 307, and 306 begin to slide within in another. Referring now to FIG. 28, foot section 252 is shown fully retracted. Guide tubes 306, 307 are fully retracted and lie within guide tubes 309. Actuators 310 and actuator 308 are fully retracted. Actuator 308, which is coupled to surface 314, is positioned in opening 320 in surface 316. FIGS. 30-31 illustrate an overhead view of patient support 10 with foot section 252 fully extended and fully retracted, respectively.

To extend foot section 252, a health care provider illustratively depresses a button on a siderail controller or a pendant controller to activate actuators 310 and 308 to extend the cylinder rods. Actuators 310 and 308 then begin extending foot plates 248 and 250. Foot section 252 can be extended fully or only partially extended as desired. To retract foot section 252, a health care provider illustratively depresses another button to activate actuators 310 and 308 to retract the cylinder rods. As the cylinder rods are retracted, foot plate 250 slides over foot plate 248 which slides over foot plate 246.

As shown in FIGS. 25, 30, and 31, patient support 10 includes a deck width adjustment feature that allows the health care provider to make deck 24 wider or narrower to accommodate a patient, especially a bariatric patient. To widen deck 24 from its narrowest position, as shown in FIG. 31, siderails 22 are extended from deck 24. Side panels 412 and 414 extend from back section 420 and seat section 422, respectively, as siderails 22 are extended. Siderails 22 include vertical supports 431 and lower rails 430. Vertical supports 431 are rigidly coupled to lower rails 430 and extend upwardly. Lower rails 430 extend the entire length of deck 24 when foot section 252 is in the retracted position. Lower rails 430 are coupled to each side of deck 24 by spring tubes 400 and 210 and actuators 402. As actuators 402 are extended, siderails 22 are moved away from deck 24.

Actuators 402 provide the power and force necessary to extend siderails 22 from deck 24. Actuators 402 have expandable lengths to extend lower rails 430 away from deck 24. Actuators 402 are preferably conventional hydraulic cylinders having respective cylinder bodies, cylinder rods, and a pump to supply fluid pressure to extend and/or retract the cylinder rods relative to the cylinder bodies. The cylinder bodies of actuators 402 are rigidly coupled to the bottom side of deck 24. The cylinder rods of actuators 402 are rigidly coupled to lower rails 430.

Spring tubes 400 and 210 include spring biases and telescopic tubes positioned within one another to support and align siderail 22. As cylinders 402 extend, the telescopic sections of spring tubes 400 and 210 extend. Spring tubes 210 and 400 include springs which bias siderail 22 to the retracted position as shown in FIG. 31.

As shown in FIGS. 25 and 30-31, side panels 412 and 414 extend from back panel 420 and seat panel 422 to widen deck 24. Overlay slides 416 are rigidly coupled to panels 414 and 412 to prevent damage to a mattress or overlay placed on deck 24 when side panels 412 or 414 are being extended or retracted. Side panels 414 are coupled to each side of seat section 422 by spring tubes 406. Spring tubes 406, which will be discussed in more detail below, are coupled on one end to side panels 414 and on the other end to seat panel 422. Spring tubes 406 are a series of telescopic tubes containing a spring configured to bias the panels in the retracted position.

Figure 32:
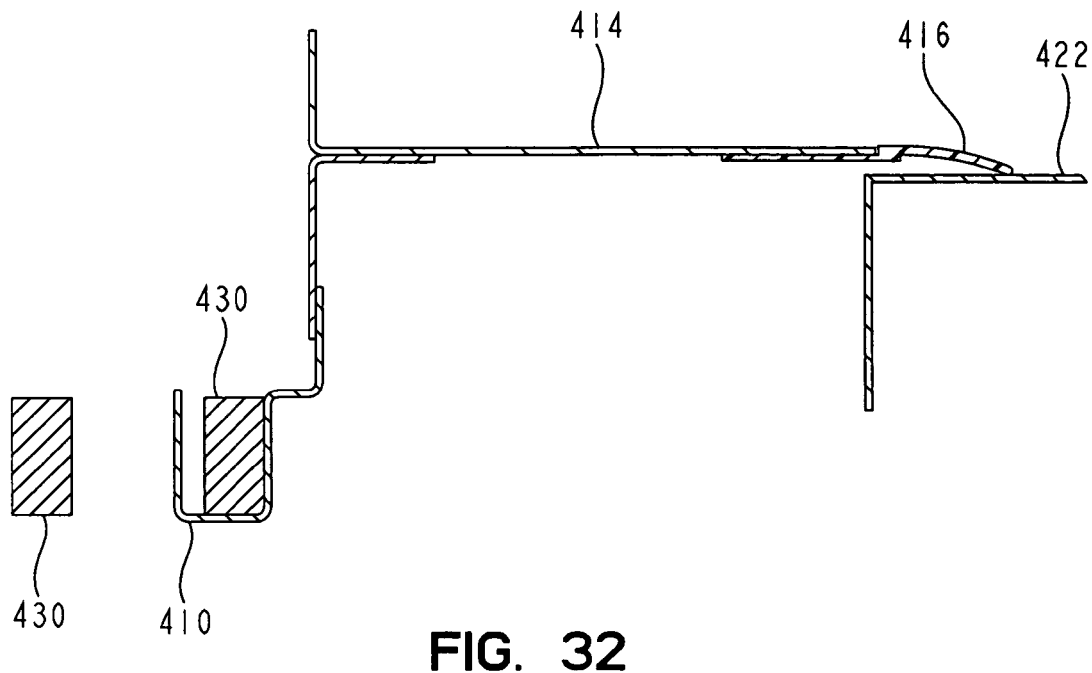
FIG. 32 illustrates an end elevation view of a side panel extending over the seat panel of the deck.
Figure 34:
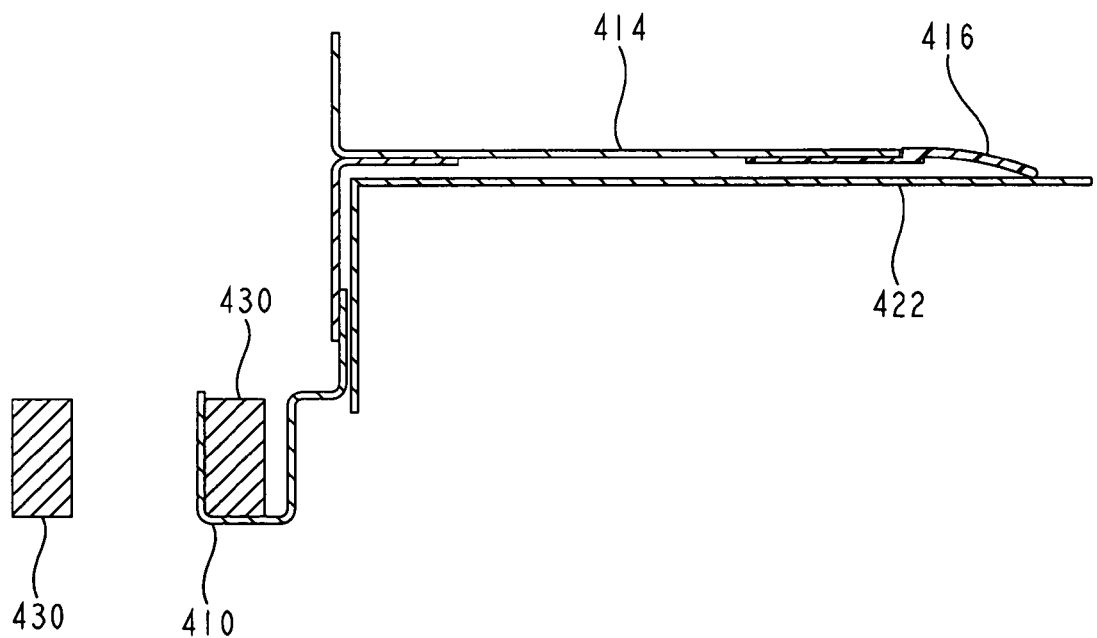
FIG. 34 illustrates an end elevation view of a side panel extending over the seat panel of the deck.

As shown in FIGS. 25, 32, and 34, panels 414 also include saddles 410. Saddles 410 are U-shaped couplers adapted to hook underneath lower rails 430 of siderail 22. As actuators 402 extend siderails 22 lower rails 430 engage saddles 410. Side panels 414 slide over seat panel 422. Actuators 402 must extend with sufficient force to overcome the spring bias in spring tubes 406 which bias side panels 414 inwardly or in the retracted position. Side panels 414 are retracted by discontinuing the extending force of actuators 402 so that the spring bias in spring tubes 406 retracts side panels 414. As side panels 414 are retracted, saddles 410 engage lower rails 430 of siderails 22 and pulls siderails 22 inward. The cylinder rods of actuators 402 are retracted or pushed into the cylinder as side panels 414 are retracted. In an alternative embodiment of the present disclosure, side panels 414 are extended by a spring bias in guide tubes 406 and retracted by actuators 402 which act to pull side panels 414 into the retracted position.

As shown in FIG. 30, side panels 412 are extend from the sides of back section 420. Side panels 412 are coupled to panel 420 by spring tubes 404. Spring tubes 404, which are discussed below, bias side panels 412 in an extended position. Side panels 412 abut vertical supports 431 of siderails 22 when siderails 22 are in the retracted or narrow position. As siderails 22 are extended, side panels 412 extend and maintain contact with siderails 22 because the spring bias enclosed in guide tubes 406 biases side panels 412 in the extended position. When siderails 22 are retracted, the spring biases that extend side panels 412 are compressed.

Figure 33:
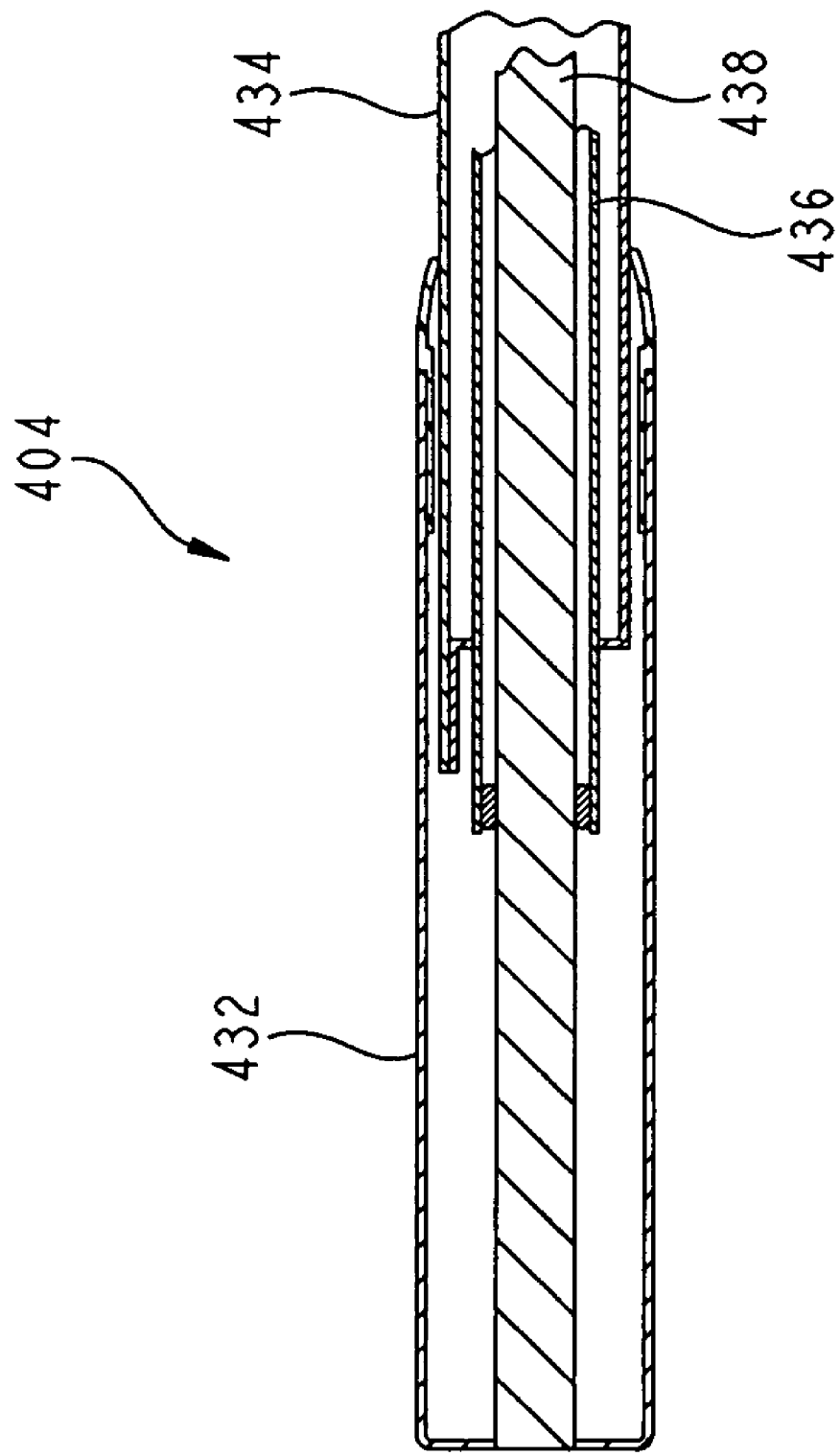
FIG. 33 illustrates a partial view of a spring tube used to adjust the side panels in an extended position.

As shown in FIG. 33, spring tubes 404 include a series of telescopic tubes sized to slide within one another and a spring. Outer tube 432 is rigidly coupled to the bottom side of back section 420. Second tube 434 is sized to fit within outer tube 432 and can slide in and out of outer tube 432 with minimal friction. Inner tube 436 is positioned within second tube 434 and can extend or retract within tube 434. A spring 438 biases tubes 432, 443, and 436 in the extended position. Spring tubes 210, 400, and 406 are substantially similar to spring tube 404 with the exception that the enclosed spring in spring tubes 210, 400, and 406 biases these tubes in the retracted position rather than the extended position.

Figure 35:
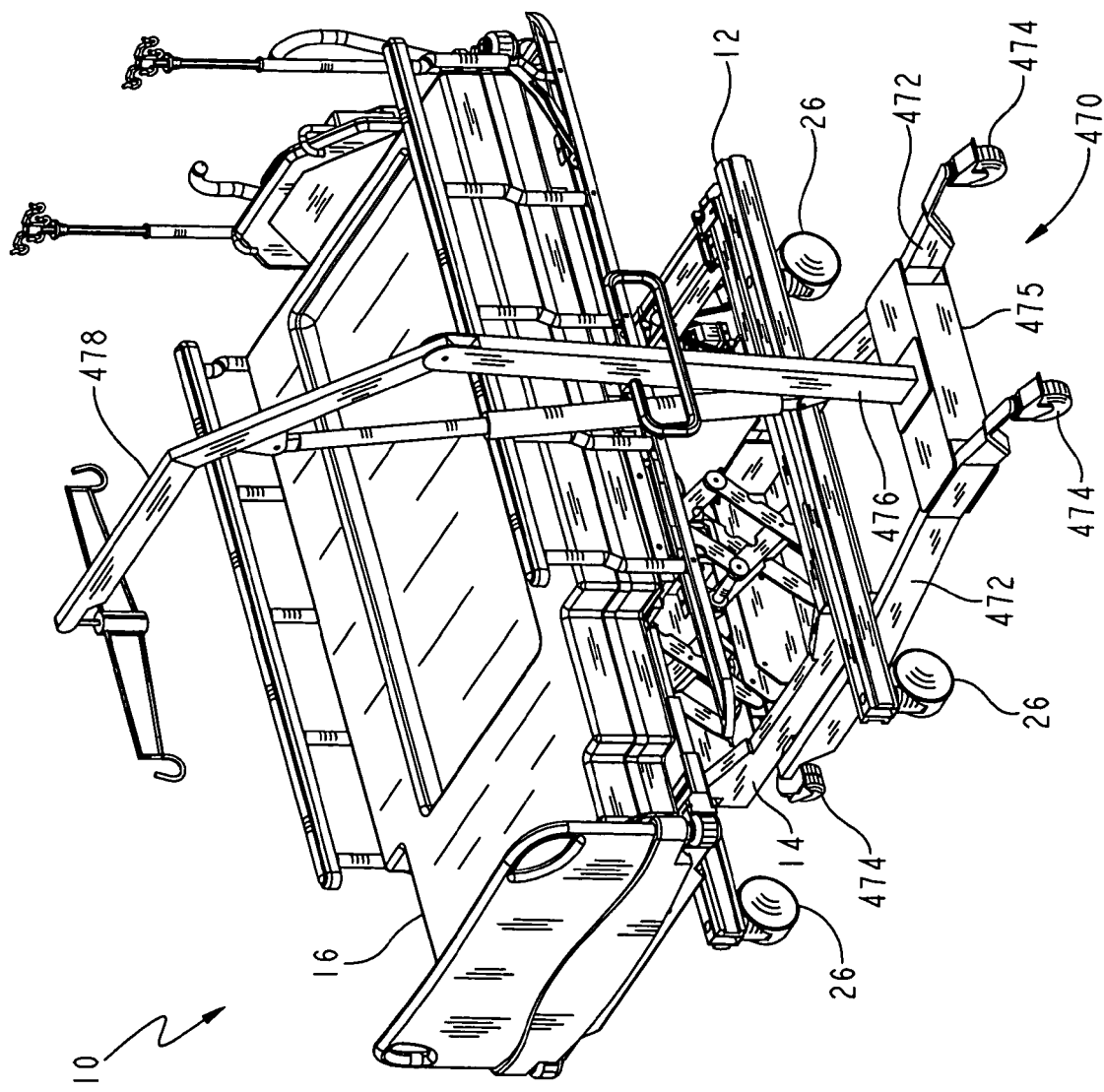
FIG. 35 illustrates a perspective view of the patient support including a patient mover positioned adjacent the patient support.
Figure 36:
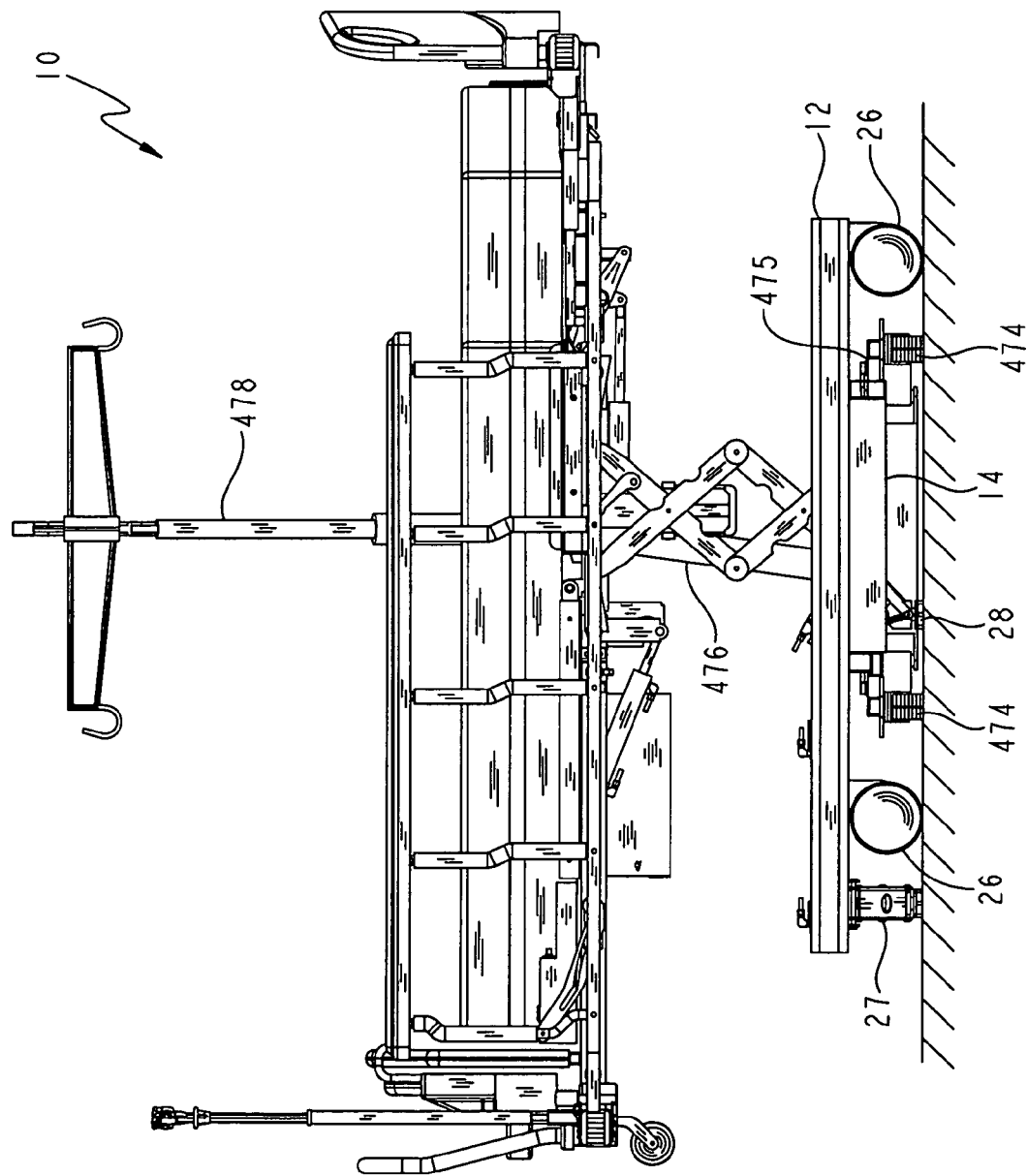
FIG. 36 illustrates a side elevation view of the patient support including a patient mover positioned adjacent the patient support.

As shown in FIGS. 35 and 36, patient mover 470 can be positioned beneath patient support 10 to assist health care providers with moving patients. In one embodiment of the present disclosure frame 12 of patient support 10 is about six and one-half inches above the floor and subframe 14 is about four inches above the floor. Patient mover 470 includes frame rails 472, base 475, vertical support 476, and boom 478. Frame rails 472 are coupled together at one end by base 475. Frame rails 472 include wheels 474 on each end that are configured to roll on the floor. Vertical support 476 is coupled to base 475. Boom 478 is coupled to vertical support 476. Frame rails 472 of patient mover 470 are spaced apart to straddle subframe 14. Patient mover 470 is configured to roll under frame 12 of bed 10 and straddle subframe 14 so that boom 478 is above mattress 16. A health care provider can then place a patient in or remove a patient from patient support 10.

Figure 37:
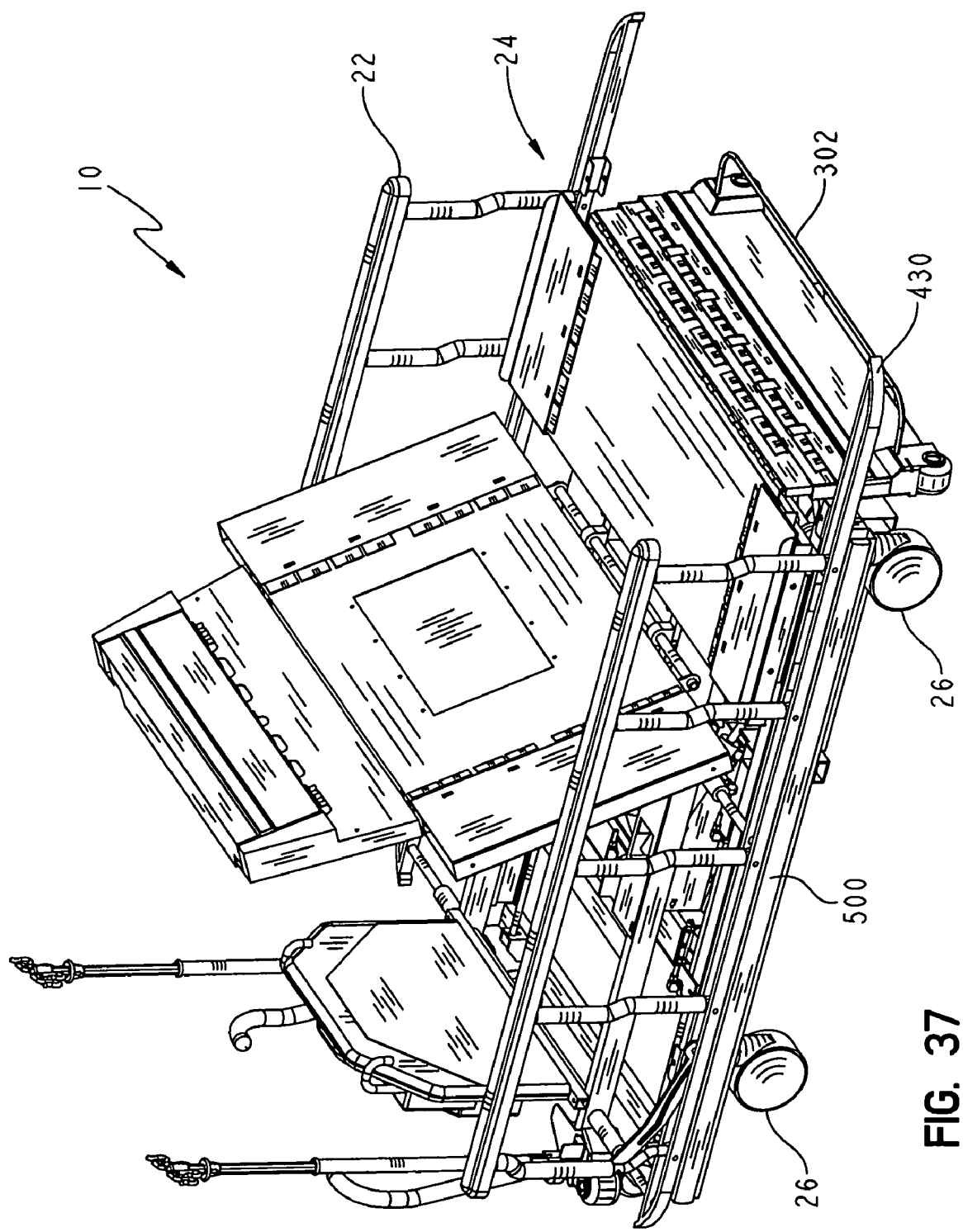
FIG. 37 illustrates a perspective view of the patient support in a chair configuration.
Figure 38:
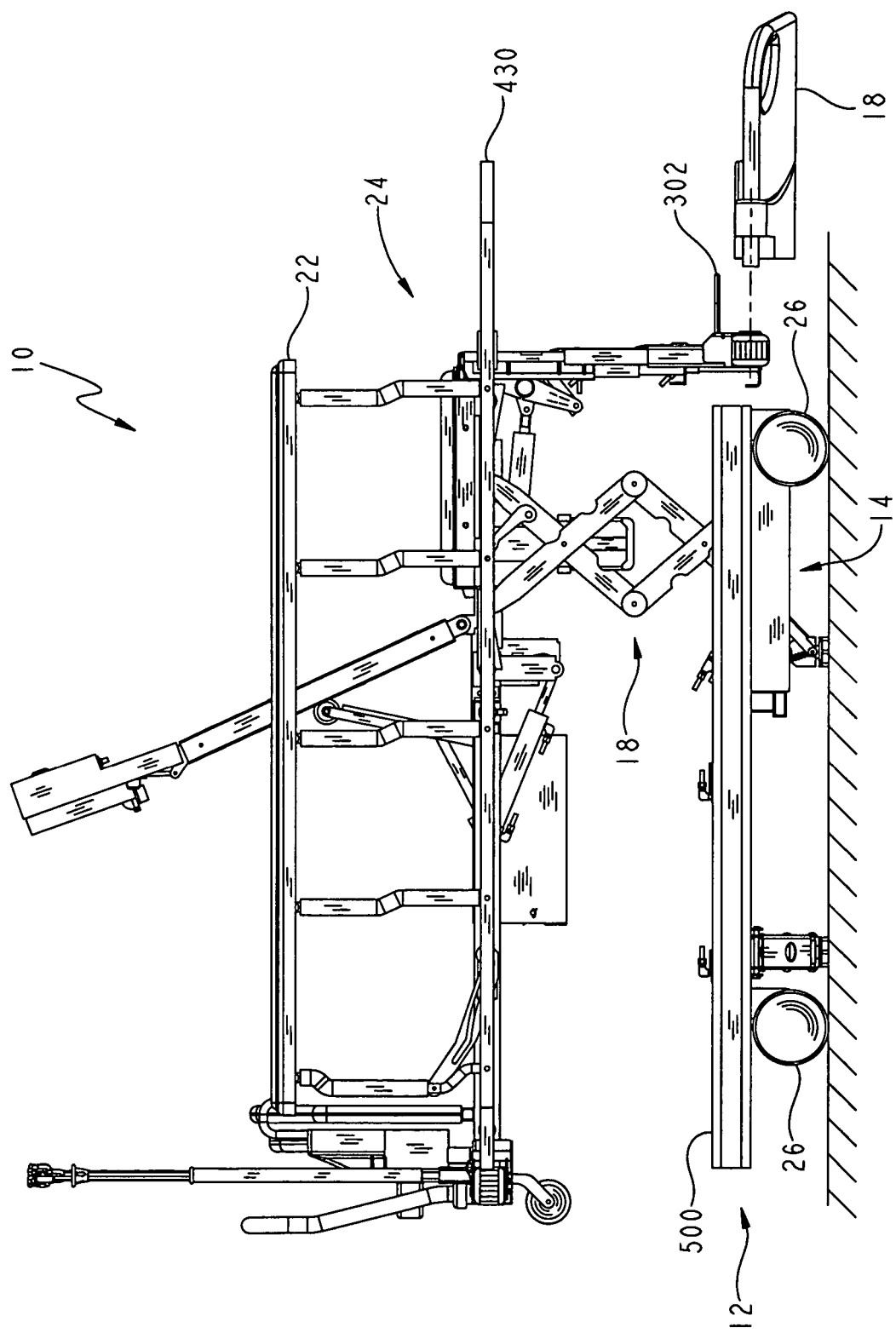
FIG. 38 illustrates a side elevation view of the patient support in a chair configuration including the braking mechanism in an extended position in contact with the floor.
Figure 39:
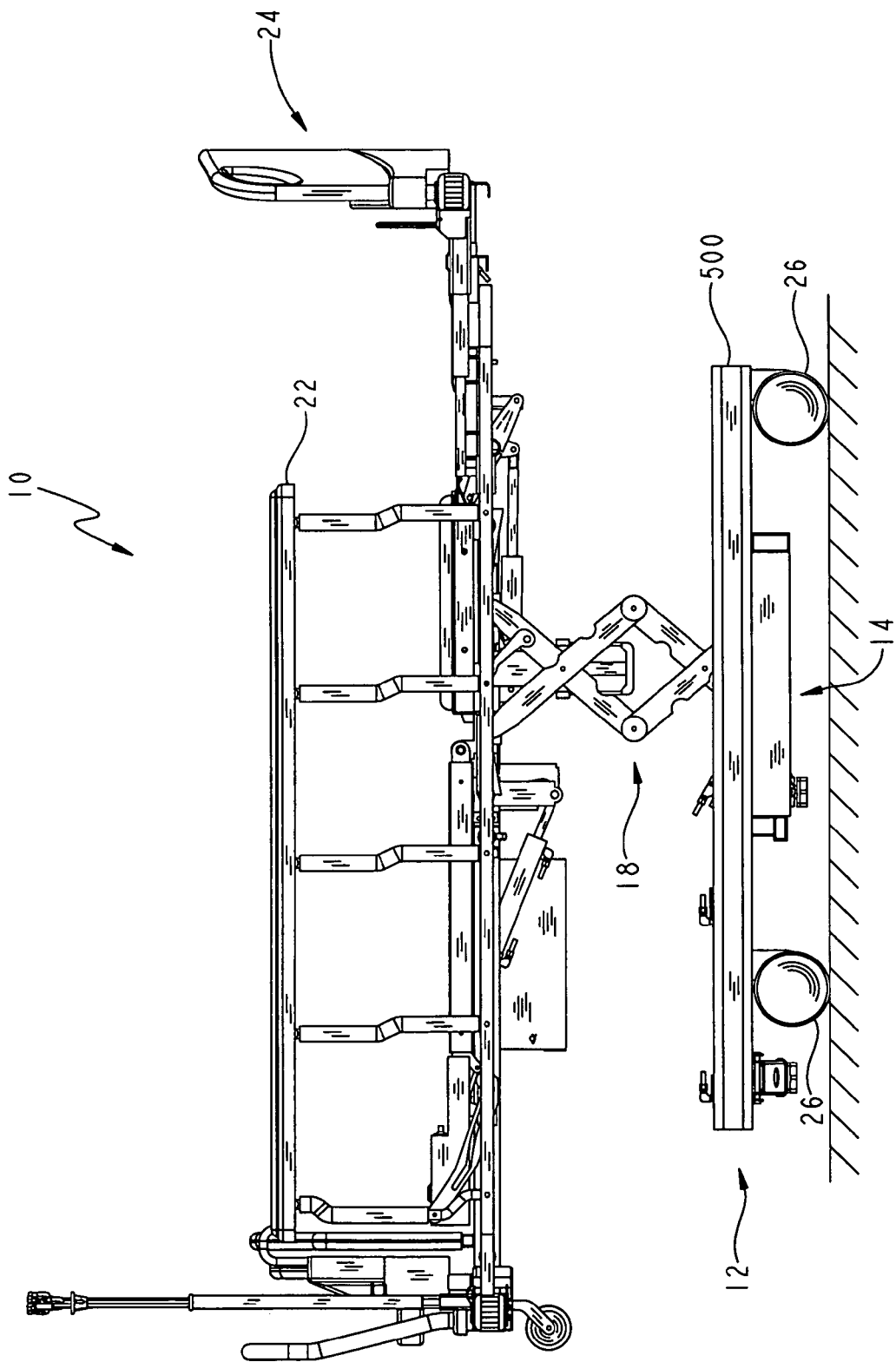
FIG. 39 illustrates a side elevation view of the patient support with the deck in a flat position and the braking mechanism in a retracted position.

As shown in FIGS. 38 and 39, frame 12 of bed 10 can be moved relative to subframe 14. FIGS. 37 and 38 show deck 24 in the chair configuration with subframe assembly 14 positioned at the foot end of frame 12. When frame 12 is in this position, wheels 26 and frame rails 500 are slid back away from the patient's feet. FIG. 39 shows deck 24 in the bed or flat configuration with subframe assembly 14 positioned towards the center of frame 12. When brake mechanisms 27 and 28 are activated, subframe 14 is stationary and frame 12 can be moved forward or backward relative to subframe 14. Frame 12 can roll on the floor on wheels 26 while subframe 14 is held in place by brake mechanisms 27 and 28. The ability to shift frame 12 towards the head end of patient support 10 allows patients to ingress and egress from the chair position without interference from frame 12 and wheels 26. Also, the ability to move frame 12 relative to subframe 14 allows the center of gravity of bed 10 to shift from a center position shown in FIG. 39 to a point closer to the foot end of frame 12 as shown in FIG. 38.

Figure 40:
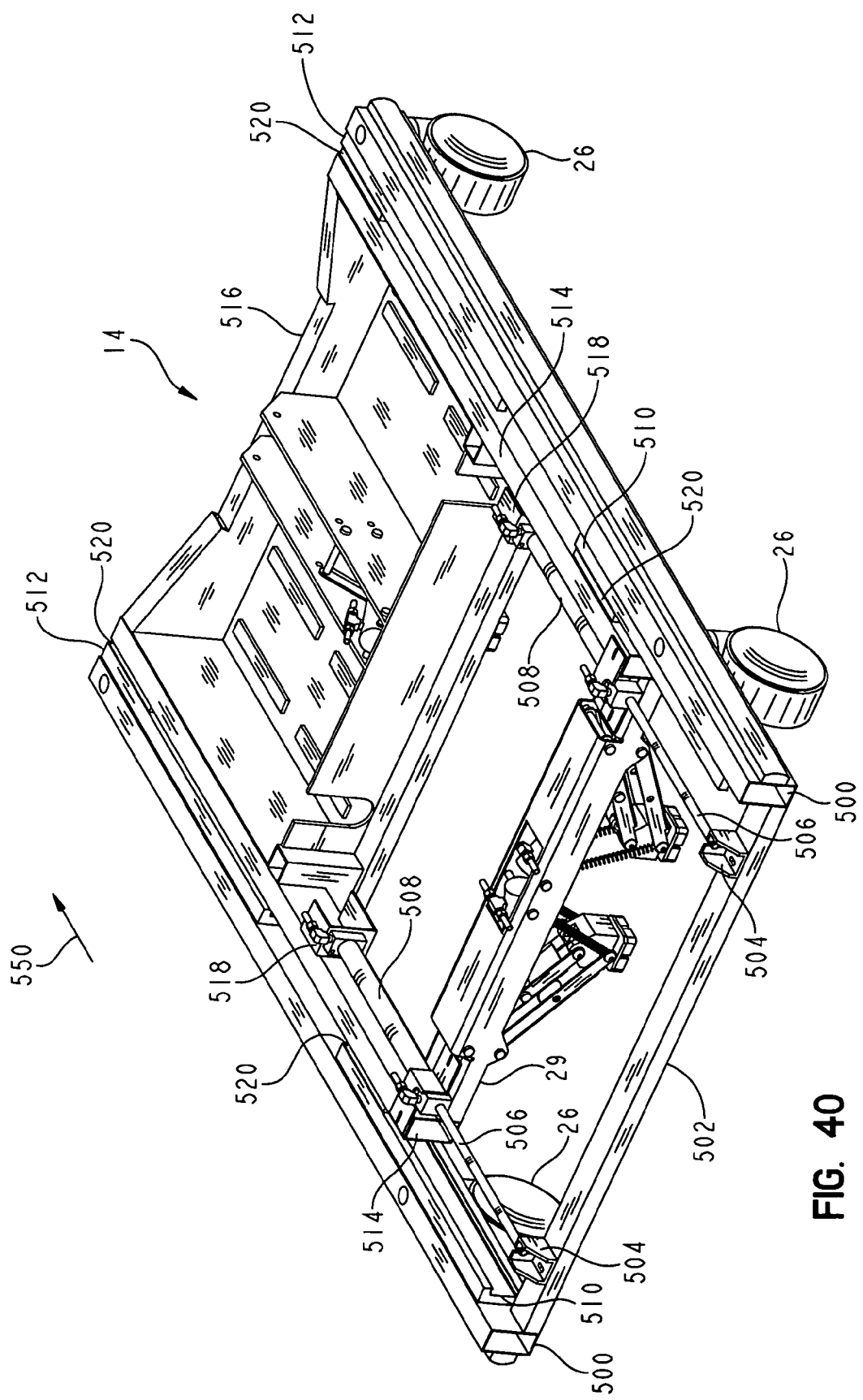
FIG. 40 illustrates a head end perspective view of the frame of the patient support having the braking mechanisms in an extended position.
Figure 41:
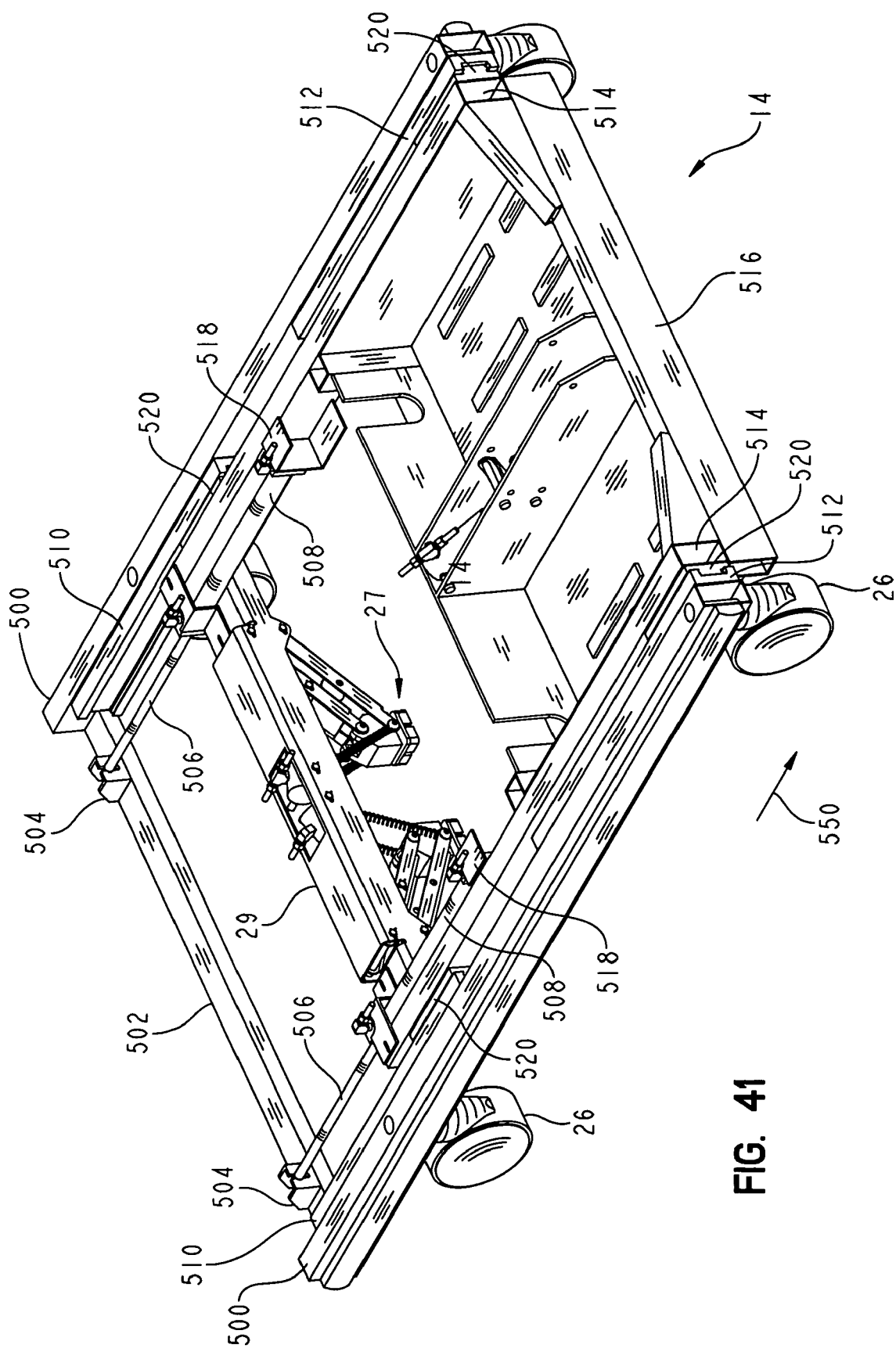
FIG. 41 illustrates a foot end perspective view of the frame having the braking mechanism in an extended position.

Referring now to FIGS. 40 and 41, frame 12 includes frame rails 500, wheels 26, frame crossmember 502, and brackets 504. With brake mechanisms 27 and 28 engaging the floor, frame rails 500 can be extended from subframe 14 in direction 550. Frame channels 510 and 512 are rigidly coupled to the interior surface of frame rails 500. Frame channels 510 and 512 include a channel or dovetail shaped recess on the side adjacent subframe 14. Frame cross-member 502 rigidly couples frame rails 500 together on one end. Frame rails 500 are not coupled together on the opposing end.

Subframe assembly 14 includes rails 514 and cross-members 516 and 29. Cross-members 516 and 29 rigidly couple the ends of rails 514 together. Plates 520 are rigidly coupled onto the exterior side of each end of rails 514. Plates 520 include a notched or dovetail shaped portion that is configured to engage and slides within frame channels 510 and 512 of frame 12. Subframe assembly 14 also includes actuators 508. Actuators 508 provide the power and force necessary to extend and retract frame 12 from subframe 14. Actuators 508 have expandable lengths to extend and retract frame rails 500 from subframe 14. In one embodiment, actuators 508 are conventional hydraulic cylinders having respective cylinder bodies, cylinder rods 506, and a pump to supply fluid pressure to extend and/or retract the cylinder rods relative to the cylinder bodies. The cylinder bodies of actuators 508 are rigidly coupled to brackets 518, which are rigidly coupled to the interior side of rails 514. The cylinder rods 506 of actuators 508 are rigidly coupled to brackets 504 on frame cross-member 502.

When a patient care provider desires to move subframe assembly 14 towards the foot end of frame 12 so that a patient can enter or exit patient support 10, the patient care provider first must actuate brake mechanisms 27 and 28. Next, the patient care provider depresses a button on a controller which extends actuators 508. As cylinder rods 506 simultaneously extend from actuators 508, plates 520, which are coupled to rails 514, frame channels 512 which are coupled to rails 500. Rails 500 roll on the wheels 26 as frame 12 moves towards the head end of patient support 10. When the health care provider desires to move subframe assembly 14 to the middle of frame 12, the health care provider depresses a button on a controller which retracts cylinder rods 506 into actuators 508. As actuators 508 simultaneously retract frame 12, frame channels 512 slide on plates 520 and frame 12 rolls on wheels 26 toward the foot end of patient support 10 until the actuators 508 are fully retracted.

Figure 44:
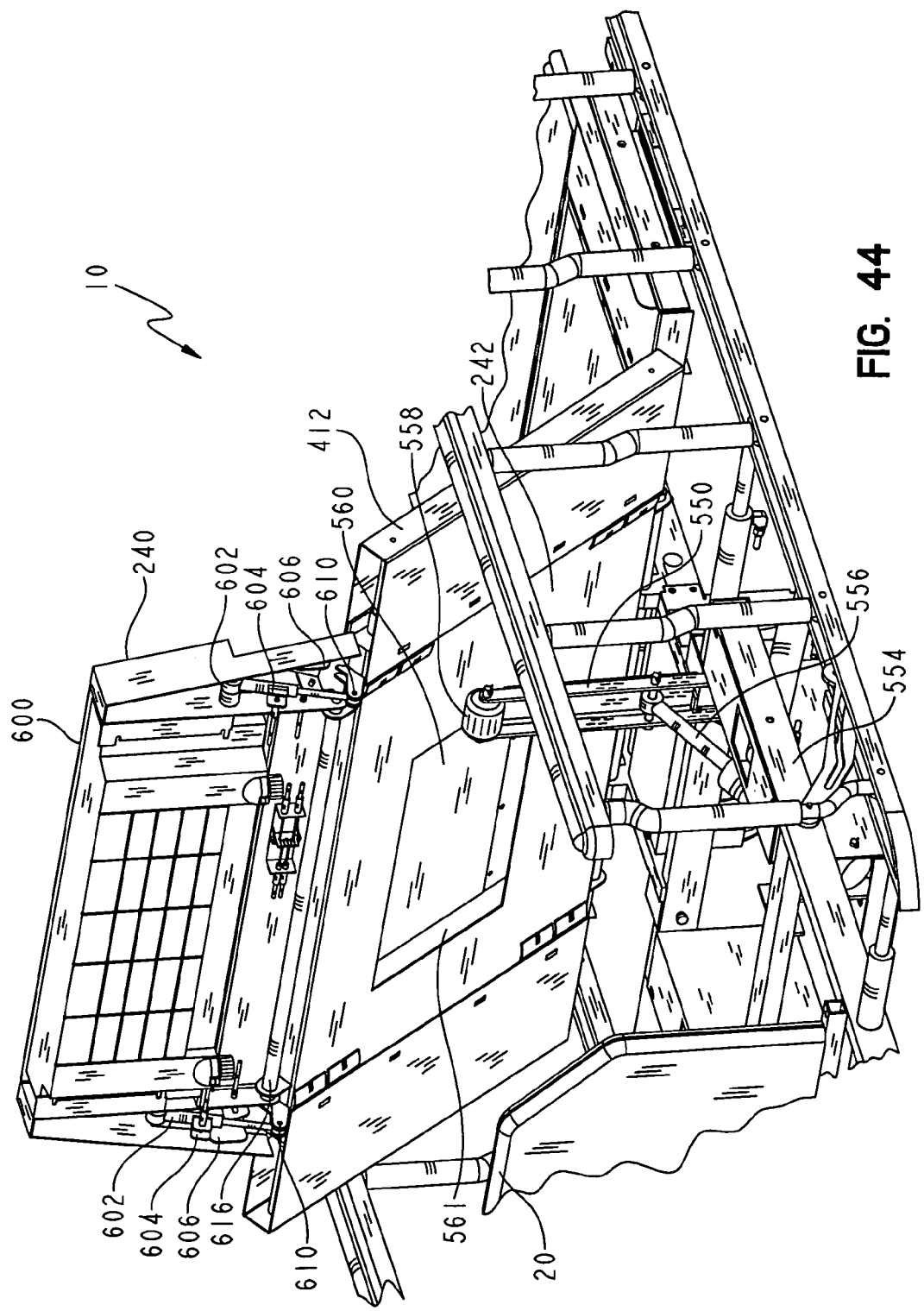
FIG. 44 illustrates a perspective view of the head section of the patient support coupled to the back section in a raised position.
Figure 45:
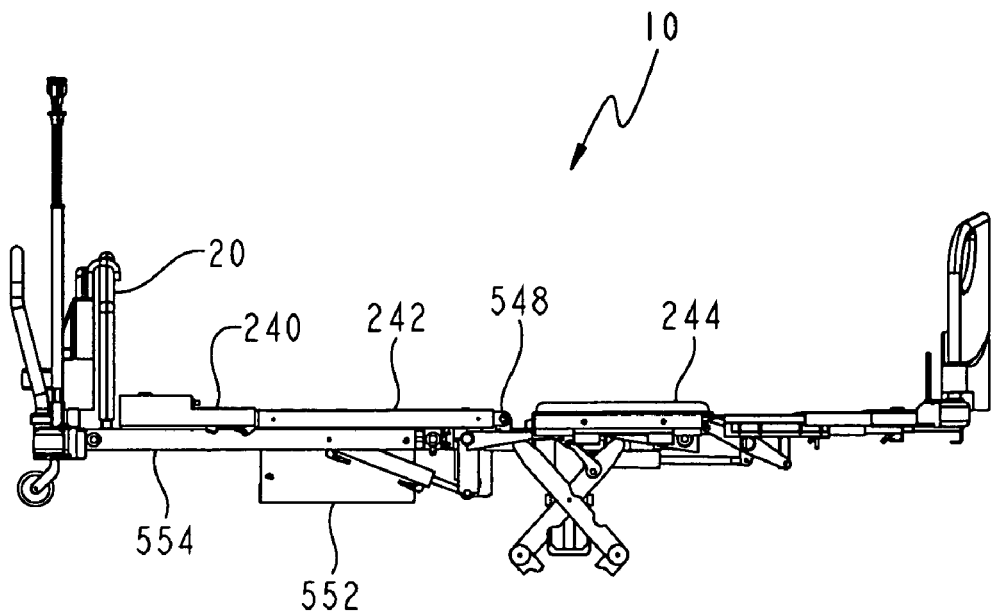
FIGS. 45-48 illustrate a partial side elevation view of the patient support including the head section and back section in a plurality of different positions.
Figure 46:
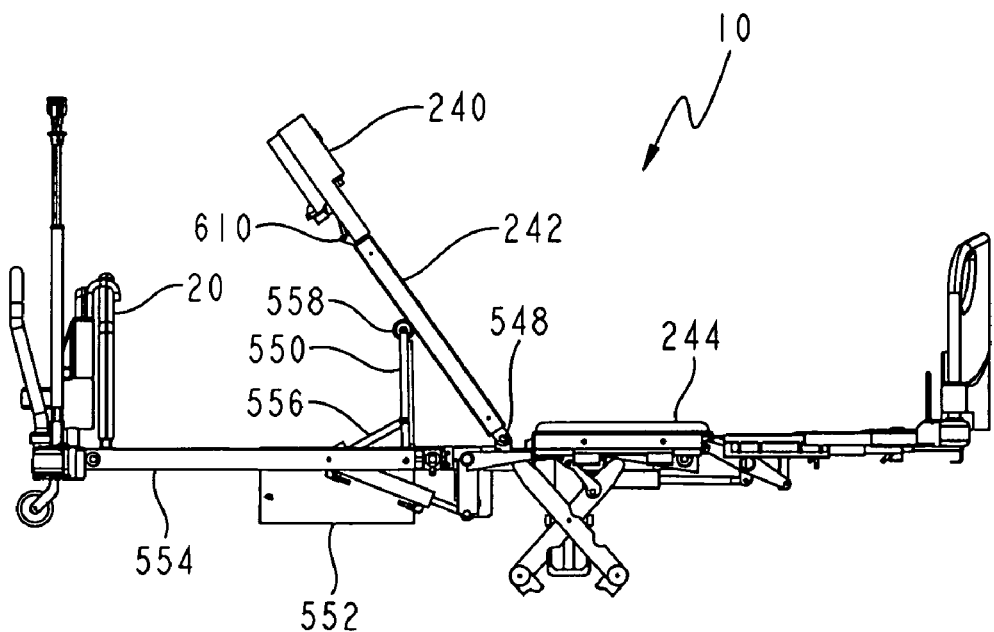
Figure 47:
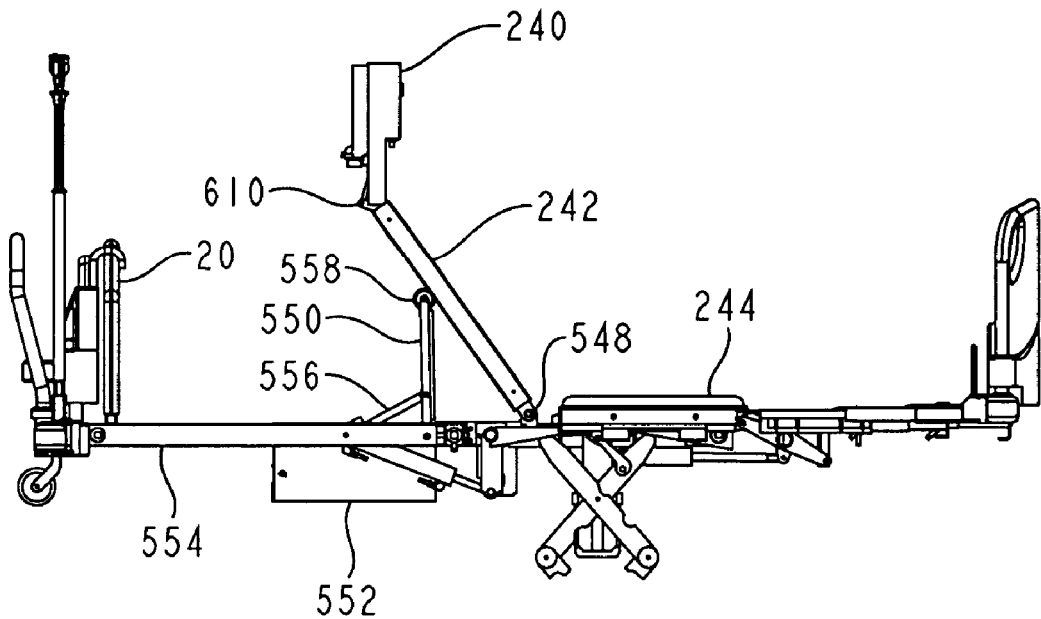
Figure 48:
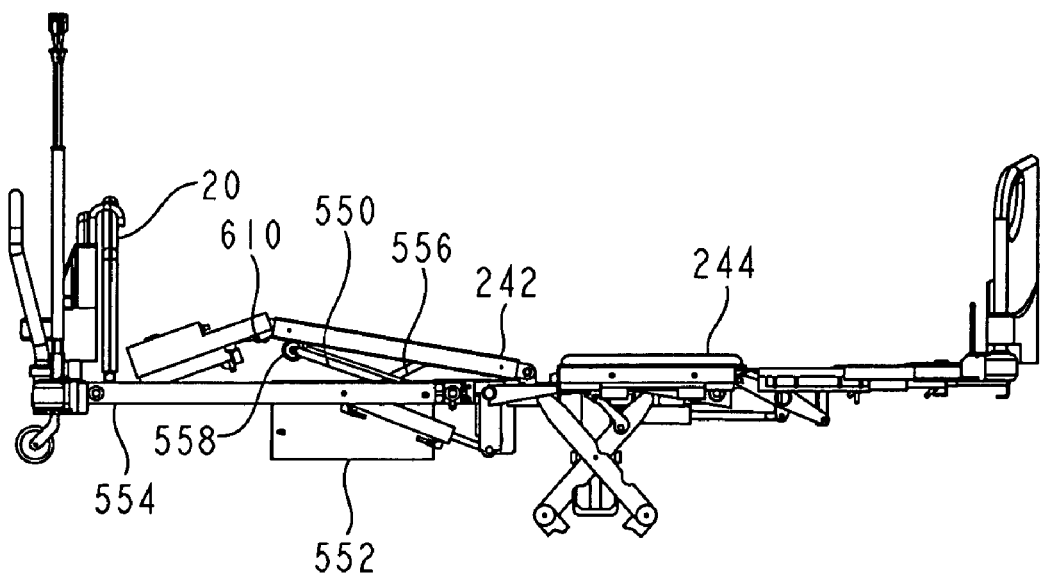

As shown in FIGS. 44-46, bed 10 can be configured so that back section 242 and head section 240 lie in a substantially flat position, as shown in FIG. 45, or an inclined position, as shown in FIG. 46, or any position in between. Back section 242 is pivotally coupled to deck frame 554 by hinge 548. Back section 242 is raised to an inclined position as arm 550 is pivoted from a substantially horizontal position to a substantially vertical position and moves down the back side of back section 242. When back section 242 is in the substantially flat position, back section 242 is supported by frame deck 554, and arm 550 lies below back section 242 in a substantially flat position. Actuator 556 provides the power and force necessary to raise arm 550. Actuator 556 has an expandable length to extend or raise arm 550 from a substantially flat position to a substantially perpendicular position. In one embodiment, actuator 556 is a conventional hydraulic cylinder having a respective cylinder body, a cylinder rod, and a pump to supply fluid pressure to extend the cylinder rod relative to the cylinder body. The cylinder body of actuator 556 is pivotally coupled to frame deck 554. The cylinder rod of actuator 556 is pivotally coupled to arm 550.

Roller 558 is illustratively coupled to the end of arm 550. Roller 558 is coupled in a manner such that it rotates freely about an axis. Roller 558 is positioned to contact the back side of back section 242. When actuator 556 is extended, arm 550 is raised, and roller 558 forces back section 242 to pivot upward on hinge 548 as roller 558 rolls up the back side of back section 242. Back section 242 is lowered by discontinuing the extending force or relieving the pressure of actuator 556 which will allow the cylinder rod of actuator 556 to retract. As back section 242 declines arm 550 is forced into a horizontal position and the cylinder rod is forced back into the cylinder of actuator 556.

As shown in FIG. 44, back section 242 includes opening 561. Opening 561 is covered by plate 560 which removably couples to back section 242. Plate 560 can be removed to allow access to internal bed components for maintenance. In an alternative embodiment of the present disclosure back section 242 is continuous and does not contain opening 561 or plate 560.

Figure 42:
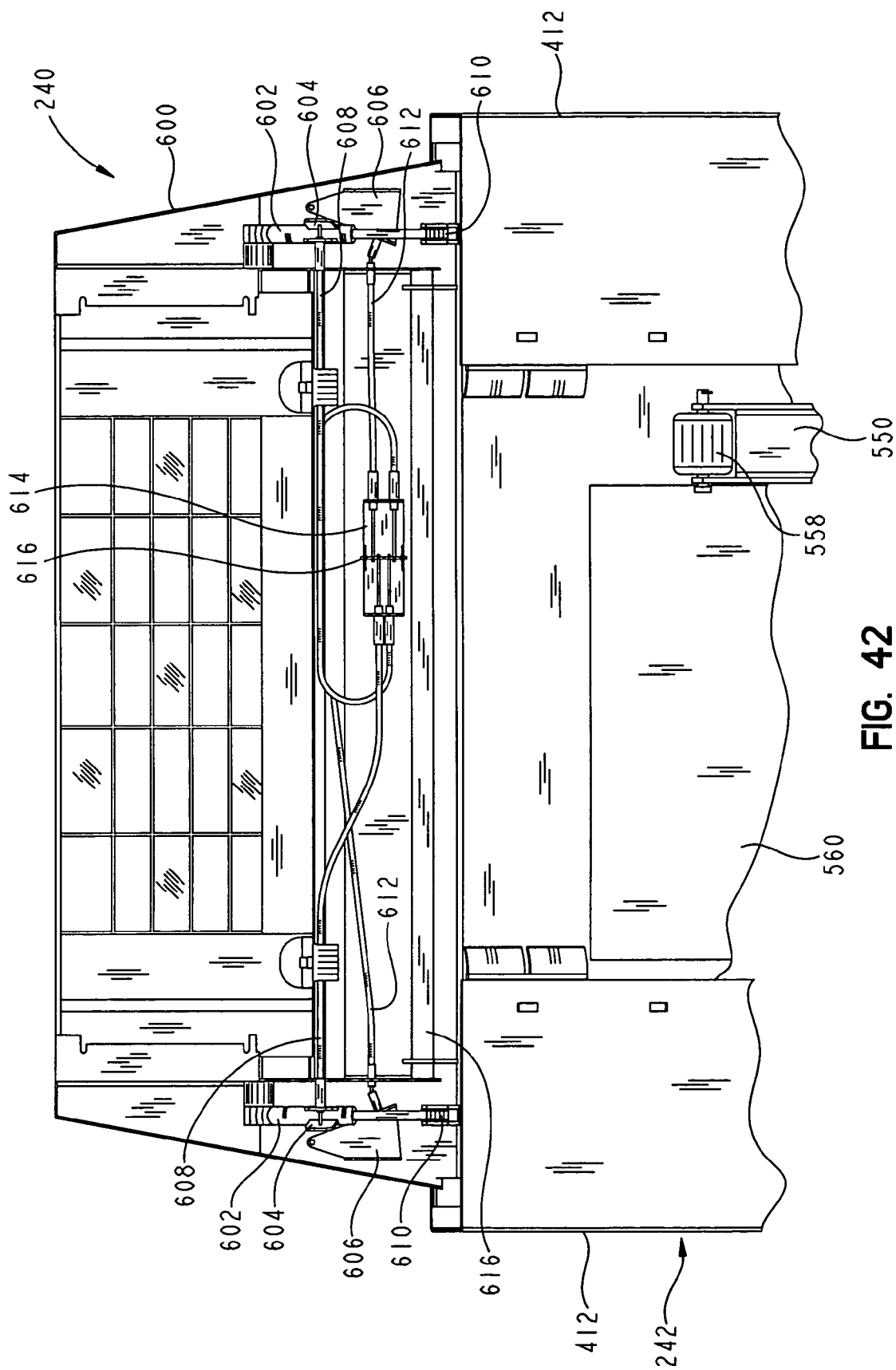
FIG. 42 illustrates a bottom view of the head section of the patient support.
Figure 43:
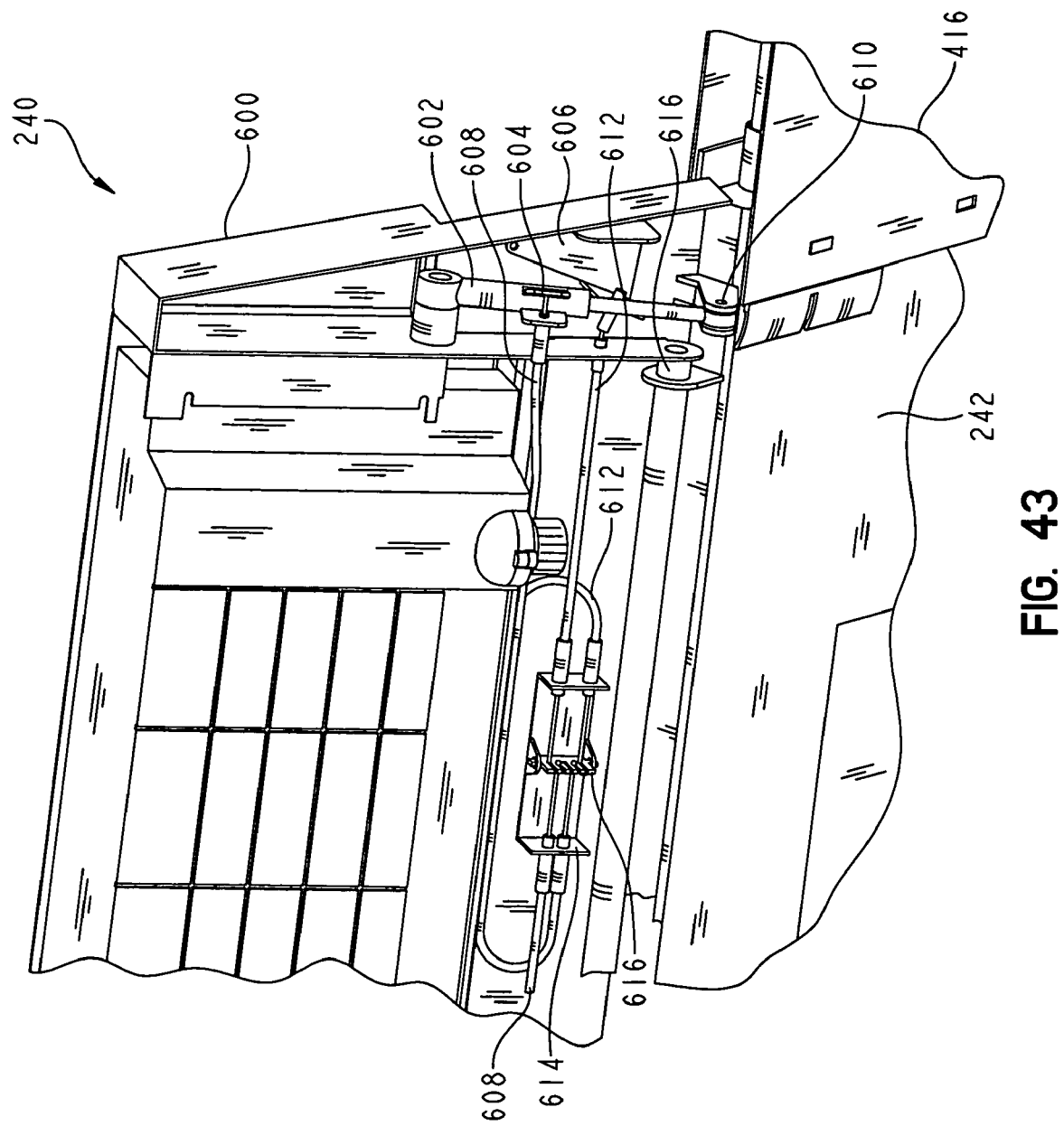
FIG. 43 illustrates a perspective view of the head section of the patient support.

As shown in FIGS. 42-44, patient support 10 includes head section 240, which is pivotally coupled to back section 242. Head section 240 is pivotally coupled to back section 242 by hinge 616. Head section 240 can be pivoted and secured about hinge 616 in a variety of orientations as shown in FIGS. 45-48. Head section 240 can be positioned and secured parallel to back section 242 or inclined or declined relative to back section 242. Head section 240 includes panel 600, cylinders 602, MECHLOCK braking mechanism 604, cables 608 and 612, release handles 606, coupler 614, and slotted plate 616. Handles 606 are pivotally coupled to the back side of head section 240 on each side of head section 240.

Handles 606 are positioned so that the user can place his or her fingers behind one side of head section 240 and squeeze handle 606 towards the outside edge of panel 600 to move head section 240 relative to back section 242. Cables 612 are rigidly coupled to panel 600 on one end and coupler 616 on the other end. Cables 612 include a hard outer cover which encloses a "choke" wire that can be moved relative to the cover. The moveable wire enclosed in cables 612 is coupled to handles 606 on one end and slotted plate 616 on the other end. Cables 608 are rigidly coupled on one end to coupler 614 and rigidly coupled on the other end to cylinders 602. Cables 608 are very similar to cables 612 and include a hard outer cover and an enclosed wire moveable relative to the cover. The moveable wire within cables 612 is coupled on one end to slotted plate 616 and MECHLOCK braking mechanism 604 on the other end.

Coupler 614 is rigidly coupled to the back side of panel 600 and includes slotted plate 616. Slotted plate 616 is pivotally coupled to coupler 614. Cylinders 602 are pivotally coupled on one end to the back side of panel 600 and pivotally on the opposing end to tabs 610 of back section 242. MECHLOCK brakes 604 are coupled to each cylinder 602. MECHLOCK brakes 604 are biased to grip or secure the cylinder rods of cylinders 602. When MECHLOCK brakes 604 are actuated the bias is overcome and the cylinder rods of cylinders 602 can by moved freely until the actuator is released and the bias is reapplied to grip the cylinder rods in their then-current position.

To adjust the angle of head section 240 relative to back section 242, the user must first actuate one of handles 606 on either side of panel 600. As one of handles 606 is pulled towards the outside edge of panel 600, the wire in cable 612, which is coupled on the opposing end to slotted plate 616 of coupler 614, is retracted. As the wire of cable 612 is retracted, slotted plate 616 which is in a default position is pivoted to a second position. When slotted plate 616 is moved to the second position, slotted plate 616 pulls or extends wires in cables 608 which are coupled to MECHLOCK brakes 604 on cylinders 602. When the wires in cables 608 are retracted, MECHLOCK brakes 604 are actuated and the bias which holds the cylinder rods of cylinders 602 in place is overcome. Cylinders 602 can be extended or retracted freely so head section 240 can be moved to the desired position. To fix head section 240 in the desired position, the user positions panel 600 to the desired angular position and releases handle 606. When handle 606 is released, the bias in MECHLOCK brakes 604 is reapplied so that the brakes 604 grip the cylinder rods of cylinders 602 in their current positions. The bias in MECHLOCK brakes 604 also pull or retract the wires in cables 608 which returns slotted plate 616 to the default position from the second position. When slotted plate 616 returns to the default position, the wires in cables 612 pull the actuated handles 606 back into their original positions. Coupler 614 and slotted plate 616 are configured so that when either handle 606 is actuated slotted plate 616 will actuate both MECHLOCK brakes 604.

Figure 49:
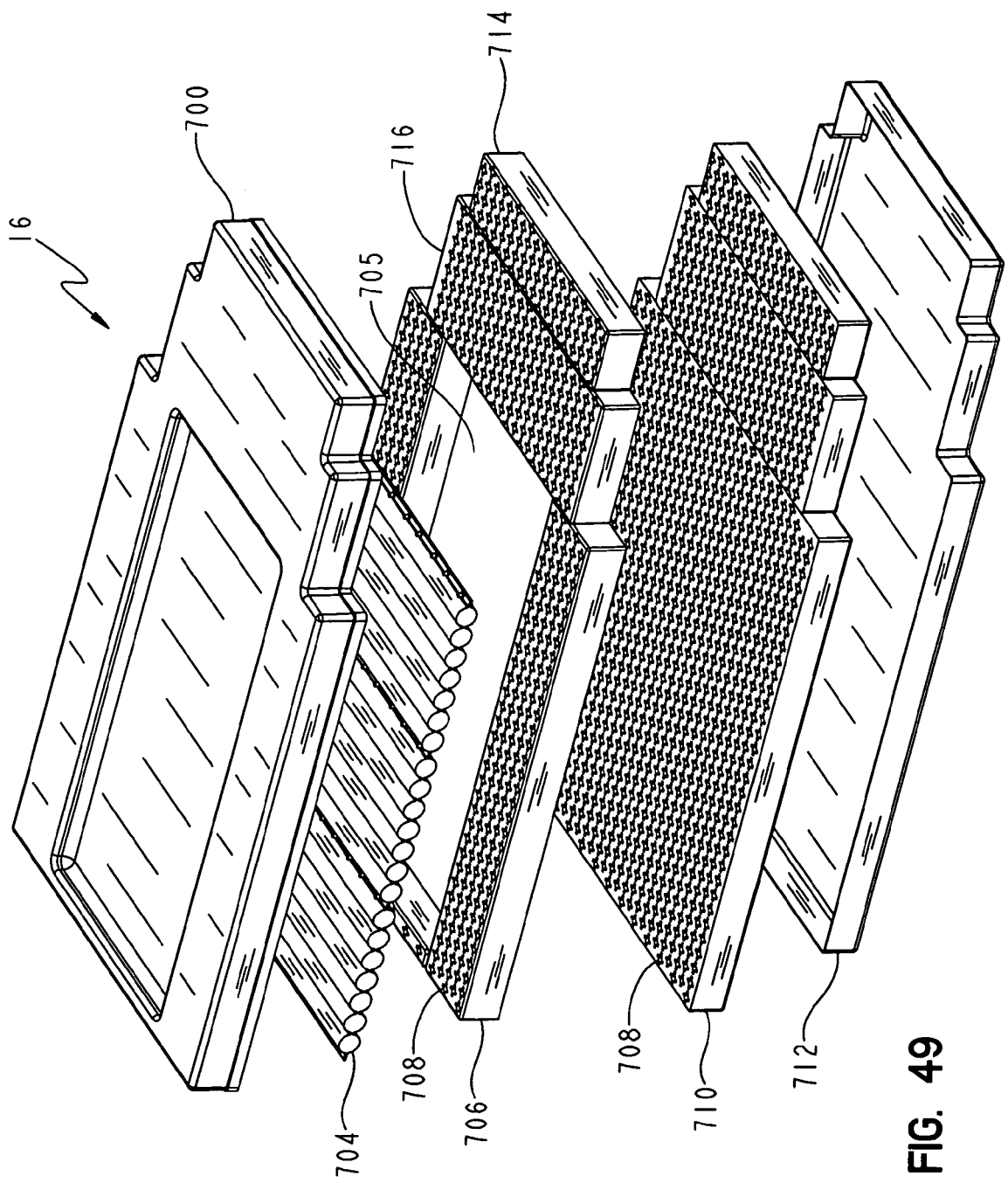
FIG. 49 illustrates a perspective exploded view of a mattress of the patient support.
Figure 50:
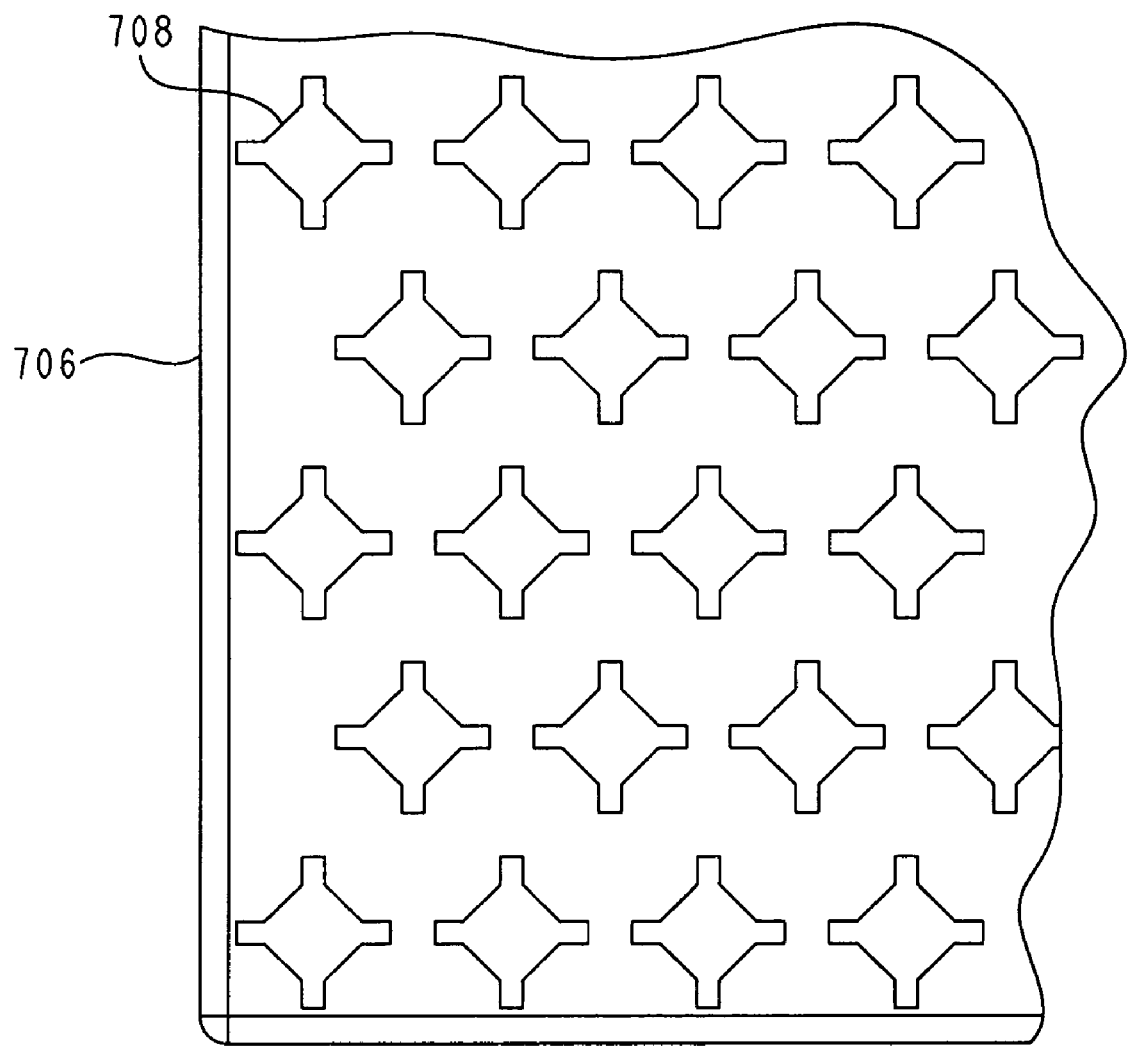
FIG. 50 illustrates a partial top view of the mattress of the patient support including a plurality of vertical openings.

As shown in FIGS. 49-50, mattress 16 of patient support 10 is configured to accommodate the dimension adjusting sections of patient support 10. Mattress 16 includes an upper cover 700, an inflatable section 704, a middle section 706, a base section 710, a first extension 716, a second extension 714, and a lower cover 712. Inflatable section 704 is configured to fit within recess 705 of middle section 706. Inflatable section 704 is illustratively comprised of multiple inflatable bladders. In one embodiment, the inflatable bladders are connected to a controlled gas supply. Recessed portion 705 is also configured to allow a patient's posterior side to be supported by inflatable section 704 while the patient's lateral portions are supported by the non-recessed surfaces of middle section 706. Middle section 706 and base section 710 are generally formed from foam-like material and include a plurality of vertical openings 708. Base 710 supports middle section 706 and also includes a plurality of vertical openings 708. Extensions 714 and 716 in mattress 16 are included to aid patient ingress and egress into patient support 10, specifically when patient support 10 is configured in the chair position. Bottom cover 712 is configured to couple to cover 700 to enclose base section 710, middle section 708, and inflatable section 704. Cover 700 and bottom cover 712 may include a fastener such as a zipper to couple together.

Vertical openings 708, best shown in FIG. 50, are configured to collapse when force is applied in a horizontal direction. For example, if mattress 16 is placed on patient support 10, siderails 22 can squeeze mattress 16 when the width of deck 24 is being made narrower. Vertical openings 708 collapse when siderails 22 retract. Extensions 714 and 716 also include vertical openings 708. When foot section 252 is fully extended, extensions 714 and 716 fill the extended portion of foot section 252. If foot section 252 is retracted, vertical openings 708 are collapsed as footboard 18 compresses extensions 714 and 716.

Although the invention has been described in detail with reference to certain illustrated embodiments, variations and modifications exist within the scope and spirit of the present invention as defined in the following claims.

The invention claimed is:

1. A patient support comprising:
a first frame comprising a pair of laterally spaced rails and a pair of longitudinally spaced crossmembers,
a second frame adjacent the first frame,
a deck including at least one pivotable deck section, the deck being supported by the second frame,
a support between the second frame and the deck,
a plurality of wheels movably supporting the first frame relative to a floor surface,
a first brake mechanism coupled to the second frame, the first brake mechanism including a first member configured to contact the floor surface,
a second brake mechanism coupled to the second frame and spaced from the first brake mechanism, the second brake mechanism comprising a second and a third member pivotally coupled to the second frame and configured to contact the floor surface, and an extendable-length actuator pivotally coupled to at least one of the first and second brake mechanisms to move at least one of the first, second, and third members into contact with the floor surface, wherein the first frame is movable in a longitudinal direction relative to at least one of the first and second brake mechanisms between a first position in which the at least one of the first and second brake mechanisms is nearer to a portion of the first frame and a second position in which the at least one of the first and second brake mechanisms is farther away from the portion of the first frame.

2. The patient support of claim 1, wherein the second and third members each have an upper end pivotably coupled to the second frame and a lower end configured to contact the floor surface.

3. The patient support of claim 2, comprising a brake pad coupled to the first member.

4. The patient support of claim 3, wherein the actuator is pivotally coupled to the second member.

5. The patient support of claim 2, further comprising a spring having first and second ends, the first end of the spring being coupled to the second frame, and the second end of the spring being coupled to the lower end of one of the first, second, and third members.

6. The patient support of claim 5, comprising a second spring coupled to at least one of the first, second and third members.

7. The patient support of claim 1, further comprising a mattress supported by the second frame, and a deck lift comprising a scissor mechanism coupled to the second frame.

8. A patient support comprising:
a first frame;
a plurality of wheels coupled to the first frame and positioned between the first frame and a floor surface supporting the plurality of wheels, the plurality of wheels configured to transport the first frame from one location to another location;
a second frame adjacent to the first frame, the first frame being movable in a longitudinal direction relative to the second frame,
a braking system coupled to the first and second frames, the braking system comprising a first brake member coupled to the first frame and a second brake member coupled to the second frame and spaced from the first brake member, the first brake member and the second brake member being movable between a first position configured to prevent longitudinal movement of the first frame relative to the second frame and a second position spaced from the first position and configured to permit longitudinal movement of the first frame relative to the second frame,
an electric actuator operably coupled to the braking system to move the first brake member from the non-braking position to the braking position;
a controller operably coupled to the electric actuator to cause the electric actuator to move the first brake member; and
a button coupled to the controller, the button being contactable by a person to actuate the controller.

9. The patient support of claim 8, wherein the first brake member is located closer to the frame when the first brake member is in the non-braking position, and the first brake member is located further away from the frame when the first brake member is in the braking position.

10. The patient support of claim 9, wherein each of the wheels has a floor-engaging surface and the first brake member is located closer to the floor engaging surface when the first brake member is in the braking position and the first brake member is located further away from the floor engaging surface when the first brake member is in the non-braking position.

11. The patient support of claim 10, wherein the braking system includes a third brake member laterally spaced from the first brake member relative to the frame.

12. The patient support of claim 11, wherein the second brake member is longitudinally spaced from the first brake member of the brake mechanism and a second actuator is coupled to the third brake member.

13. The patient support of claim 12, wherein the first and second brake members are connectable so that the button is contactable by a person to actuate the controller to cause first and second brake members to operate substantially simultaneously to cause braking or unbraking of the patient support.

14. The patient support of claim 13, wherein each brake member has a braking surface having an orientation facing away from the frame, and the braking surface of each brake member is configured to maintain the orientation facing away from the frame throughout the range of motion of the brake member.

15. A patient support comprising:
a first frame,
an articulating deck usable to support a mattress,
a plurality of wheels coupled to the first frame and positioned between the first frame and a floor surface supporting the plurality of wheels,
a second frame adjacent to the first frame,
a lift mechanism having a first end and a second end vertically spaced from the first end, the first end being connected to the second frame and the second end being connected to the deck, the deck being supported by the lift mechanism, the lift mechanism being configured to raise and lower the deck relative to the first and second frames,
a brake mechanism coupled to the second frame, the brake mechanism including a first braking member and a second braking member, and the first braking member being movable between a non-braking position which is closer to the second braking member and a braking position which is farther away from the second braking member, wherein the first frame is slidable in a longitudinal direction relative to the second frame when the first and second braking members are in the braking position.

16. The patient support of claim 15, wherein the deck has at least one deck section that is pivotable between a pivoted position and a non-pivoted position, and the first frame is movable in a longitudinal direction relative to the second frame when at least one of the deck sections is in the pivoted position.

17. The patient support of claim 16, wherein the first frame includes a pair of laterally spaced first frame rails, the second frame includes a pair of laterally spaced second frame rails, and each of the first frame rails includes a frame channel configured to slidably engage the second frame rails.

18. The patient support of claim 17, further comprising a controller operably coupled to the first frame member and a button contactable by a person to actuate the controller to cause the first frame member to move in a longitudinal direction relative to the second frame member when the braking member is in the braking position.

* * * * *